US012708493B2

(12) United States Patent
Saphier et al.

(10) Patent No.: US 12,708,493 B2
(45) Date of Patent: Aug. 18, 2026

(54) AUGMENTATION OF 3D SURFACE OF DENTAL SITE USING 2D IMAGES

(71) Applicant: Align Technology, Inc., San Jose, CA (US)

(72) Inventors: Ofer Saphier, Rechovot (IL); Assaf Weiss, Yavne (IL); Maayan Moshe, Ramat HaSharon (IL); Maik Gerth, Seeheim-Jugenheim (DE); Evgeni Alesinskyy, Hofheim am Taunus (DE)

(73) Assignee: Align Technology, Inc., San Jose, CA (US)

( * ) Notice: Subject to any disclaimer, the term of this patent is extended or adjusted under 35 U.S.C. 154(b) by 308 days.

(21) Appl. No.: 18/366,565

(22) Filed: Aug. 7, 2023

(65) Prior Publication Data

US 2024/0058105 A1 Feb. 22, 2024

Related U.S. Application Data

(60) Provisional application No. 63/398,800, filed on Aug. 17, 2022.

(51) Int. Cl.
*A61C 9/00* (2006.01)
*G06T 17/00* (2006.01)

(52) U.S. Cl.
CPC ............ *A61C 9/0053* (2013.01); *G06T 17/00* (2013.01); *G06T 2219/2008* (2013.01)

(58) Field of Classification Search
None
See application file for complete search history.

(56) References Cited

U.S. PATENT DOCUMENTS

| | | | |
|---|---|---|---|
| 6,152,731 | A | 11/2000 | Jordan et al. |
| 6,334,853 | B1 | 1/2002 | Kopelman et al. |
| 6,845,175 | B2 | 1/2005 | Kopelman et al. |
| 6,957,118 | B2 | 10/2005 | Kopelman et al. |
| 7,112,065 | B2 | 9/2006 | Kopelman et al. |

(Continued)

FOREIGN PATENT DOCUMENTS

| | | | |
|---|---|---|---|
| CN | 112584793 | A | 3/2021 |
| EP | 2164424 | B1 | 2/2019 |
| WO | 2019147984 | A1 | 8/2019 |

OTHER PUBLICATIONS

Crombez, et al., "Multimodal 20 Image to 30 Model Registration via a Mutual Alignment of Sparse and Dense Visual Features," IEEE International Conference on Robotics and Automation—ICRA, 2018, pp. 6316-6322.

*Primary Examiner* — Darryl V Dottin
(74) *Attorney, Agent, or Firm* — Lowenstein Sandler LLP

(57) ABSTRACT

Methods and systems are described that use 2D images and intraoral scans to generate and/or augment 3D models of dental site. In one example a method includes receiving a plurality of intraoral scans of a dental site generated by an intraoral scanner and a plurality of two-dimensional (2D) images of the dental site generated by the intraoral scanner, generating a three-dimensional (3D) surface of the dental site from the plurality of intraoral scans, determining a correspondence between points on the 3D surface and points in one or more 2D images of the plurality of 2D images, and performing one or more operations using the correspondence between the points on the 3D surface and the points on the one or more 2D images.

22 Claims, 28 Drawing Sheets

(56) References Cited

U.S. PATENT DOCUMENTS

| | | | |
|---|---|---|---|
| 7,220,124 | B2 | 5/2007 | Taub et al. |
| 7,236,842 | B2 | 6/2007 | Kopelman et al. |
| 7,333,874 | B2 | 2/2008 | Taub et al. |
| 7,361,020 | B2 | 4/2008 | Abolfathi et al. |
| 7,442,040 | B2 | 10/2008 | Kuo |
| 7,536,234 | B2 | 5/2009 | Kopelman et al. |
| 7,555,403 | B2 | 6/2009 | Kopelman et al. |
| 7,766,658 | B2 | 8/2010 | Tricca et al. |
| 7,862,336 | B2 | 1/2011 | Kopelman et al. |
| 7,871,269 | B2 | 1/2011 | Wu et al. |
| 7,947,508 | B2 | 5/2011 | Tricca et al. |
| 8,092,215 | B2 | 1/2012 | Stone-Collonge et al. |
| 8,244,028 | B2 | 8/2012 | Kuo et al. |
| 8,382,474 | B2 | 2/2013 | Boltanski et al. |
| 8,509,932 | B2 | 8/2013 | Kopelman |
| 8,807,999 | B2 | 8/2014 | Kuo et al. |
| 9,375,298 | B2 | 6/2016 | Boronkay et al. |
| 9,408,679 | B2 | 8/2016 | Kopelman |
| 9,492,243 | B2 | 11/2016 | Kuo |
| 9,763,758 | B2 | 9/2017 | Kopelman |
| 10,016,262 | B2 | 7/2018 | Sabina et al. |
| 10,810,738 | B1 | 10/2020 | Chen |
| 10,952,816 | B2 | 3/2021 | Kopelman |
| 11,238,586 | B2 | 2/2022 | Minchenkov et al. |
| RE49,541 | E | 6/2023 | Avi |
| 11,707,238 | B2 | 7/2023 | Moshe et al. |
| 2005/0106529 | A1 | 5/2005 | Abolfathi et al. |
| 2006/0115785 | A1 | 6/2006 | Li et al. |
| 2008/0138767 | A1 | 6/2008 | Kuo et al. |
| 2008/0286716 | A1 | 11/2008 | Sherwood |
| 2008/0286717 | A1 | 11/2008 | Sherwood |
| 2017/0024881 | A1 | 1/2017 | Choi |
| 2018/0028063 | A1* | 2/2018 | Elbaz .................. G06F 16/9535 |
| 2021/0321872 | A1* | 10/2021 | Saphier .................. A61B 5/004 |
| 2022/0202295 | A1* | 6/2022 | Elbaz ..................... G16H 30/40 |

* cited by examiner

AUGMENTATION OF 3D SURFACE OF DENTAL SITE USING 2D IMAGES

RELATED APPLICATIONS

This application claims the benefit of U.S. Provisional Application No. 63/398,800, filed Aug. 17, 2022, the entire content of which is hereby incorporated by reference.

TECHNICAL FIELD

Embodiments of the present disclosure relate to the field of dentistry and, in particular, to the use of 2D intraoral images to augment portions of 3D surfaces of dental sites generated from intraoral scans.

BACKGROUND

For restorative dental work such as crowns and bridges, one or more intraoral scans may be generated of a preparation tooth and/or surrounding teeth on a patient's dental arch using an intraoral scanner. In cases of sub-gingival preparations, the gingiva covers at least portions of the margin line (also referred to herein as a finish line) and is retracted in order to fully expose the margin line. Thus, intraoral scans are generally created after a doctor packs a dental retraction cord (also referred to as packing cord or retraction cord) under the gums around the preparation tooth and then withdraws the retraction cord, briefly exposing a sub-gingival margin line. The intraoral scans taken after the retraction cord has been packed around the preparation tooth and then withdrawn must be taken within a narrow time window during which the gingiva collapses back over the margin line. If insufficient intraoral scans are generated before the gingiva collapses, then the process needs to be repeated. Once sufficient intraoral scans are generated, these are then used to generate a virtual three-dimensional (3D) model of a dental site including the preparation tooth and the surrounding teeth and gingiva. For example, a virtual 3D model of a patient's dental arch may be generated. The virtual 3D model may then be sent to a lab.

There are a number of use cases in which a margin line is not clearly captured in a virtual 3D model of a preparation tooth, which may render the virtual 3D model unsuitable for manufacture of a prosthodontic such as a cap or bridge. For example, one or more regions of the 3D model may not be sharp enough to manufacture a clinically accurate prosthodontic that will fit properly on the preparation tooth. Such a 3D model that lacks sharpness may be generated due to limits of an intraoral scanner, poor scanning technique, patient anatomy, excess bleeding and/or saliva, and so on. In an example, a doctor may fail to scan a region of the margin line. In another example, an intraoral scanner may have limits to a depth of scan (e.g., a short preparation in between two large teeth may be too far from the scanner to generate high quality intraoral scans of the preparation) and/or limits to capture angles (e.g., where teeth are very close to the preparation and an angle of view to a portion of the margin line exceeds a capture angle of the scanner) that reduce scan quality in certain situations. Additionally, changes to the preparation tooth that is being scanned during scanning may impair a quality of the 3D model (e.g., gums collapsing over a sub-gingival margin line before scanning of the margin line is complete, blood and/or saliva obstructs a margin line, other objects obstruct the margin line, etc.).

The lab may then perform a process called modeling in which it manually manipulates the virtual 3D model or a physical 3D model generated from the virtual 3D model to achieve a 3D model that is usable to create a crown, bridge, or other dental prosthetic. This may include manually marking a margin line in the virtual 3D model or the physical 3D model, for example. This may further include resculpting the virtual 3D model or physical 3D model, such as to correct the margin line if it is unclear or covered by gingiva in areas. Such work of modifying the virtual 3D model and/or the physical 3D model by the lab often results in an educated guess at what the actual geometry of the patient's preparation tooth is, including a guess at the margin line, a guess at the tooth's shape, and so on. A dental prosthetic may then be manufactured using the modified virtual 3D model or physical 3D model. If the guess at the true geometry of the patient's preparation tooth was incorrect, then this process is repeated, resulting in additional work on the part of the dentist and/or lab. Additionally, the process of manually modifying the virtual 3D model or physical 3D model is a time intensive task that is performed by experienced lab technicians, which increases the overall cost of the dental prosthetic and increases the amount of time that it takes to manufacture the dental prosthetic.

SUMMARY

Multiple example implementations are summarized. Many other implementations are also envisioned.

In a 1$^{st}$ implementation, a method comprises: receiving a plurality of intraoral scans of a dental site generated by an intraoral scanner and a plurality of two-dimensional (2D) images of the dental site generated by the intraoral scanner; generating a three-dimensional (3D) surface of the dental site based at least in part on the plurality of intraoral scans; determining a correspondence between points on the 3D surface and points in one or more 2D images of the plurality of 2D images; and performing one or more operations using the correspondence between the points on the 3D surface and the points on the one or more 2D images.

A 2$^{nd}$ implementation may further extend the first implementation. In the 2$^{nd}$ implementation, performing the one or more operations comprises augmenting the 3D surface of the dental site using data from the one or more 2D images based on the determined correspondence.

A 3$^{rd}$ implementation may further extend the 1st or 2$^{nd}$ implementation. In the 3$^{rd}$ implementation, the method further comprises: determining a view of the 3D surface; and selecting the one or more 2D images based on the determined view.

A 4$^{th}$ implementation may further extend any preceding implementation. In the 4$^{th}$ implementation, the method further comprises: receiving a selection of a point on the 3D surface; and indicating a corresponding point on the one or more 2D images based on the determined correspondence.

A 5$^{th}$ implementation may further extend any preceding implementation. In the 5$^{th}$ implementation, the method further comprises: receiving a selection of a point on a 2D image of the one or more 2D images; and indicating a corresponding point on the 3D surface based on the determined correspondence.

A 6$^{th}$ implementation may further extend any preceding implementation. In the 6$^{th}$ implementation, the dental site comprises a preparation tooth having a margin line, wherein the 3D surface comprises a representation of the preparation tooth, and wherein each of the one or more 2D images depicts the preparation tooth and at least a portion of the margin line.

A 7$^{th}$ implementation may further extend the 6$^{th}$ implementation. In the 7$^{th}$ implementation, the method further comprises: marking the margin line on the 3D surface; and automatically marking at least the portion of the margin line on the one or more 2D images based on the determined correspondence.

A n 8$^{th}$ implementation may further extend the 7$^{th}$ implementation. In the 8$^{th}$ implementation, the margin line is manually marked on the 3D surface based on user input.

A 9$^{th}$ implementation may further extend the 7th or 8$^{th}$ implementation. In the 9$^{th}$ implementation, the method further comprises: processing data from the 3D surface of the dental site using a trained machine learning surface that has been trained to identify margin lines of preparation teeth, wherein the trained machine learning surface generates an output identifying the margin line on the 3D surface.

A 10$^{th}$ implementation may further extend any of the 6$^{th}$ through 9$^{th}$ implementation. In the 10th implementation, the method further comprises: marking at least the portion of the margin line on each of the one or more 2D images; and automatically marking at least the portion of the margin line on the 3D surface based on the determined correspondence.

An 11$^{th}$ implementation may further extend any of the 6th through 10$^{th}$ implementation. In the 11th implementation, the method further comprises: determining an estimate of the margin line on the 3D surface; and updating the estimate of the margin line on the 3D surface based on representations of at least the portion of the margin line in the one or more 2D images and the determined correspondence between points on the 3D surface and points in the one or more 2D images.

A 12$^{th}$ implementation may further extend any of the 6$^{th}$ through 11$^{th}$ implementation. In the 12th implementation, the method further comprises: determining an estimate of the margin line based on a combination of information from the 3D surface and information from the one or more 2D images.

A 13$^{th}$ implementation may further extend the 12$^{th}$ implementation. In the 13$^{th}$ implementation, the method further comprises: receiving input selecting a portion of the margin line that is to be estimated based on the one or more 2D images, wherein the estimate of the margin line is determined based on the one or more 2D images for the selected portion of the margin line.

A 14$^{th}$ implementation may further extend any of the 6th through 13$^{th}$ implementation. In the 14th implementation, the method further comprises: receiving user input indicating that the one or more 2D images show an accurate depiction of the margin line; and using the user input to determine at least one of a) which intraoral scans of the plurality of intraoral scans to use for generation of a portion of the 3D surface depicting the margin line or b) which 2D images of the plurality of images to use for generation of the portion of the 3D surface depicting the margin line.

A 15$^{th}$ implementation may further extend the 14$^{th}$ implementation. In the 15$^{th}$ implementation, the method further comprises: determining a timing of when the one or more 2D images were generated; and determining at least one of a) which intraoral scans of the plurality of intraoral scans to use for generation of a portion of the 3D surface depicting the margin line or b) which 2D images of the plurality of images to use for generation of the portion of the 3D surface depicting the margin line based at least in part on the timing of when the one or more 2D images were generated.

A 16$^{th}$ implementation may further extend any preceding implementation. In the 16$^{th}$ implementation, the method further comprises: for each 2D image of the plurality of 2D images, determining a position of a camera of the intraoral scanner that generated the 2D image relative to the 3D surface based on at least one of a) interpolation of positions of the intraoral scanner associated with intraoral scans of the plurality of intraoral scans captured before and after the 2D image was captured, b) inertial measurement data generated by the intraoral scanner while generating at least one of the 2D image, the intraoral scans captured before the 2D image or the intraoral scans captured after the 2D image, or c) registration of the 2D image to the 3D surface.

A 17$^{th}$ implementation may further extend any preceding implementation. In the 17$^{th}$ implementation, the method further comprises: receiving user selection of the one or more 2D images from the plurality of 2D images.

An 18$^{th}$ implementation may further extend any preceding implementation. In the 18$^{th}$ implementation, the 3D surface has missing data for a region of the dental site, the method further comprising: determining that the region of the dental site is shown in the one or more 2D images; and supplementing the 3D surface by using data from the one or more 2D images to fill in the missing data for the region of the dental site in the 3D surface.

A 19$^{th}$ implementation may further extend the 18$^{th}$ implementation. In the 19$^{th}$ implementation, the method further comprises: receiving a user input tracing a curve in at least two 2D images of the one or more 2D images; triangulating the curve in the at least two 2D images into a 3D curve; and adding the 3D curve to the 3D surface based on the determined correspondence.

A 20$^{th}$ implementation may further extend the 18th or 19$^{th}$ implementation. In the 20$^{th}$ implementation, the curve is a curve of at least a portion of a margin line.

A 21$^{st}$ implementation may further extend any preceding implementation. In the 21$^{st}$ implementation, the method further comprises: determining a shape of a portion of the dental site in at least three 2D images of the one or more 2D images; determining that there is disagreement between the at least three 2D images regarding the shape of the portion of the dental site; applying a voting algorithm to resolve the disagreement and determine a final shape of the portion of the dental site; and updating the 3D surface of the dental site in accordance with the determined final shape of the portion of the dental site based on the determined correspondence between the points on the 3D surface and the points in the at least three 2D images.

A 22$^{nd}$ implementation may further extend any preceding implementation. In the 22$^{nd}$ implementation, the method further comprises: determining a shape of a portion of the dental site in at least two 2D images of the one or more 2D images; determining that there is disagreement between the at least two 2D images regarding the shape of the portion of the dental site; determining a final shape of the portion of the dental site based on a weighted combination of the shape of the portion of the dental site from each of the at least two 2D images; and updating the 3D surface of the dental site in accordance with the determined final shape of the portion of the dental site based on the determined correspondence between the points on the 3D surface and the points in the at least three 2D images.

A 23$^{rd}$ implementation may further extend the 22$^{nd}$ implementation. In the 23$^{rd}$ implementation, the method further comprises: determining, for each 2D image of the at least two 2D images, an angle to an epi-polar line of a camera that generated the 2D image, wherein the weighted combination is determined at least in part to the angle to the epi-polar line.

A 24$^{th}$ implementation may further extend any preceding implementation. In the 24$^{th}$ implementation, the method further comprises: determining a first estimate for a portion of the dental site based on the 3D surface of the dental site; determining a second estimate for the portion of the dental site based on the one or more 2D images of the dental site; and comparing the first estimate for the portion of the dental site to the second estimate for the portion of the dental site.

A 25$^{th}$ implementation may further extend the 24$^{th}$ implementation. In the 25$^{th}$ implementation, the method further comprises: determining that there is agreement between the first estimate and the second estimate; and marking the portion of the dental site in the 3D surface based on at least one of the first estimate or the second estimate.

A 26$^{th}$ implementation may further extend the 24th or 25$^{th}$ implementation. In the 26$^{th}$ implementation, the method further comprises: determining that there is disagreement between the first estimate and the second estimate; and generating a notification of the disagreement.

A 27$^{th}$ implementation may further extend any of the 24th through 26$^{th}$ implementation. In the 27th implementation, the method further comprises: determining a first estimate for a portion of the dental site based on a first subset of the plurality of 2D images; determining a second estimate for the portion of the dental site based on a second subset of the plurality of 2D images; and comparing the first estimate for the portion of the dental site to the second estimate for the portion of the dental site.

A 28$^{th}$ implementation may further extend any preceding implementation. In the 28$^{th}$ implementation, the plurality of 2D images comprise at least one of color images, near infrared (NIRI) images, or fluorescent images.

A 29$^{th}$ implementation may further extend any preceding implementation. In the 29$^{th}$ implementation, the method is performed by a processing device after intraoral scanning of the dental site is complete, and wherein the 3D surface is a 3D model of the dental site.

A 30$^{th}$ implementation may further extend any preceding implementation. In the 30$^{th}$ implementation, the method is performed by a processing device during intraoral scanning, the method further comprising: determining, based on the one or more 2D images and the determined correspondence, whether enough intraoral scans have been generated to accurately show the dental site in the 3D surface.

A 31$^{st}$ implementation may further extend any preceding implementation. In the 31$^{st}$ implementation, the method is performed by a processing device during intraoral scanning, the method further comprising: comparing the one or more 2D images to at least one of a) one or more other 2D images of the plurality of 2D images or b) the 3D surface; and determining whether any contradictions are identified based on a result of the comparing.

A 32$^{nd}$ implementation may further extend any preceding implementation. In the 32$^{nd}$ implementation, the method further comprises: determining a first 2D image of the plurality of 2D images that most closely matches a current view of the 3D surface and a selection of a point on the 3D surface; and displaying the first 2D image proximate to the 3D surface.

A 33$^{rd}$ implementation may further extend the 32$^{nd}$ implementation. In the 33$^{rd}$ implementation, the method further comprises: receiving input to adjust the current view of the 3D surface; adjusting the current view of the 3D surface in accordance with the received input; determining a second 2D image of the plurality of 2D images that most closely matches the updated current view of the 3D surface and the selection of the point on the 3D surface; and displaying the second 2D image proximate to the 3D surface.

A 34$^{th}$ implementation may further extend the 32 nd or 33$^{rd}$ implementation. In the 34$^{th}$ implementation, the method further comprises: determining a selection of a new point on the 3D surface; determining a second 2D image of the plurality of 2D images that most closely matches the current view of the 3D surface and the selection of the new point on the 3D surface; and displaying the second 2D image proximate to the 3D surface.

A 35$^{th}$ implementation may further extend any of the 32 nd through 34$^{th}$ implementation. In the 35th implementation, the method further comprises: receiving user input to pin the first 2D image to a display; pinning the first 2D images to the display; receiving input to at least one of a) adjust the current view of the 3D surface or b) select a new point on the 3D surface; determining a second 2D image of the plurality of 2D images that most closely matches the adjusted current view of the 3D surface and the selection of the point or the new point on the 3D surface; and displaying the second 2D image together with the pinned first 2D image.

A 36$^{th}$ implementation may further extend the 35$^{th}$ implementation. In the 36$^{th}$ implementation, the method further comprises: receiving a selection of a further point on a first entity selected from the 3D surface, the first 2D image and the second 2D image; and indicating a corresponding point to the further point on remaining entities selected from the 3D surface, the first 2D image and the second 2D image.

A 37$^{th}$ implementation may further extend any preceding implementation. In the 37$^{th}$ implementation, the dental site comprises a preparation tooth, the method further comprising: identifying a margin line around the preparation tooth from the 3D surface; determining that a confidence for a segment of the margin line is low; determining one or more 3D curves for the segment of the margin line based on one or more 2D images of the plurality of 2D images; and modifying the 3D surface to cause it to have the one or more 3D curves.

A 38$^{th}$ implementation may further extend any preceding implementation. In the 38$^{th}$ implementation, the method further comprises: determining a first 2D image of the plurality of 2D images that most closely matches a current view of the 3D surface and a selection of a point on the 3D surface; registering the first 2D images to the 3D surface; and overlaying the first 2D image over the 3D surface in accordance with the registration.

A 39$^{th}$ implementation may further extend the 38$^{th}$ implementation. In the 39$^{th}$ implementation, the method further comprises: determining a selection of a new point on the 3D surface; determining a second 2D image of the plurality of 2D images that most closely matches the current view of the 3D surface and the selection of the new point on the 3D surface; performing a second registration of the second 2D image to the 3D surface; and overlaying the second 2D image over the 3D surface in accordance with the second registration.

A 40$^{th}$ implementation may further extend any preceding implementation. In the 40$^{th}$ implementation, the method further comprises: determining a first 2D image of the plurality of 2D images that most closely matches a current view of the 3D surface and a selection of a point on the 3D surface; projecting the first 2D image onto a plane corresponding to the current view of the 3D surface to generate a synthetic 2D image; registering the synthetic 2D image to the 3D surface; and overlaying the synthetic 2D image over the 3D surface in accordance with the registration.

A 41$^{st}$ implementation may further extend any preceding implementation. In the 41$^{st}$ implementation, the method further comprises: generating a panoramic image of the dental site using the plurality of 2D images; determining a point on the panoramic image that corresponds to a selection of a point on the 3D surface; and indicating the determined point on the panoramic image.

A $42^{nd}$ implementation may further extend any preceding implementation. In the $42^{nd}$ implementation, performing the one or more operations comprises verifying whether a correct margin line has been traced on the 3D surface.

A $43^{rd}$ implementation may further extend the $42^{nd}$ implementation. In the $43^{rd}$ implementation, the method further comprises: responsive to determining that the correct margin line has been traced on the 3D surface, reaching a conclusion that the 3D surface is ready for use to manufacture a prosthodontic.

A $44^{th}$ implementation may further extend any preceding implementation. In the $44^{th}$ implementation, a non-transitory computer readable medium comprises instructions that, when executed by a processing device, cause the processing device to perform the method of any of the $1^{st}$ through $43^{rd}$ implementations.

A $45^{th}$ implementation may further extend any preceding implementation. In the $45^{th}$ implementation, an intraoral scanning system comprises: the intraoral scanner; and a computing device operatively connected to the intraoral scanner, wherein the computing device is to perform the method of any of the $1^{st}$ through 43 rd implementations.

A $46^{th}$ implementation may further extend any preceding implementation. In the $46^{th}$ implementation, a system comprises: a memory; and a processing device to execute instructions from the memory to perform the method of any of the $1^{st}$ through $43^{rd}$ implementations.

BRIEF DESCRIPTION OF THE DRAWINGS

Embodiments of the present disclosure are illustrated by way of example, and not by way of limitation, in the figures of the accompanying drawings.

DETAILED DESCRIPTION

Figure 1:
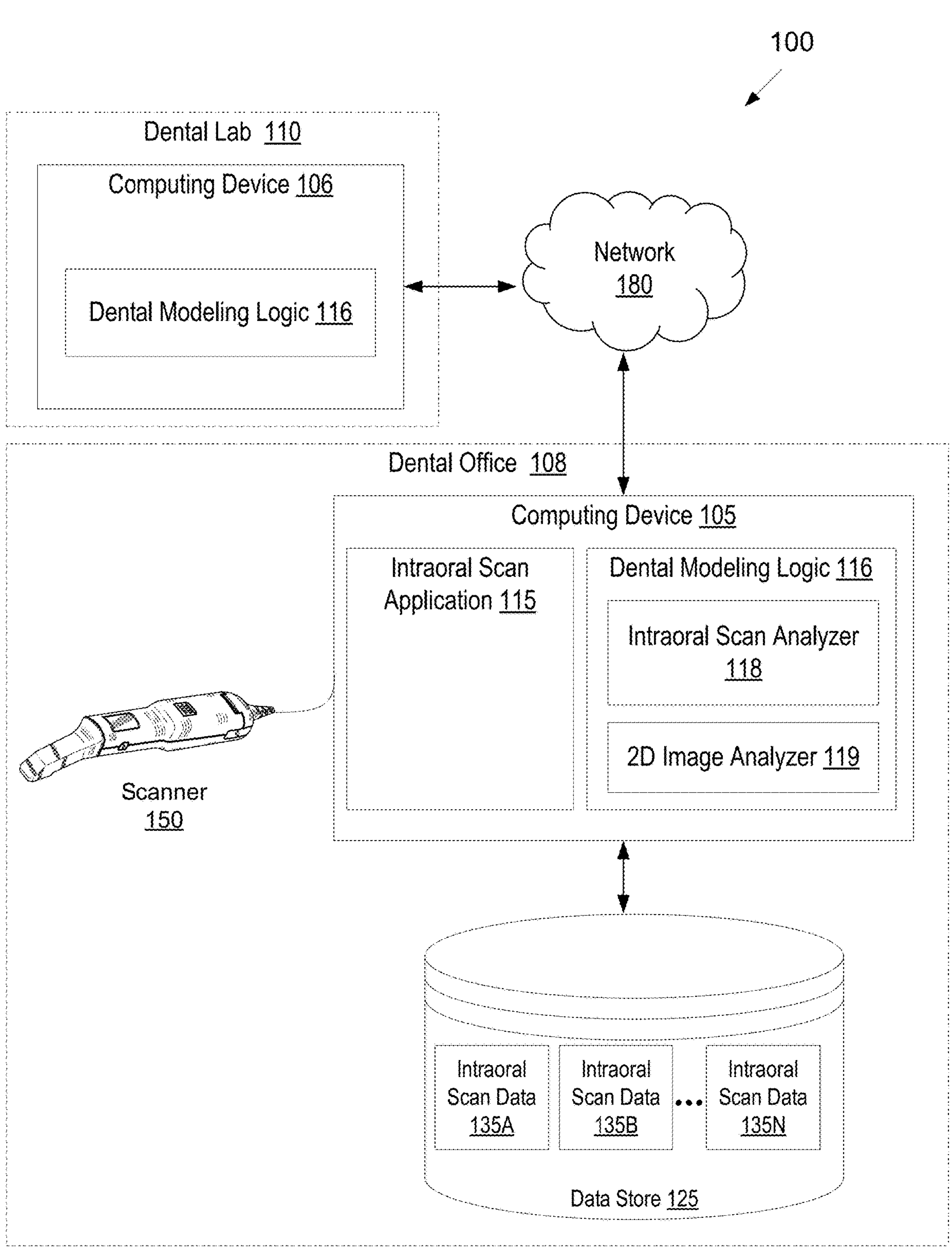
FIG. 1 illustrates one embodiment of a system for performing intraoral scanning and/or generating a 3D surface of an intraoral site.

Described herein are methods and systems using 2D images of a dental site to augment a 3D surface of the dental site generated from a sequence of intraoral scans. The 2D images may be used, for example, for accurately determining the shape, position and orientation of a margin line for a preparation tooth and/or for determining other accurate information for a dental site. Also described herein are methods and systems for identifying and/or correcting features in images of teeth and/or in virtual 3D models or 3D surfaces of teeth. In some embodiments, methods and systems identify and/or correct margin lines in images and/or virtual 3D surfaces/models of preparation teeth. In other embodiments, other features of teeth (which may or may not be preparation teeth) are identified and/or corrected. Examples of other features that may be identified and/or corrected include cracks, chips, gum line, worn tooth regions, cavities (also known as caries), emergent profile (e.g., the gum tooth line intersection), an implant gum line, implant edges, scan body edge/curves, any other artificial 3D curve, and so on. Additionally, blood, saliva, poor image capture areas, reflectances, etc. may be identified and/or corrected. Additionally, insertion paths may be identified, model orientation may be determined, blurry regions or regions of low image quality may be identified and/or corrected, and so on.

For many prosthodontic procedures (e.g., to create a crown, bridge, veneer, etc.), an existing tooth of a patient is ground down to a stump. The ground tooth is referred to herein as a preparation tooth, or simply a preparation. The preparation tooth has a margin line (also referred to as a margin line), which is a border between a natural (unground) portion of the preparation tooth and the prepared (ground) portion of the preparation tooth. The preparation tooth is typically created so that a crown or other prosthesis can be mounted or seated on the preparation tooth. In many instances, the margin line of the preparation tooth is subgingival (below the gum line). While the term preparation typically refers to the stump of a preparation tooth, including the margin line and shoulder that remains of the tooth, the term preparation herein also includes artificial stumps, pivots, cores and posts, or other devices that may be implanted in the intraoral cavity so as to receive a crown or other prosthesis. Embodiments described herein with reference to a preparation tooth also apply to other types of preparations, such as the aforementioned artificial stumps, pivots, and so on.

After the preparation tooth is created, a practitioner performs operations to ready that preparation tooth for scanning. Readying the preparation tooth for scanning may include wiping blood, saliva, etc. off of the preparation tooth and/or separating a patient's gum from the preparation tooth to expose the margin line. In some instances, a practitioner will insert a material (e.g., a retraction material such as a retraction cord) around the preparation tooth between the preparation tooth and the patient's gum. The practitioner will then remove the cord before generating a set of intraoral scans of the preparation tooth. The soft tissue of the gum will then revert back to its natural position, and in many cases collapses back over the margin line, after a brief time period. Accordingly, the practitioner uses an intraoral scanner to scan the readied preparation tooth and generate a set of intraoral images of the preparation tooth before the soft tissue reverts back to its natural position. In other instances, a practitioner (e.g., a dentist or doctor) uses a tool such as a dental probe, a dental spatula, a triple syringe, a tool to output a stream of air or water, etc. to partially expose the margin line around a preparation tooth being scanned. While a portion of the margin line is exposed, the intraoral scanner generates a scan of the region of the preparation tooth with the exposed portion of the margin line. The practitioner then uses the tool to expose another portion of the margin line, which is also imaged. This process continues until all of the margin line has been exposed and scanned.

The intraoral site at which a prosthesis is to be implanted generally should be measured accurately and studied carefully, so that the prosthesis such as a crown, denture or bridge, for example, can be properly designed and dimensioned to fit in place. A good fit enables mechanical stresses to be properly transmitted between the prosthesis and the jaw, and can prevent infection of the gums and tooth decay via the interface between the prosthesis and the intraoral site, for example. During scanning, a 3D surface may be generated from intraoral scans captured thus far. After the intraoral site has been scanned, a virtual 3D model (also referred to herein simply as a 3D model) of the dental site may be generated, and that 3D model may be used to manufacture a dental prosthetic. The virtual 3D model may be similar to the 3D surface, but may have greater resolution and/or accuracy. However, if the area of a preparation tooth containing the margin line lacks definition, it may not be possible to properly determine the margin line, and thus the margin of a restoration may not be properly designed.

Accordingly, embodiments disclosed herein provide automated systems and methods for analyzing, marking, and/or updating the margin line in a virtual 3D model and/or surface of a preparation tooth generated from an intraoral scan. The virtual 3D model (or images generated from the virtual 3D model or images used to generate the virtual 3D model) may be analyzed to identify the margin line. In some embodiments, intraoral scan(s) and/or image(s) generated by projecting a virtual 3D surface onto a 2D surface are analyzed using a trained machine learning model that has been trained to determine margin lines on preparation teeth. The margin line may then be marked or drawn on the virtual 3D model or surface. Additionally, one or more 2D images of the preparation tooth may be analyzed by a trained machine learning model to determine a margin line on the preparation tooth. A quality of the margin lines may be assessed, and a dental practitioner (also referred to herein as a doctor) may be notified of a quality score of the margin line from the 3D surface and/or of a quality score of the margin line from the 2D image(s). Additionally, or alternatively, quality scores may be computed for different segments of the margin line(s), and any segment of a margin line with a low quality score (e.g., a quality score that is below a quality threshold) may be identified. A final margin line may be generated based on a combination of high quality margin line segments from the 3D surface and high quality margin line segments from the 2D image(s).

In some embodiments, one or more low quality region of the 3D surface may be updated based on data from 2D images. For example, blood, saliva, soft tissue (e.g., a collapsing gum) and/or a retraction material may obscure a margin line in the 3D model. However, one or more 2D images of the preparation tooth may include a clear depiction of the margin line. In some embodiments, an alternative 3D surface may be determined from the 2D images and used to modify the low quality region of the 3D surface (i.e., of the 3D model).

Embodiments provide improved 3D models of preparation teeth that are generated with minimal or no manual manipulation of the 3D models. Traditionally, 3D models are corrected by a lab to ensure a clear and accurate margin line. This may involve sending instructions back to a doctor to perform an additional scan of an unclear region, manually cutting a physical 3D model manufactured from the virtual 3D model, manually manipulating the virtual 3D model (e.g., using computer aided drafting (CAD) tools), and so on. Each of these manual operations takes time and resources, and increases the amount of time that it takes to manufacture a prosthodontic as well as the cost of the prosthodontic. Accordingly, the automated methods and systems described herein that can mark a margin line in a 3D model can enable a doctor to inspect the margin line in the 3D model before sending the 3D model to a lab. Additionally, the automated methods and systems described herein that adjust the preparation tooth and/or the margin line can correct and/or add the margin line in the 3D model. Each of these systems and methods, which may be used alone or together, reduce the cost and time of manufacturing an oral prosthetic.

Various embodiments are described herein. It should be understood that these various embodiments may be implemented as stand-alone solutions and/or may be combined. Accordingly, references to an embodiment, or one embodiment, may refer to the same embodiment and/or to different embodiments. Additionally, some embodiments are discussed with reference to restorative dentistry, and in particular to preparation teeth and margin lines. However, it should be understood that embodiments discussed with reference to restorative dentistry (e.g., prosthodontics) may also apply to corrective dentistry (e.g., orthodontia). Additionally, embodiments discussed with reference to preparation teeth may also apply to teeth generally, and not just preparation teeth. Furthermore, embodiments discussed with reference to margin lines may also apply to other dental features, such as cracks, chips, gum lines, caries, and so on. For example, embodiments discussed herein that can identify and correct margin lines can also identify and remove blood and/or saliva on a tooth surface, foreign objects that obscure a tooth surface, poor data capture caused by reflections, captured areas with low clarity, and so on.

Some embodiments are discussed herein with reference to intraoral scans and intraoral images. However, it should be understood that embodiments described with reference to intraoral scans also apply to lab scans or model/impression scans. A lab scan or model/impression scan may include one or more images of a dental site or of a model or impression of a dental site, which may or may not include height maps, and which may or may not include color images. In embodiments a machine learning model may be trained to identify a margin line from images of a lab scan of model/impression scan, for example.

Some embodiments are discussed with reference to identifying, marking, and/or correcting margin lines in 3D surfaces/models of preparation teeth. However, it should be understood that the techniques discussed herein with reference to margin lines can also be used for identifying, marking and/or correcting of other features at dental sites. One example of such features includes an emergent profile of a tooth.

FIG. 1 illustrates one embodiment of a system 100 for performing intraoral scanning and/or generating a virtual three-dimensional model and/or surface of an intraoral site. In one embodiment, one or more components of system 100 carries out one or more operations described below with reference to FIGS. 2-19.

System 100 includes a dental office 108 and a dental lab 110. The dental office 108 and the dental lab 110 each include a computing device 105, 106, where the computing devices 105, 106 may be connected to one another via a network 180. The network 180 may be a local area network (LAN), a public wide area network (WAN) (e.g., the Internet), a private WAN (e.g., an intranet), or a combination thereof.

Computing device 105 may be coupled to an intraoral scanner 150 (also referred to as a scanner) and/or a data store 125. Computing device 106 may also be connected to a data store (not shown). The data stores may be local data stores and/or remote data stores. Computing device 105 and computing device 106 may each include one or more processing devices, memory, secondary storage, one or more input devices (e.g., such as a keyboard, mouse, tablet, and so on), one or more output devices (e.g., a display, a printer, etc.), and/or other hardware components.

In one embodiment, scanner 150 is wirelessly connected to computing device 105 via a direct wireless connection. In one embodiment, scanner 150 is wirelessly connected to computing device 105 via a wireless network. In one embodiment, the wireless network is a Wi-Fi network. In one embodiment, the wireless network is a Bluetooth network, a Zigbee network, or some other wireless network. In one embodiment, the wireless network is a wireless mesh network, examples of which include a Wi-Fi mesh network, a Zigbee mesh network, and so on. In an example, computing device 105 may be physically connected to one or more wireless access points and/or wireless routers (e.g., Wi-Fi access points/routers). Intraoral scanner 150 may include a wireless module such as a Wi-Fi module, and via the wireless module may join the wireless network via the wireless access point/router.

In embodiments, scanner 150 includes an inertial measurement unit (IMU). The IMU may include an accelerometer, a gyroscope, a magnetometer, a pressure sensor and/or other sensor. For example, scanner 150 may include one or more micro-electromechanical system (MEMS) IMU. The IMU may generate inertial measurement data (referred to herein as movement data or motion data), including acceleration data, rotation data, and so on.

Intraoral scanner 150 may include a probe (e.g., a hand held probe) for optically capturing three-dimensional structures. The intraoral scanner 150 may be used to perform an intraoral scan of a patient's oral cavity. An intraoral scan application 115 running on computing device 105 may communicate with the scanner 150 to effectuate the intraoral scan. A result of the intraoral scan may be intraoral scan data 135A, 135B through 135N that may include one or more sets of intraoral scans. Each intraoral scan may include a two-dimensional (2D) image that includes depth information (e.g., via a height map of a portion of a dental site) and/or may include a 3D point cloud. In either case, each intraoral scan includes x, y and z information. Some intraoral scans, such as those generated by confocal scanners, include 2D height maps. In one embodiment, the intraoral scanner 150 generates numerous discrete (i.e., individual) intraoral scans. Sets of discrete intraoral scans may be merged into a smaller set of blended intraoral scans, where each blended intraoral scan is a combination of multiple discrete intraoral scans. Intraoral scan data 135A-N may optionally include one or more color images (e.g., color 2D images) and/or images generated under particular lighting conditions (e.g., 2D ultraviolet (UV) images, 2D infrared (IR) images, 2D near-IR images, 2D fluorescent images, and so on).

The scanner 150 may transmit the intraoral scan data 135A, 135B through 135N to the computing device 105. Computing device 105 may store the intraoral scan data 135A-135N in data store 125.

According to an example, a user (e.g., a practitioner) may subject a patient to intraoral scanning. In doing so, the user may apply scanner 150 to one or more patient intraoral locations. The scanning may be divided into one or more segments. As an example, the segments may include an upper dental arch segment, a lower dental arch segment, a bite segment, and optionally one or more preparation tooth segments. As another example, the segments may include a lower buccal region of the patient, a lower lingual region of the patient, an upper buccal region of the patient, an upper lingual region of the patient, one or more preparation teeth of the patient (e.g., teeth of the patient to which a dental device such as a crown or other dental prosthetic will be applied), one or more teeth which are contacts of preparation teeth (e.g., teeth not themselves subject to a dental device but which are located next to one or more such teeth or which interface with one or more such teeth upon mouth closure), and/or patient bite (e.g., scanning performed with closure of the patient's mouth with the scan being directed towards an interface area of the patient's upper and lower teeth). Via such scanner application, the scanner 150 may provide intraoral scan data 135A-N to computing device 105. The intraoral scan data 135A-N may be provided in the form of intraoral scan data sets, each of which may include 3D point clouds, 2D images and/or 3D images of particular teeth and/or regions of an intraoral site. In one embodiment, separate data sets are created for the maxillary arch, for the mandibular arch, for a patient bite, and for each preparation tooth. Alternatively, a single large data set is generated (e.g., for a mandibular and/or maxillary arch). Such scans may be provided from the scanner 150 to the computing device 105 in the form of one or more points (e.g., one or more point clouds).

The manner in which the oral cavity of a patient is to be scanned may depend on the procedure to be applied thereto. For example, if an upper or lower denture is to be created, then a full scan of the mandibular or maxillary edentulous arches may be performed. In contrast, if a bridge is to be created, then just a portion of a total arch may be scanned which includes an edentulous region, the neighboring preparation teeth (e.g., abutment teeth) and the opposing arch and dentition. Additionally, the manner in which the oral cavity is to be scanned may depend on a doctor's scanning preferences and/or patient conditions. For example, some doctors may perform an intraoral scan (e.g., in a standard preparation scanning mode) after using a retraction cord to expose a margin line of a preparation. Other doctors may use a partial retraction scanning technique in which only portions of the margin line are exposed and scanned at a time (e.g., performing a scan in a partial retraction scanning mode).

By way of non-limiting example, dental procedures may be broadly divided into prosthodontic (restorative) and orthodontic procedures, and then further subdivided into specific forms of these procedures. Additionally, dental procedures may include identification and treatment of gum disease, sleep apnea, and intraoral conditions. The term prosthodontic procedure refers, inter alia, to any procedure involving the oral cavity and directed to the design, manufacture or installation of a dental prosthesis at a dental site within the oral cavity (intraoral site), or a real or virtual model thereof, or directed to the design and preparation of the intraoral site to receive such a prosthesis. A prosthesis may include any restoration such as crowns, veneers, inlays, onlays, implants and bridges, for example, and any other artificial partial or complete denture. The term orthodontic procedure refers, inter alia, to any procedure involving the oral cavity and directed to the design, manufacture or installation of orthodontic elements at a intraoral site within the oral cavity, or a real or virtual model thereof, or directed to the design and preparation of the intraoral site to receive such orthodontic elements. These elements may be appliances including but not limited to brackets and wires, retainers, clear aligners, or functional appliances.

For many prosthodontic procedures (e.g., to create a crown, bridge, veneer, etc.), a preparation tooth is created (e.g., by grinding a portion of a tooth to a stump). The preparation tooth has a margin line that can be important to proper fit of a dental prosthesis. After the preparation tooth is created, a practitioner performs operations to ready that preparation tooth for scanning. Readying the preparation tooth for scanning may include wiping blood, saliva, etc. off of the preparation tooth and/or separating a patient's gum from the preparation tooth to expose the margin line.

In some instances, a practitioner will perform a standard preparation (full retraction) technique to expose an entirety of the margin line at once by inserting a cord around the preparation tooth between the preparation tooth and the patient's gum and then removing the cord before generating a set of intraoral scans of the preparation tooth. The soft tissue of the gum will then revert back to its natural position, and in many cases collapses back over the margin line, after a brief time period. Accordingly, some of intraoral scan data 135A-N may include images that were taken before the gum has collapsed over the margin line, and other intraoral scan data 135A-N may include images that were taken after the gum has collapsed over the martin line.

In some instances a dental practitioner performs a partial retraction scanning technique. For the partial retraction scanning technique, the gingiva is pushed aside by a tool to expose a small section of the margin line of the sub-gingival preparation. That small section is scanned, and the tool is moved, allowing the small section of the gingiva to collapse back over margin line and exposing another small section of the margin line. Accordingly, readying the preparation tooth for scanning may include using a tool to expose just a portion of the margin line, which is then scanned while it is exposed. Readying the preparation tooth may then include using the tool to expose another portion of the margin line, which is scanned while it is exposed. This process may continue until all of the margin line has been scanned.

Examples of tools that may be used to expose a portion of the margin line at a time include a dental probe, a dental spatula, a triple syringe, an air gun, dental floss, a water gun, and so on. In some embodiments, specific tools are developed for exposing one or more portions of the margin line around one or more teeth (e.g., a first tool for exposing an interproximal portion of a margin line, a second tool for exposing a lingual portion of a margin line, and so on). Different tools developed for exposing different portions of the margin line of a tooth may have protrusions, lengths, probes, spatulas, etc. with different lengths, widths, angles, and so on.

During intraoral scanning, intraoral scan application 115 may register and stitch together two or more intraoral scans (e.g., intraoral scan data 135A and intraoral scan data 135B) generated thus far from the intraoral scan session. In one embodiment, performing registration includes capturing 3D data of various points of a surface in multiple scans, and registering the scans by computing transformations between the scans. One or more 3D surfaces may be generated based on the registered and stitched together intraoral scans during the intraoral scanning. The one or more 3D surfaces may be output to a display so that a doctor or technician can view their scan progress thus far.

As each new intraoral scan is captured and registered to previous intraoral scans and/or a 3D surface, the one or more 3D surfaces may be updated, and the updated 3D surface(s) may be output to the display. In embodiments, segmentation is performed on the intraoral scans and/or the 3D surface to segment points and/or patches on the intraoral scans and/or 3D surface into one or more classifications. In one embodiment, intraoral scan application 115 classifies points as hard tissue or as soft tissue. The 3D surface may then be displayed using the classification information. For example, hard tissue may be displayed using a first visualization (e.g., an opaque visualization) and soft tissue may be displayed using a second visualization (e.g., a transparent or semi-transparent visualization).

In embodiments, separate 3D surfaces are generated for the upper jaw and the lower jaw. This process may be performed in real time or near-real time to provide an updated view of the captured 3D surfaces during the intraoral scanning process.

When a scan session or a portion of a scan session associated with a particular scanning role or segment (e.g., upper jaw role, lower jaw role, bite role, etc.) is complete (e.g., all scans for an intraoral site or dental site have been captured), intraoral scan application 115 may automatically generate a virtual 3D model of one or more scanned dental sites (e.g., of an upper jaw and a lower jaw). The final 3D model may be a set of 3D points and their connections with each other (i.e., a mesh). In some embodiments, the final 3D model is a volumetric 3D model that has both surface and internal features. In embodiments, the 3D model is a volumetric model generated as described in International Publication No. WO2019147984, filed Jan. 25, 2019 and published Aug. 1, 2019, which is incorporated by reference herein in its entirety.

To generate the virtual 3D model, intraoral scan application 115 may register and stitch together the intraoral scans generated from the intraoral scan session that are associated with a particular scanning role or segment. The registration performed at this stage may be more accurate than the registration performed during the capturing of the intraoral scans, and may take more time to complete than the registration performed during the capturing of the intraoral scans. In one embodiment, performing scan registration includes capturing 3D data of various points of a surface in multiple scans, and registering the scans by computing transformations between the scans. The 3D data may be projected into a 3D space of a 3D model to form a portion of the 3D model. The intraoral scans may be integrated into a common reference frame by applying appropriate transformations to points of each registered scan and projecting each scan into the 3D space.

In one embodiment, registration is performed for adjacent or overlapping intraoral scans (e.g., each successive frame of an intraoral video). In one embodiment, registration is performed using blended scans. Registration algorithms are carried out to register two adjacent or overlapping intraoral scans (e.g., two adjacent blended intraoral scans) and/or to register an intraoral scan with a 3D model, which essentially involves determination of the transformations which align one scan with the other scan and/or with the 3D model. Registration may involve identifying multiple points in each scan (e.g., point clouds) of a scan pair (or of a scan and the 3D model), surface fitting to the points, and using local searches around points to match points of the two scans (or of the scan and the 3D model). For example, intraoral scan application 115 may match points of one scan with the closest points interpolated on the surface of another scan, and iteratively minimize the distance between matched points. Other registration techniques may also be used.

Intraoral scan application 115 may repeat registration for all intraoral scans of a sequence of intraoral scans to obtain transformations for each intraoral scan, to register each intraoral scan with previous intraoral scan(s) and/or with a common reference frame (e.g., with the 3D model). Intraoral scan application 115 may integrate intraoral scans into a single virtual 3D model by applying the appropriate determined transformations to each of the intraoral scans. Each transformation may include rotations about one to three axes and translations within one to three planes.

In many instances, data from one or more intraoral scans does not perfectly correspond to data from one or more other intraoral scans. Accordingly, in embodiments intraoral scan application 115 may process intraoral scans (e.g., which may be blended intraoral scans) to determine which intraoral scans (or which portions of intraoral scans) to use for portions of a 3D model (e.g., for portions representing a particular dental site). Intraoral scan application 115 may use data such as geometric data represented in scans and/or time stamps associated with the intraoral scans to select optimal intraoral scans to use for depicting a dental site or a portion of a dental site (e.g., for depicting a margin line of a preparation tooth). In one embodiment, images are input into a machine learning model that has been trained to select and/or grade scans of dental sites. In one embodiment, one or more scores are assigned to each scan, where each score may be associated with a particular dental site and indicate a quality of a representation of that dental site in the intraoral scans. In one embodiment, a user selects one or more 2D images that provide a clear and accurate depiction of at least a portion of a margin line (or other feature of a dental site). A time stamp associated with the one or more selected 2D images is determined and used to apply a weighting and/or grade to intraoral scans (based on proximity in time to the time stamp of the selected 2D images) for constructing or showing at least the portion of the margin line.

Additionally, or alternatively, intraoral scans may be assigned weights based on scores assigned to those scans (e.g., based on proximity in time to a time stamp of one or more selected 2D images). Assigned weights may be associated with different dental sites. In one embodiment, a weight may be assigned to each scan (e.g., to each blended scan) for a dental site (or for multiple dental sites). During model generation, conflicting data from multiple intraoral scans may be combined using a weighted average to depict a dental site. The weights that are applied may be those weights that were assigned based on quality scores for the dental site. For example, processing logic may determine that data for a particular overlapping region from a first set of intraoral scans is superior in quality to data for the particular overlapping region of a second set of intraoral scans. The first intraoral scan data set may then be weighted more heavily than the second intraoral scan data set when averaging the differences between the intraoral scan data sets. For example, the first intraoral scans assigned the higher rating may be assigned a weight of 70% and the second intraoral scans may be assigned a weight of 30%. Thus, when the data is averaged, the merged result will look more like the depiction from the first intraoral scan data set and less like the depiction from the second intraoral scan data set.

In one embodiment, images and/or intraoral scans are input into a machine learning model that has been trained to select and/or grade images and/or intraoral scans of dental sites. In one embodiment, one or more scores are assigned to each image and/or intraoral scan, where each score may be associated with a particular dental site and indicate a quality of a representation of that dental site in the 2D image and/or intraoral scan. Once a set of images is selected for use in generating a portion of a 3D model/surface that represents a particular dental site (or a portion of a particular dental site), those images/scans and/or portions of those images/scans may be locked. Locked images or portions of locked images that are selected for a dental site may be used exclusively for creation of a particular region of a 3D model (e.g., for creation of the associated tooth in the 3D model).

Intraoral scan application 115 may generate one or more 3D surfaces and/or 3D models from intraoral scans, and may display the 3D surfaces and/or 3D models to a user (e.g., a doctor) via a user interface. The 3D surfaces and/or 3D models can then be checked visually by the doctor. The doctor can virtually manipulate the 3D surfaces and/or 3D models via the user interface with respect to up to six degrees of freedom (i.e., translated and/or rotated with respect to one or more of three mutually orthogonal axes) using suitable user controls (hardware and/or virtual) to enable viewing of the 3D model from any desired direction. The doctor may review (e.g., visually inspect) the generated 3D surface and/or 3D model of an intraoral site and determine whether the 3D surface and/or 3D model is acceptable (e.g., whether a margin line of a preparation tooth is accurately represented in the 3D model).

Once a 3D model of a dental site (e.g., of a dental arch or a portion of a dental arch including a preparation tooth) is generated, it may be sent to dental modeling logic 116 for review, analysis and/or updating. Additionally, or alternatively, one or more operations associated with review, analysis and/or updating of the 3D model may be performed by intraoral scan application 115.

Intraoral scan application 115 and/or dental modeling logic 116 may include an intraoral scan analyzer 118 and/or a 2D image analyzer 119. Intraoral scan analyzer 118 may include logic for analyzing 2D images and automatically identifying (e.g., highlighting) a margin line in a 2D image. 2D image analyzer 119 may include logic for analyzing a 3D surface or model and automatically identifying a margin line in the 3D surface or model. Intraoral scan analyzer 118 may further include logic may updating a margin line on the 3D surface based on a determined margin line in one or more 2D images. Intraoral scan analyzer 118 may additionally include logic for modifying a 3D surface/model (e.g., of a preparation tooth) based on data from one or more 2D images.

The marked margin line on the 3D surface/model may make it easier for the doctor to inspect the margin line for accuracy. Intraoral scan application 115 and/or dental modeling logic 116 may additionally mark and/or highlight specific segments of the margin line that are unclear, uncertain, and/or indeterminate. Additionally, or alternatively, intraoral scan application 115 and/or dental modeling logic 116 may mark and/or highlight specific areas (e.g., a surface) that is unclear, uncertain and/or indeterminate. For example, segments of the margin line that are acceptable may be shown in a first color (e.g., green), while segments of the margin line that are unacceptable may be shown in a second color (e.g., red). In one embodiment, a first trained machine learning model is used to identify a margin line in a preparation tooth.

Intraoral scan application 115 and/or dental modeling logic 116 may additionally or alternatively include logic for automatically correcting a surface of a tooth in an image and/or 3D model of the tooth and/or for modifying a margin line of a preparation tooth that is unacceptable. This may be referred to as "virtual cleanup" or "sculpting" of the margin line. An updated margin line (e.g., a virtually cleaned up or sculpted margin line) may be indicated in the modified image and/or the modified 3D model. A doctor may inspect the modified margin line to determine if it is accurate.

In an example, a part of a real margin line of a scanned preparation tooth may not be sufficiently clearly defined in the 3D model. For example, during the initial 3D data collection step, for example via scanning, that resulted in the first 3D virtual model being generated, a part of the physical dental surface may have been covered with foreign material, such as for example saliva, blood, or debris. The part of the physical dental surface may also have been obscured by another element such as for example part of the gums, cheek, tongue, dental instruments, artifacts, etc. Alternatively, for example, during the initial 3D data collection step (e.g., via scanning) that resulted in the first virtual 3D model being generated, the region may have been distorted or otherwise defective and may not properly correspond to a physical dental surface (e.g., due to some defect in the actual scanning process). 2D images that were generated during intraoral scanning may be analyzed by 2D image analyzer 119, and a determination may be made that the 2D images clearly show the part of the dental surface that was obscured, distorted, or that is otherwise defective. Dental modeling logic 116 may then perform automatic correction of the 3D surface or model based on the 2D images that clearly show the part of the dental surface that was obscured, distorted, or otherwise defective.

Once the doctor (e.g., dentist) has determined that the 3D model is acceptable, the doctor may instruct computing device 105 to send the 3D model to computing device 106 of dental lab 110. Computing device 106 may include dental modeling application 116 that may analyze the 3D model to determine if it is adequate for manufacture of a dental prosthetic. Dental modeling application 126 may include logic to identify the margin line and/or to modify the surface of one or more dental sites and/or to modify a margin line, as discussed with reference to dental modeling application 116 on computing device 105. If the 3D model is deemed suitable (or can be modified such that it is placed into a condition that is deemed suitable), then the dental prosthetic may be manufactured from the 3D model. If the 3D model cannot be placed into a suitable condition, then instructions may be sent back to the dental office 108 to generate one or more additional intraoral scans of one or more regions of the dental site.

FIGS. 2-19 illustrate methods related to intraoral scanning and generation and manipulation of virtual 3D models of dental sites. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing dental modeling application, such as dental modeling application 2050 of FIG. 20. The dental modeling application 2050 may be, for example, a component of an intraoral scanning apparatus that includes a handheld intraoral scanner and a computing device operatively coupled (e.g., via a wired or wireless connection) to the handheld intraoral scanner. Alternatively, or additionally, the dental modeling application may execute on a computing device at a dentist office or dental lab.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 2:
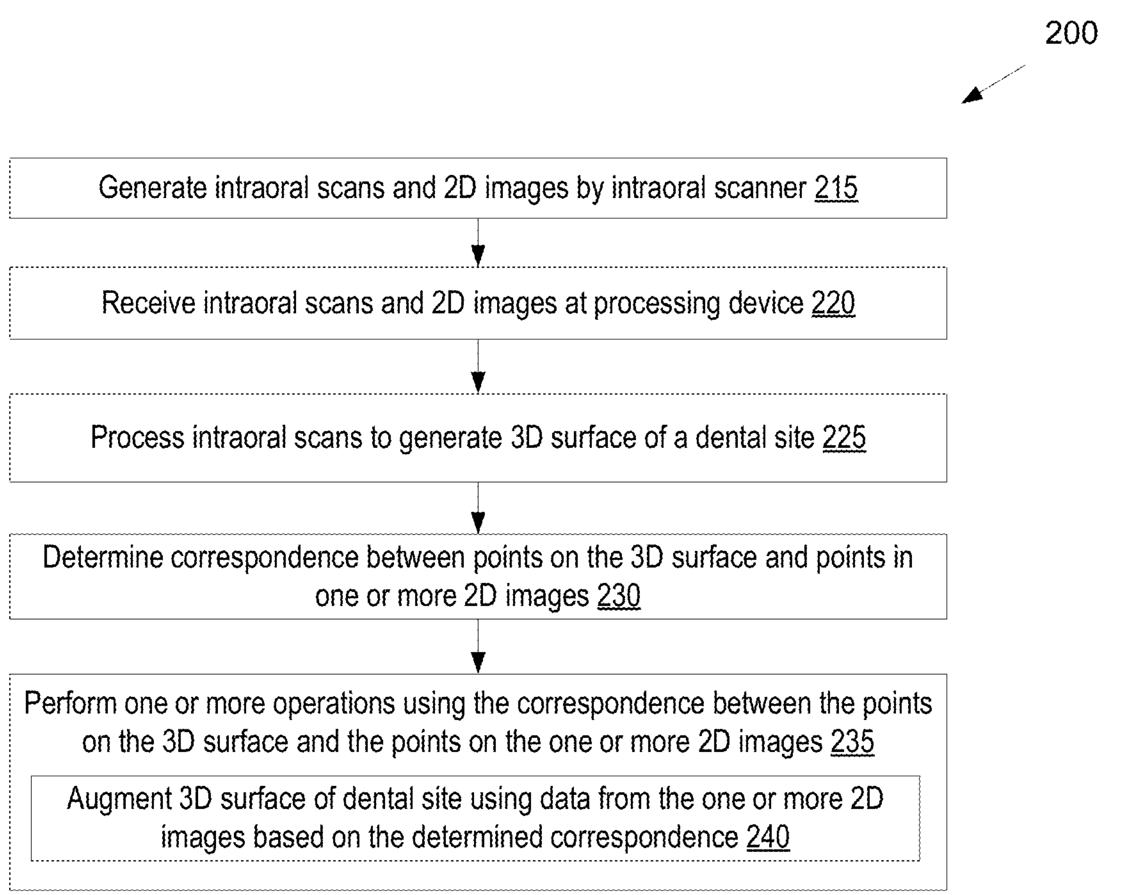
FIG. 2 illustrates a flow diagram for a method of augmenting a 3D surface of a dental site using 2D images, in accordance with an embodiment.

FIG. 2 illustrates a flow diagram for a method 200 of augmenting a 3D surface of a dental site using 2D images, in accordance with an embodiment. At block 215 of method 200, an intraoral scanner generates a sequence of intraoral scans and 2D images. The intraoral scanner may alternate between generation of intraoral scans (which contain 3D information) and one or more types of 2D intraoral images. Each of the intraoral scans may therefore be associated with one or more 2D images generated close in time to when the intraoral scans were generated. The 2D images may contain more dense data (e.g., data for more points of a dental site) than a single intraoral scan in some embodiments. The 2D images may include, for example, color 2D images, NIRI 2D images, fluorescent 2D images, ultraviolet 2D images, and so on. At block 220, a processing device (e.g., of a computing device) receives the intraoral scans and the 2D images.

At block 225, processing logic processes the intraoral scans to generate a 3D surface of a scanned dental site. This may include performing registration and stitching between the intraoral scans. If intraoral scanning is complete, then the 3D surface may be a virtual 3D model of the dental site.

At block 230, processing logic determines correspondence between points on the 3D surface and points in one or more 2D images. For each 2D image, a trajectory may be determined using one or more 3D scans generated before the 2D image was generated and one or more 3D scans generated after the 2D image was generated. The trajectory may then be used to interpolate a position and orientation of the 2D image and/or the camera that generated the 2D image relative to positions and orientations of points on the 3D surface (or relative to the position and orientation of the camera at the time that the intraoral scans were generated). In some embodiments, inertial measurement data (e.g., acceleration data and/or rotation data) may be generated by the IMU of the intraoral scanner, and may be used together with the interpolation to determine accurate positions and orientations associated with each 2D image. In some embodiments, registration is performed between each of the 2D images and the 3D surface. The registration may be used to determine a position and orientation of points in the 2D image relative to points on the 3D surface. Such registration may be used to determine a camera position and orientation for each 2D image and/or for each point of the 2D image. In one embodiment, a simultaneous localization and mapping (SLAM) algorithm is used to perform registration between the 2D image and the 3D surface (e.g., by comparing data from the 2D image to data from the 3D surface. In an example, registration between the 2D image and the 3D surface may be performed by finding multiple features in both the 2D image and the 3D model (possibly from multiple cameras), finding correspondence between those features, and finding a best camera position for that correspondence. In one embodiment, the technique described in Nathan Crombez et al., "Multimodal 2D Image to 3D Model Registration via a Mutual Alignment of Sparse and Dense Visual Features," IEEE International Conference on Robotics and Automation—ICRA, 2018, May 2018, Brisbane, Australia, pp. 6316-6322, is used for registration, the contents of which are incorporated by reference herein.

In embodiments, a camera position and orientation is determined for each 2D image and stored as metadata for the 2D image and/or in a separate data store and/or file (e.g., in a table of camera positions/orientations). Additionally, in embodiments a "camera model" may be determined for each camera of an intraoral scanner that is used to generate 2D images. Each camera may be associated with a different camera model, and each camera model may be assigned a unique camera model identifier (ID). For each image, an camera model ID associated with the camera that captured that image may be stored as metadata for the 2D image or in a separate data store and/or file. A "camera model" may be a pinhole model or other model which can be used to find, for each pixel in an associated 2D image, a ray corresponding to that pixel in object space. For example, a pinhole model with a distortion function or a more complicated raxel model may be used as the camera model. Camera models may be generated for cameras of an intraoral scanner during calibration of the intraoral scanner (e.g., using a specialized jig).

At block 235, processing logic performs one or more operations using the correspondence between the points on the 3D surface and the points on the one or more 2D images. In one embodiment, at block 240 processing logic augments the 3D surface of the dental site using data from the one or more 2D images based on the determined correspondence. This may include, for example, determining a 3D surface portion from the 2D images and modifying the 3D surface to include the determined 3D surface portion. This may additionally or alternatively include determining a feature (e.g., a margin line) from the 2D images and marking that feature (e.g., margin line) on the 3D surface.

Figure 3A:
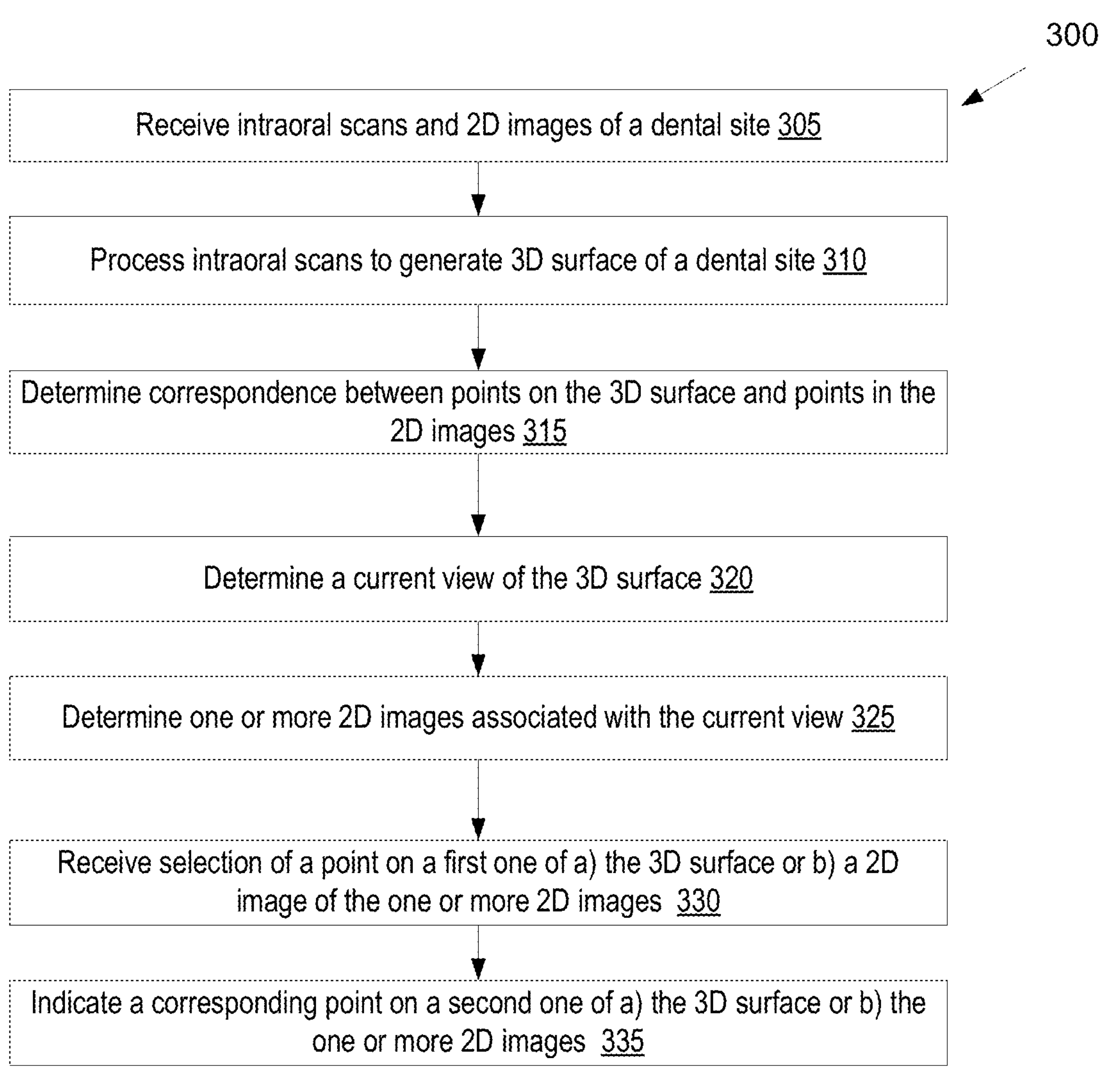
FIG. 3A illustrates a flow diagram for a method of mapping 2D images of a dental site to a 3D surface of the dental site and using the mapping, in accordance with an embodiment.

FIG. 3A illustrates a flow diagram for a method 300 of mapping 2D images of a dental site to a 3D surface of the dental site and using the mapping, in accordance with an embodiment. At block 305, processing logic receives intraoral scans and 2D images generated by an intraoral scanner. The intraoral scanner may alternate between generation of intraoral scans (which contain 3D information) and one or more types of 2D intraoral images. The 2D images may include, for example, color 2D images, NIRI 2D images, fluorescent 2D images, ultraviolet 2D images, and so on.

At block 310, processing logic processes the intraoral scans to generate a 3D surface of a scanned dental site. This may include performing registration and stitching between the intraoral scans. If intraoral scanning is complete, then the 3D surface may be a virtual 3D model of the dental site.

At block 315, processing logic determines correspondence between points on the 3D surface and points in the 2D images. For each 2D image, a trajectory may be determined using one or more 3D scans generated before the 2D image was generated and one or more 3D scans generated after the 2D image was generated. The trajectory may then be used to interpolate a position and orientation of the 2D image and/or the camera that generated the 2D image relative to positions and orientations of points on the 3D surface (or relative to the position and orientation of the camera at the time that the intraoral scans were generated). In some embodiments, registration is performed between each of the 2D images and the 3D surface. The registration may be used to determine a position and orientation of points in the 2D image relative to points on the 3D surface. Such registration may be used to determine a camera position and orientation for each 2D image and/or for each point of the 2D image. In embodiments, a camera position and orientation is determined for each 2D image and stored as metadata for the 2D image and/or in a table of camera positions/orientations.

At block 320, processing logic determines a current view (e.g., direction of view) of the 3D surface. Processing logic may additionally determine a selected point on the 3D surface.

At block 325, processing logic determines one or more 2D images associated with the current view (e.g., direction of view) and/or the selected point on the 3D surface. In some embodiments, processing logic receives a user selection of a point on the 3D surface during a current view of the 3D surface. For each view of the 3D surface and selection of a point on the 3D surface, a camera position and orientation may be determined. A lookup may then be performed to determine one or more 2D image having a camera position and orientation that corresponds to or is closest to the determined camera position and orientation.

At block 330, processing logic may receive selection of a first one of a) a point on the 3D surface orb) a point on a 2D image of the one or more 2D images. At block 335, processing logic determines a corresponding point on a second one of a) the 3D surface or b) the one or more 2D images based on the determined correspondence between the 2D image(s) and the 3D surface. For example, if a point is selected on the 3D surface, then a corresponding points may be determined on each of the determined or selected 2D images. The corresponding points are then indicated in the 3D surface and/or 2D images. For example, if a point is selected on one of the 2D images, then the corresponding points may be determined on the 3D surface and/or on the other determined or selected 2D images. As a user changes a selected point (e.g., moves a mouse cursor) on a 3D surface, for example, an indication of a corresponding point on the 2D images may be updated (e.g., a second cursor may move correspondingly on a 2D image).

Figure 3B:
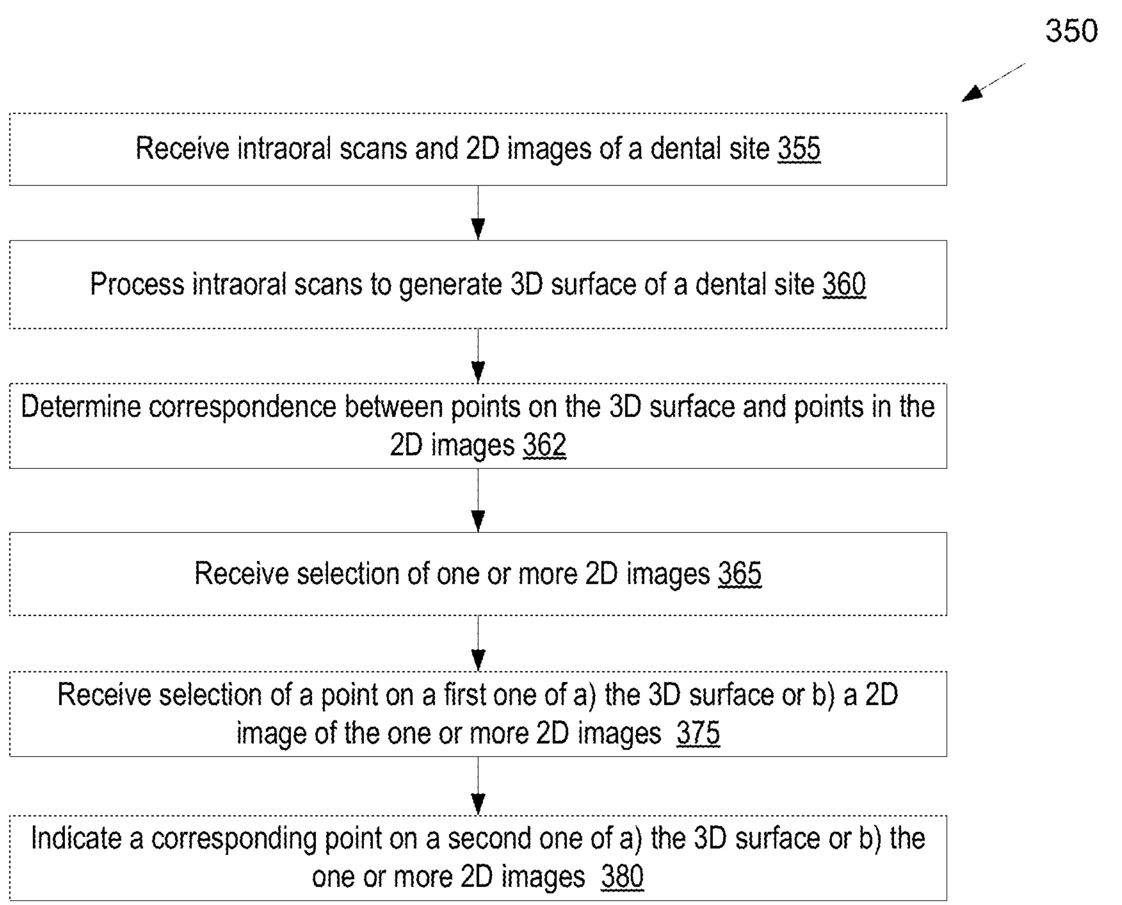
FIG. 3B illustrates a flow diagram for a method of mapping 2D images of a dental site to a 3D surface of the dental site and using the mapping, in accordance with an embodiment.

FIG. 3B illustrates a flow diagram for a method 350 of mapping 2D images of a dental site to a 3D surface of the dental site and using the mapping, in accordance with an embodiment. At block 355, processing logic receives intraoral scans and 2D images generated by an intraoral scanner. The intraoral scanner may alternate between generation of intraoral scans (which contain 3D information) and one or more types of 2D intraoral images. The 2D images may include, for example, color 2D images, NIRI 2D images, fluorescent 2D images, ultraviolet 2D images, and so on.

At block 360, processing logic processes the intraoral scans to generate a 3D surface of a scanned dental site. This may include performing registration and stitching between the intraoral scans. If intraoral scanning is complete, then the 3D surface may be a virtual 3D model of the dental site.

At block 362, processing logic determines correspondence between points on the 3D surface and points in the 2D images. For each 2D image, a trajectory may be determined using one or more 3D scans generated before the 2D image was generated and one or more 3D scans generated after the 2D image was generated. The trajectory may then be used to interpolate a position and orientation of the 2D image and/or the camera that generated the 2D image relative to positions and orientations of points on the 3D surface (or relative to the position and orientation of the camera at the time that the intraoral scans were generated). In some embodiments, registration is performed between each of the 2D images and the 3D surface. The registration may be used to determine a position and orientation of points in the 2D image relative to points on the 3D surface. Such registration may be used to determine a camera position and orientation for each 2D image and/or for each point of the 2D image. In embodiments, a camera position and orientation is determined for each 2D image and stored as metadata for the 2D image and/or in a table of camera positions/orientations.

At block 365, processing logic receives a selection of one or more 2D images. A view of the 3D surface may be output to a display as part of a graphical user interface. A user may move a cursor across the 3D surface and/or otherwise select a point on the 3D surface. As the user moves the cursor, one or more 2D image corresponding to the current view and selected point may be output to the display proximate the 3D surface or overlaid on top of the 3D surface (e.g., over a location that the 2D image registers to). At any time, a user may select a currently viewed 2D image, and that 2D image may be pinned to the display. As the user continues to move the cursor or select new points, new 2D images corresponding to the newly selected points may be shown. However, the pinned image may also continue to be shown.

At block 375, processing logic may receive selection of a first one of a) a point on the 3D surface or b) a point on a 2D image of the one or more 2D images. At block 385, processing logic determines a corresponding point on a second one of a) the 3D surface or b) the one or more 2D images based on the determined correspondence between the 2D image(s) and the 3D surface. For example, if a point is selected on the 3D surface, then a corresponding points may be determined on each of the determined or selected 2D images. The corresponding points are then indicated in the 3D surface and/or 2D images. For example, if a point is selected on one of the 2D images, then the corresponding points may be determined on the 3D surface and/or on the other determined or selected 2D images. As a user changes a selected point (e.g., moves a mouse cursor) on a 3D surface, for example, an indication of a corresponding point on the 2D images may be updated (e.g., a second cursor may move correspondingly on a 2D image).

Figure 4A:
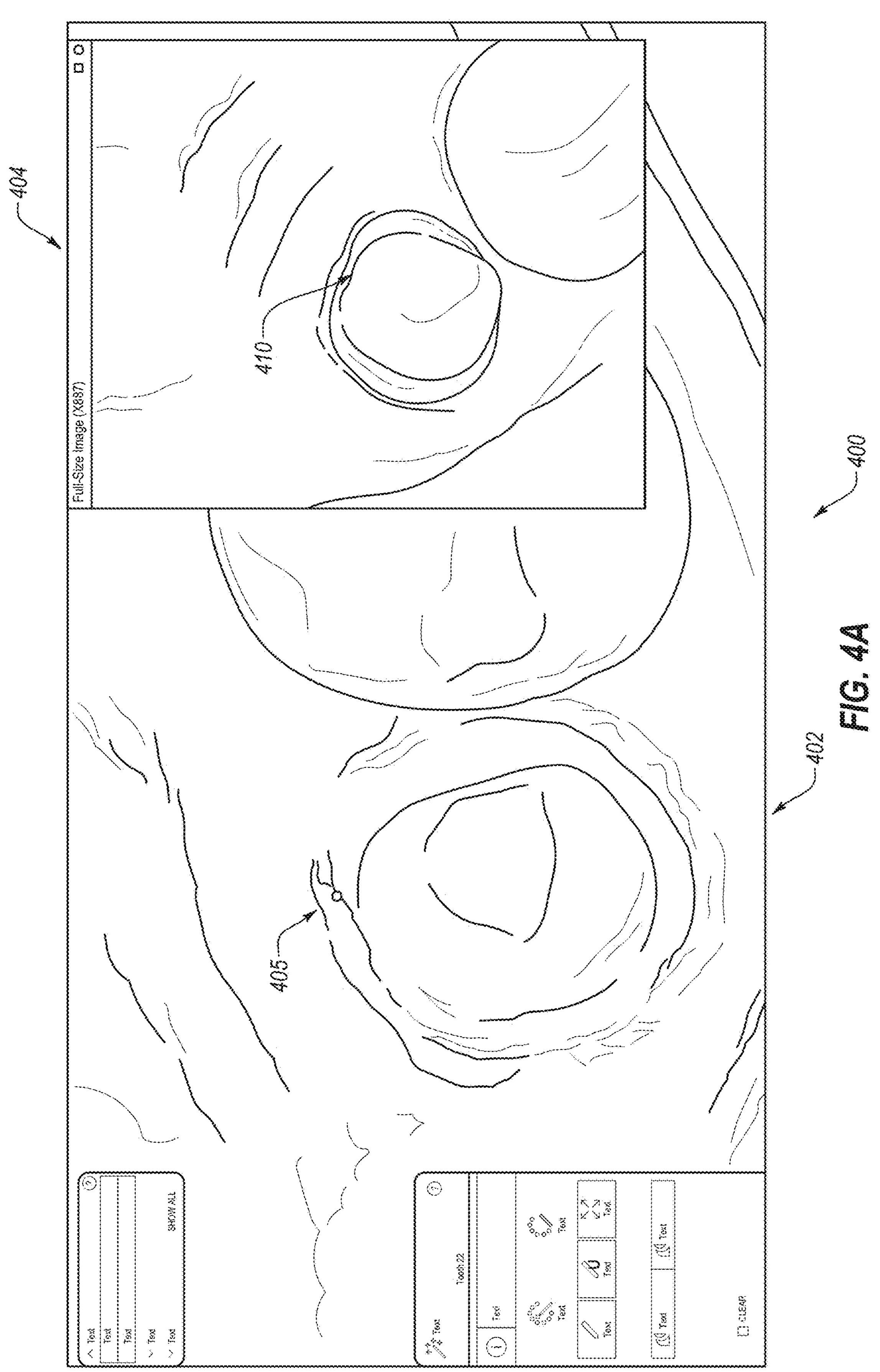
FIG. 4A illustrates a graphical user interface of a dental modeling tool, in accordance with an embodiment.

FIG. 4A illustrates a graphical user interface (GUI) 400 of a dental modeling tool, in accordance with an embodiment. The GUI 400 shows a view of a 3D surface 402 that was generated from intraoral scans. A 2D image 404 is additionally shown in the GUI 400. A user has moved a mouse cursor 410 over a point on the 2D image 404. Processing logic additionally indicates a corresponding point 405 on the 3D surface (e.g., as a colored dot).

Figure 4B:
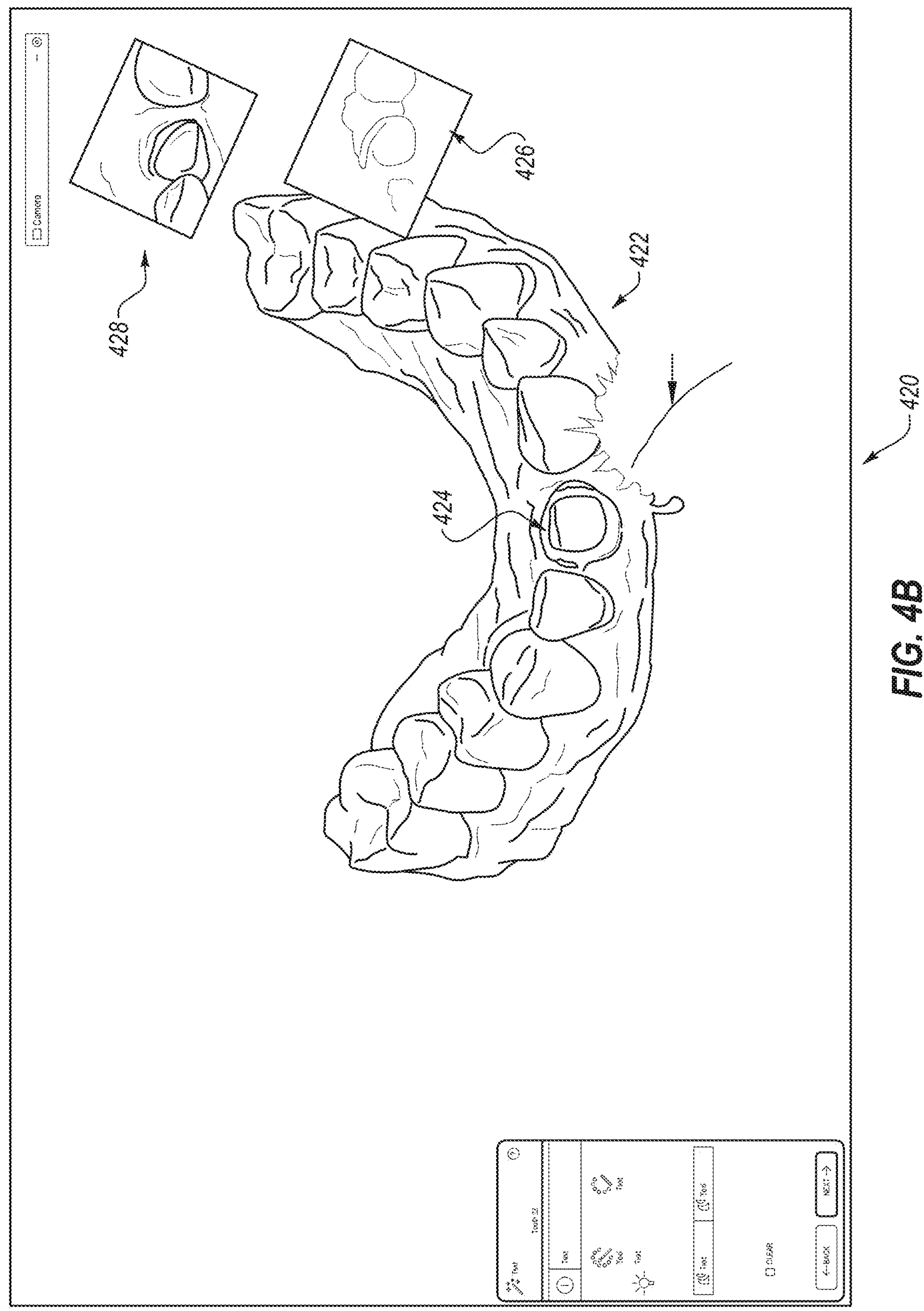
FIG. 4B illustrates a graphical user interface of a dental modeling tool, in accordance with an embodiment.

FIG. 4B illustrates a GUI 420 of a dental modeling tool, in accordance with an embodiment. The GUI 420 shows a view of a 3D surface 422 that was generated from intraoral scans. A color 2D image 428 and a NIRI 2D image 426 are additionally shown in the GUI 420. A user has selected a point 424 on the 3D surface (e.g., by positioning a mouse cursor at the point 424). The color 2D image 428 and NIRI 2D image 426 were determined to be the images that most closely corresponded to the current view of the 3D surface and the selected point on the 3D surface 422. Accordingly, color 2D image 428 and a NIRI 2D image 426 were automatically selected and presented. If the user were to select a new point on the 3D surface, then a new best color 2D image and NIRI 2D image would be selected and presented, optionally replacing the currently shown NIRI 2D image 426 and color 2D image 428.

Figure 4C:
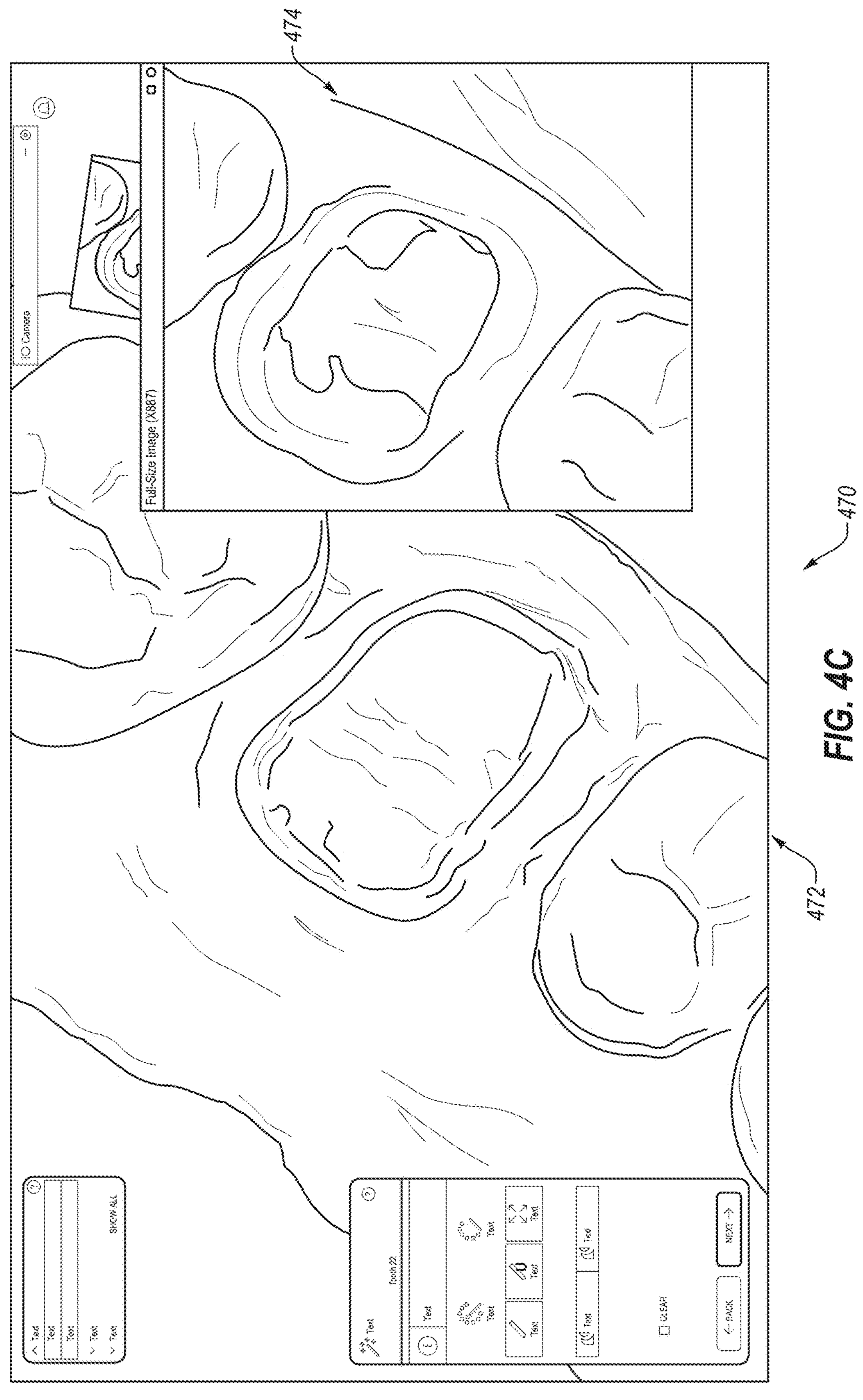
FIG. 4C illustrates a graphical user interface of a dental modeling tool, in accordance with an embodiment.

FIG. 4C illustrates a GUI 470 of a dental modeling tool, in accordance with an embodiment. The GUI 470 shows a view of a 3D surface 472 that was generated from intraoral scans. A 2D image 474 is additionally shown in the GUI 470, where the 2D image 474 is an image that has a closest fit to the current view of the 3D model (and optionally to a current point selected on the 3D model).

In some embodiments, a panoramic image of the patient's dental site (e.g., of the patient's dental arch) may be generated based on registering and stitching together the 2D images. Each point on the panoramic image may be mapped to a corresponding point on the 3D surface. A user may then select any point on the panoramic image, and processing logic may determine the corresponding point on the 3D surface and indicate the determined point on the 3D surface. Similarly, a user may select any point on the 3D surface, and processing logic may determine a corresponding point on the panoramic image and indicate the determined point on the panoramic image.

In one embodiment, processing logic may implement one or more automated agents configured to identify the key camera angles for which to construct a panoramic model, image and/or view. In some implementations, the angle selection engine(s) is configured to generate a sphere (or at least a portion of a sphere) that represents the panoramic model. The angle selection engine(s) can be further configured to triangulate the sphere (or at least a portion of the sphere) into a plurality of triangles, with the vertices of each triangle representing a key camera angle required for building the panoramic model. The angle selection engine(s) may provide key camera angles and/or other data.

An image projection engine(s) may implement one or more automated agents configured to project images from the scan of the subject's teeth to form an initial panoramic model for each key camera angle. The image projection engine(s) may receive images and camera position and/or orientation data from the intraoral scanner. In some implementations, the image projection engine(s) is configured to form a two-dimensional grid of points that includes all the pixel positions needed to construct the panoramic model for a given key camera angle. In one implementation, a two-dimensional grid can be formed by dividing the center jaw line into equidistant segments, forming a line at each segment, and identifying the equidistant points on each line. The lines can be perpendicular to the center jaw line and to the each key camera angle. The point cloud of all camera positions and orientations recorded during the scan can be compared to the points on each line, and the image projection engine(s) can be configured to select the physical camera locations most suitable, for example the camera with orientation closest to the key camera angle for each point of each line. The most suitable image for each point of the two-dimensional grid can be approximated with an orthographic camera to provide images for each of the points of each line, resulting in an initial panoramic model for each key camera angle. Alternatively, other images selection criteria may be employed. The image projection engine(s) may provide the two-dimensional grid of points, the projected images, the initial panoramic model.

Image combining engine(s) may implement one or more automated agents configured to register, deform, and/or blend the images of the initial panoramic model to create a final panoramic model for each key camera angle. In some implementations, the image combining engine(s) is configured to register and/or deform the images in the initial panoramic model to match gradients at the boundaries of adjacent images. The image combining engine(s) may be further configured to blend the resulting images to produce a final panoramic model for each key camera angle. Additionally, the image combining engine may be configured to render the final panoramic model to the user for a chosen key camera angle.

In embodiments, a panoramic image, model and/or view may be generated as described in U.S. Publication No. 2021/0068773, filed Sep. 10, 2020 and published Mar. 11, 2021, entitled "Dental Panoramic Views," which is incorporated by reference herein in its entirety.

Figure 5A:
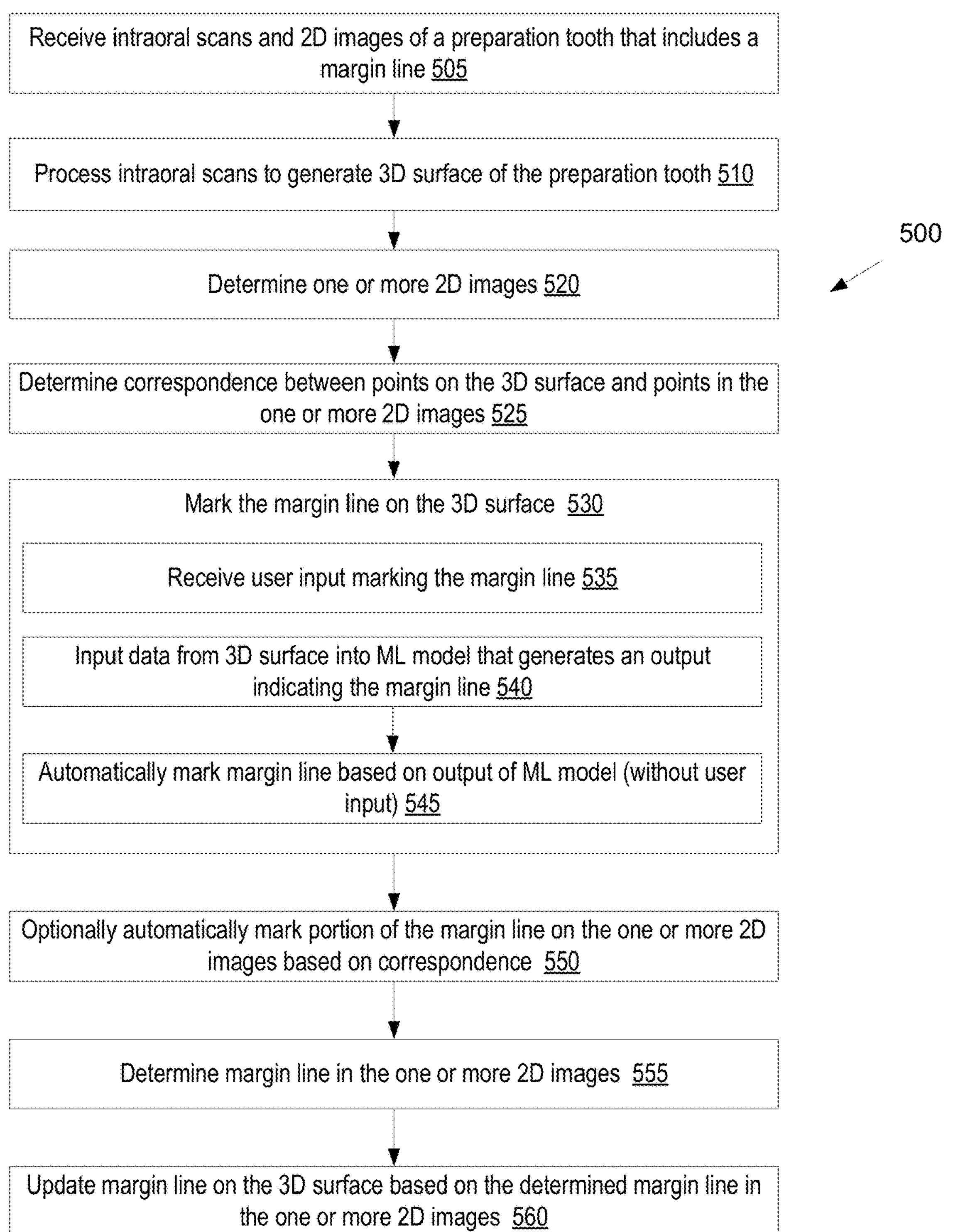
FIG. 5A illustrates a flow diagram for method of marking a margin line on a 3D surface with assistance from 2D images, in accordance with an embodiment.

FIG. 5A illustrates a flow diagram for method 500 of marking a margin line on a 3D surface with assistance from 2D images, in accordance with an embodiment. At block 505 of method 500, processing logic receives intraoral scans and 2D images of a preparation tooth that includes a margin line. The intraoral scans and 2D images are generated by an intraoral scanner and send to a computing device on which processing logic executes. The intraoral scanner may alternate between generation of intraoral scans (which contain 3D information) and one or more types of 2D intraoral images. The 2D images may include, for example, color 2D images, NIRI 2D images, fluorescent 2D images, ultraviolet 2D images, and so on.

At block 510, processing logic processes the intraoral scans to generate a 3D surface of a scanned dental site. This may include performing registration and stitching between the intraoral scans. If intraoral scanning is complete, then the 3D surface may be a virtual 3D model of the dental site.

At block 520, processing logic determines one or more 2D images of the plurality of 2D images that are of interest. The one or more 2D images may be selected by a user in some embodiments. Alternatively, the 2D images may be automatically selected based on one or more selection criteria. In one embodiment, 2D images are input into a model (e.g., a trained machine learning model), which may rate or grade images or groups of images. In one embodiment, 2D images having a highest grade may be automatically selected. In one embodiment, a user cycles through the 2D images and manually chooses those that the user deems to be the best or optimal images (e.g., those images that most clearly depict a margin line).

At block 525, processing logic determines correspondence between points on the 3D surface and points in the 2D images. For each 2D image, a trajectory may be determined using one or more 3D scans generated before the 2D image was generated and one or more 3D scans generated after the 2D image was generated. The trajectory may then be used to interpolate a position and orientation of the 2D image and/or the camera that generated the 2D image relative to positions and orientations of points on the 3D surface (or relative to the position and orientation of the camera at the time that the intraoral scans were generated). In some embodiments, registration is performed between each of the 2D images and the 3D surface. The registration may be used to determine a position and orientation of points in the 2D image relative to points on the 3D surface. Such registration may be used to determine a camera position and orientation for each 2D image and/or for each point of the 2D image. In embodiments, a camera position and orientation is determined for each 2D image and stored as metadata for the 2D image and/or in a table of camera positions/orientations.

At block 530, processing logic marks the margin line on the 3D surface. In one embodiment, a user manually marks the margin line on the 3D surface, such as by tracing the margin line using a margin line tracing tool. In one embodiment, processing logic automatically marks the margin line without user input. In one embodiment, processing logic inputs data from the 3D surface into a trained machine learning model. This may include at block 540 inputting the 3D surface or a portion of the 3D surface into a trained machine learning model that processes 3D data. This may alternatively include at block 540 projecting the 3D surface onto multiple planes to generate images of the 3D surface (e.g., height maps of the 3D image), and then inputting the images into a trained machine learning model that processes 2D data. The trained ML model may output a map indicating, for each point or pixel of input data, whether that point or pixel has a first class representing a margin line or a second class representing something other than a margin line. At block 545, processing logic may use the output of the trained machine learning model to mark the margin line on the 3D model In one embodiment, at block 550 processing logic automatically marks at least a portion of the margin line on the one or more 2D images based on determined correspondence between the 2D images and the 3D surface.

In one embodiment, at block 555 processing logic determines the margin line (or portions thereof) in the one or more 2D images. This may include inputting the 2D images into a trained machine learning model that processes 2D data. The trained ML model may output a map indicating, for each pixel of the 2D image, whether that pixel has a first class representing a margin line or a second class representing something other than a margin line. Processing logic may then mark the margin line in the one or more 2D images based on the output of the trained machine learning model. In one embodiment, two margin line options are shown on the 2D images, where a first margin line option is shown with a first visualization (e.g., a first color) and is based on the margin line determined from the 3D surface and the second margin line option is shown with a second visualization (e.g., a second color) and is based on the margin line determined from the 2D image.

In some embodiments, at block 560 processing logic updates a margin line (e.g., a margin line marking) on the 3D surface based on the determined margin line in the one or more 2D images. In some embodiments, a user may select to use the margin line option determined from the 2D image(s) to update the marking for one or more portions of the margin line on the 2D surface. For example, the user may select one or more regions of one or more images by circling those regions or by simply selecting those images. Processing logic may then automatically determine corresponding margin line curves on the 3D surface and replace the marking of the margin line for those portions selected by the user. In one embodiment, this includes using margin line curves from multiple images and triangulation to determine 3D margin line curves, and then drawing those margin line curves on the 3D surface.

Figure 5B:
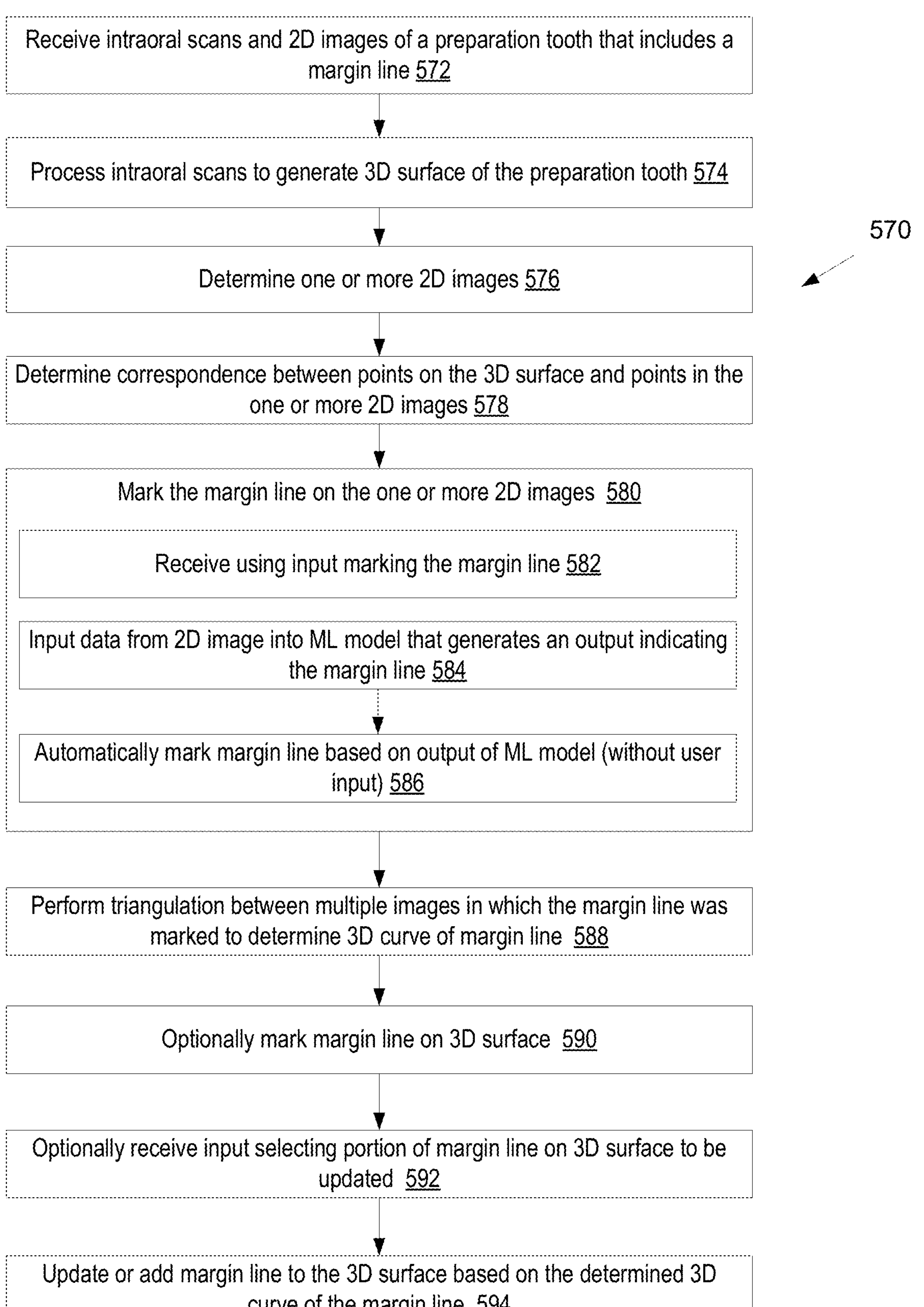
FIG. 5B illustrates a flow diagram for method of marking a margin line on a 3D surface with assistance from 2D images, in accordance with an embodiment.

FIG. 5B illustrates a flow diagram for method 570 of marking a margin line on a 3D surface with assistance from 2D images, in accordance with an embodiment. At block 572 of method 570, processing logic receives intraoral scans and 2D images of a preparation tooth that includes a margin line. The intraoral scans and 2D images are generated by an intraoral scanner and send to a computing device on which processing logic executes. The intraoral scanner may alternate between generation of intraoral scans (which contain 3D information) and one or more types of 2D intraoral images. The 2D images may include, for example, color 2D images, NIRI 2D images, fluorescent 2D images, ultraviolet 2D images, and so on.

At block 574, processing logic processes the intraoral scans to generate a 3D surface of the preparation tooth. This may include performing registration and stitching between the intraoral scans. If intraoral scanning is complete, then the 3D surface may be a virtual 3D model of the preparation tooth.

At block 576, processing logic determines one or more 2D images of the plurality of 2D images that are of interest. The one or more 2D images may be selected by a user in some embodiments. Alternatively, the 2D images may be automatically selected based on one or more selection criteria. In one embodiment, 2D images are input into a model (e.g., a trained machine learning model), which may rate or grade images or groups of images. In one embodiment, 2D images having a highest grade may be automatically selected. In one embodiment, a user cycles through the 2D images and manually chooses those that the user deems to be the best or optimal images (e.g., those images that most clearly depict a margin line).

At block 578, processing logic determines correspondence between points on the 3D surface and points in the 2D images. For each 2D image, a trajectory may be determined using one or more 3D scans generated before the 2D image was generated and one or more 3D scans generated after the 2D image was generated. The trajectory may then be used to interpolate a position and orientation of the 2D image and/or the camera that generated the 2D image relative to positions and orientations of points on the 3D surface (or relative to the position and orientation of the camera at the time that the intraoral scans were generated). In some embodiments, registration is performed between each of the 2D images and the 3D surface. The registration may be used to determine a position and orientation of points in the 2D image relative to points on the 3D surface. Such registration may be used to determine a camera position and orientation for each 2D image and/or for each point of the 2D image. In embodiments, a camera position and orientation is determined for each 2D image and stored as metadata for the 2D image and/or in a table of camera positions/orientations.

At block 580, processing logic marks the margin line (or portions thereof) in the one or more 2D images. This may include at block 584 inputting the 2D images into a trained machine learning model that processes 2D data. The trained ML model may output a map indicating, for each pixel of the 2D image, whether that pixel has a first class representing a margin line or a second class representing something other than a margin line. Processing logic may then mark the margin line in the one or more 2D images based on the output of the trained machine learning model at block 586. This may additionally or alternatively include at block 582 receiving user input marking (e.g., tracing) the margin line in each of the one or more 2D images.

At block 588, processing logic performs triangulation between multiple images in which the margin line was marked to determine a 3D curve of the margin line.

At block 590, processing logic optionally marks the margin line on the 3D surface based on processing of data from the 3D surface and/or based on user input marking the margin line on the 3D surface.

At block 592, processing logic optionally receives input selecting a portion of the margin line on the 3D surface to be updated. This may include the user circling the portion of the margin line in the GUI, for example.

At block 594, processing logic updates or adds a margin line (e.g., a margin line marking) on the 3D surface based on the determined 3D curve of the margin line from the one or more 2D images. In an example, the 3D surface may include a region with missing data (e.g., a void, an area that was obstructed during scanning, and area with low clarity, etc.), which may correspond to a segment of the margin line. Data from the 2D images may be used to fill in the missing data or void of the 3D surface, which may complete or correct the margin line.

Figure 6A:
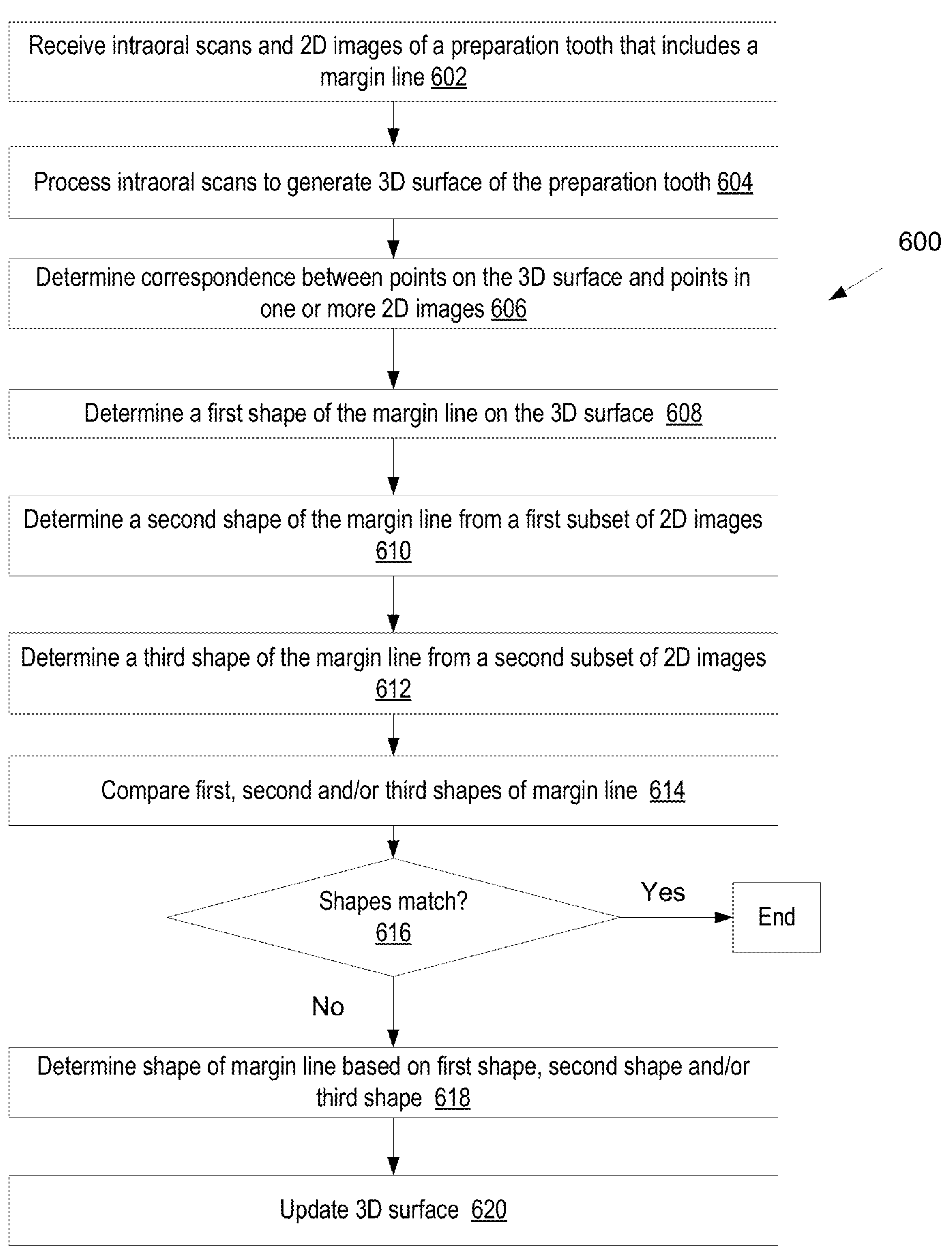
FIG. 6A illustrates a flow diagram for a method of updating a 3D surface of a dental site based on data from 2D images, in accordance with an embodiment.

FIG. 6A illustrates a flow diagram for a method of updating a 3D surface of a dental site based on data from 2D images, in accordance with an embodiment. At block 602 of method 600, processing logic receives intraoral scans and 2D images of a preparation tooth that includes a margin line. The intraoral scans and 2D images are generated by an intraoral scanner and send to a computing device on which processing logic executes. The intraoral scanner may alternate between generation of intraoral scans (which contain 3D information) and one or more types of 2D intraoral images. The 2D images may include, for example, color 2D images, NIRI 2D images, fluorescent 2D images, ultraviolet 2D images, and so on.

At block 604, processing logic processes the intraoral scans to generate a 3D surface of a scanned dental site. This may include performing registration and stitching between the intraoral scans. If intraoral scanning is complete, then the 3D surface may be a virtual 3D model of the dental site.

At block 606, processing logic determines correspondence between points on the 3D surface and points in the 2D images. For each 2D image, a trajectory may be determined using one or more 3D scans generated before the 2D image was generated and one or more 3D scans generated after the 2D image was generated. The trajectory may then be used to interpolate a position and orientation of the 2D image and/or the camera that generated the 2D image relative to positions and orientations of points on the 3D surface (or relative to the position and orientation of the camera at the time that the intraoral scans were generated). In some embodiments, registration is performed between each of the 2D images and the 3D surface. The registration may be used to determine a position and orientation of points in the 2D image relative to points on the 3D surface. Such registration may be used to determine a camera position and orientation for each 2D image and/or for each point of the 2D image. In embodiments, a camera position and orientation is determined for each 2D image and stored as metadata for the 2D image and/or in a table of camera positions/orientations.

At block 608, processing logic determines a first shape of the margin line on the 3D surface. This may include receiving user input tracing the margin line on the 3D surface and/or inputting data from the 3D surface into a trained machine learning model that outputs the first shape of the margin line.

At block 610, processing logic determines a second shape of the margin line from a first subset of the 2D images. This may include receiving user input tracing the margin line on the 2D images and/or inputting data from the 2D images into a trained machine learning model that outputs 2D shapes of the margin line (e.g., as a probability map or mask). The 2D shapes of the margin line may be combined into one or more 3D shapes or curves of the margin line using triangulation.

At block 612, processing logic may determine a third shape of the margin line from a second subset of the 2D images. This may include receiving user input tracing the margin line on the 2D images and/or inputting data from the 2D images into a trained machine learning model that outputs 2D shapes of the margin line (e.g., as a probability map or mask). The 2D shapes of the margin line may be combined into one or more 3D shapes or curves of the margin line using triangulation. Processing logic may additionally determine additional shapes of the margin line from further subsets of the 2D images.

At block 614, processing logic compares the first, second and third (and possibly other) shapes of the margin line. At block 616, processing logic determines whether the multiple shapes of the margin line match. If so, the method ends. If the shapes of the margin line do not match, the method proceeds to block 618.

At block 618, processing logic determines a shape of the margin line based on the first shape, the second shape, the third shape, and/or one or more additional shapes. In some embodiments, a confidence score is determined for each of the shapes of the margin line. Additionally, each of the shapes of the margin line may be divided into segments, and confidence scores may be determined for each of the segments. In some embodiments, a weighted combination of the shapes is generated, wherein weights for each of the shapes and/or segments of shapes are determined based on the associated confidence scores for those shapes and/or segments.

At block 620, the 3D surface may be updated based on the determined shape of the margin line. In one embodiment, the 3D surface is modified (e.g., by moving, pulling, stretching, compressing, etc.) one or more vertexes, lines, etc. on the surface so that the 3D surface has an outline that corresponds to the determined shape of the margin line. In one embodiment, the 3D surface remains unchanged, but the margin line is marked on the 3D surface. In some instances, the margin line marking may not follow contours of the 3D surface.

Figure 6B:
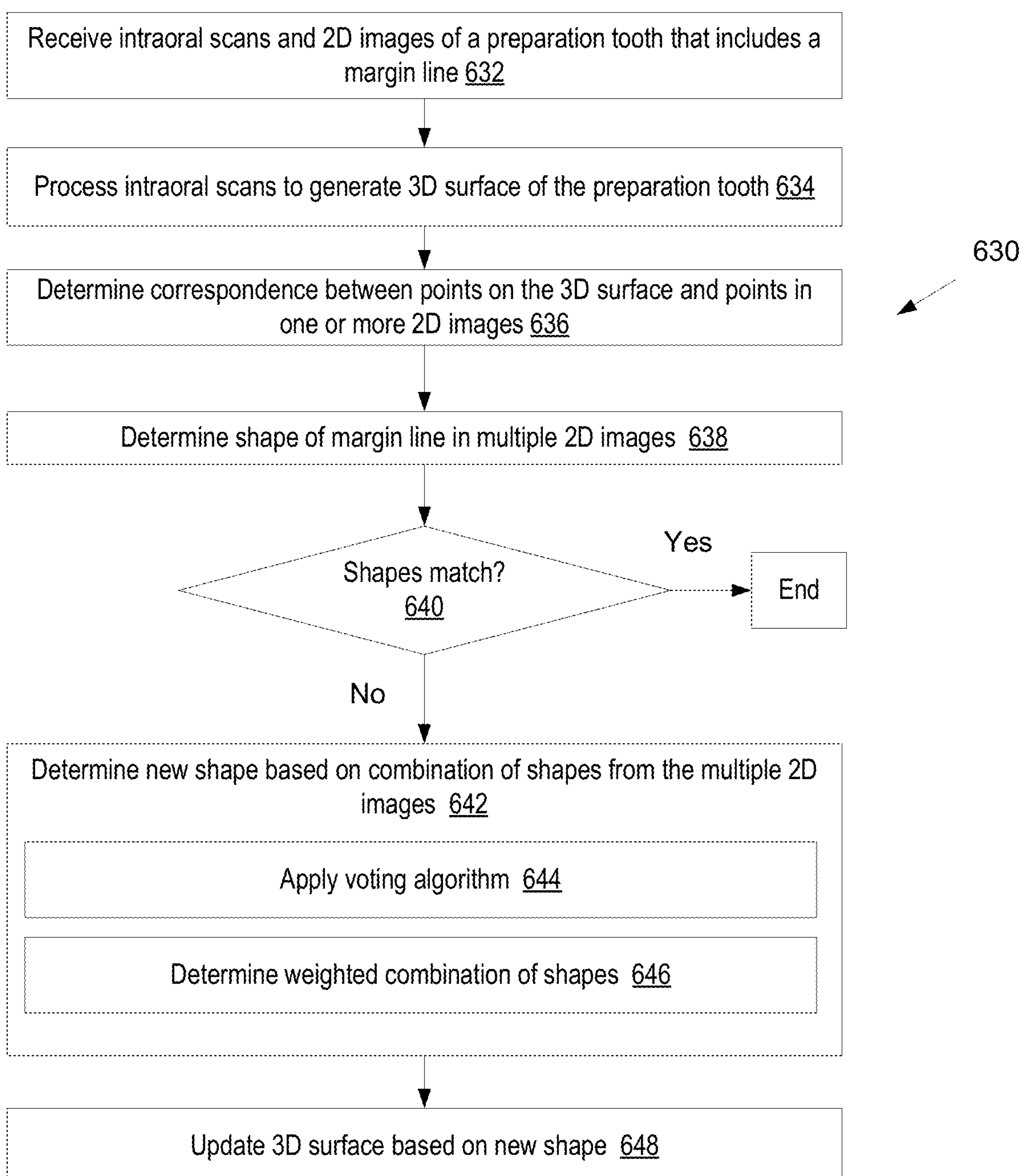
FIG. 6B illustrates a flow diagram for a method of updating a 3D surface of a dental site based on data from 2D images, in accordance with an embodiment.

FIG. 6B illustrates a flow diagram for a method 630 of updating a 3D surface of a dental site based on data from 2D images, in accordance with an embodiment. At block 632 of method 630, processing logic receives intraoral scans and 2D images of a preparation tooth that includes a margin line. The intraoral scans and 2D images are generated by an intraoral scanner and send to a computing device on which processing logic executes. The intraoral scanner may alternate between generation of intraoral scans (which contain 3D information) and one or more types of 2D intraoral images. The 2D images may include, for example, color 2D images, NIRI 2D images, fluorescent 2D images, ultraviolet 2D images, and so on.

At block 634, processing logic processes the intraoral scans to generate a 3D surface of a scanned dental site. This may include performing registration and stitching between the intraoral scans. If intraoral scanning is complete, then the 3D surface may be a virtual 3D model of the dental site.

At block 636, processing logic determines correspondence between points on the 3D surface and points in the 2D images. For each 2D image, a trajectory may be determined using one or more 3D scans generated before the 2D image was generated and one or more 3D scans generated after the 2D image was generated. The trajectory may then be used to interpolate a position and orientation of the 2D image and/or the camera that generated the 2D image relative to positions and orientations of points on the 3D surface (or relative to the position and orientation of the camera at the time that the intraoral scans were generated). In some embodiments, registration is performed between each of the 2D images and the 3D surface. The registration may be used to determine a position and orientation of points in the 2D image relative to points on the 3D surface. Such registration may be used to determine a camera position and orientation for each 2D image and/or for each point of the 2D image. In embodiments, a camera position and orientation is determined for each 2D image and stored as metadata for the 2D image and/or in a table of camera positions/orientations.

At block 638, processing logic determines a shape of the margin line in multiple 2D images (e.g., based on user input and/or application of machine learning).

At block 640, processing logic compares the shapes of the margin line from the multiple 2D images and determines whether the multiple shapes of the margin line match. If so, the method ends. If the shapes of the margin line do not match, the method proceeds to block 642.

At block 642, processing logic determines a shape of the margin line based on a combination of the shapes of the margin line from the multiple 2D images. In one embodiment, at block 644 a voting algorithm is used to determine an ultimate shape of the margin line. Each of the 2D images may indicate a position for a point on the margin line in two dimensions, and may "vote" for that position for the point on the margin line. For each point on the margin line, the votes from each of the 2D images may be tallied, and the position that was voted on by the most 2D images may be determined to be the correct position for that point on the margin line. In one embodiment, at block 646 a weighted combination of the determined shapes of the margin line is computed. Weightings may be based on confidence scores, on proximity in time to one or more images that were selected as having a clear or accurate depiction of the margin line, and/or on other criteria.

At block 648, the 3D surface may be updated based on the determined shape of the margin line. In one embodiment, the 3D surface is modified (e.g., by moving, pulling, stretching, compressing, etc.) one or more vertexes, lines, etc. on the surface so that the 3D surface has an outline that corresponds to the determined shape of the margin line. In one embodiment, the 3D surface remains unchanged, but the margin line is marked on the 3D surface. In some instances, the margin line marking may not follow contours of the 3D surface.

Figure 6D:
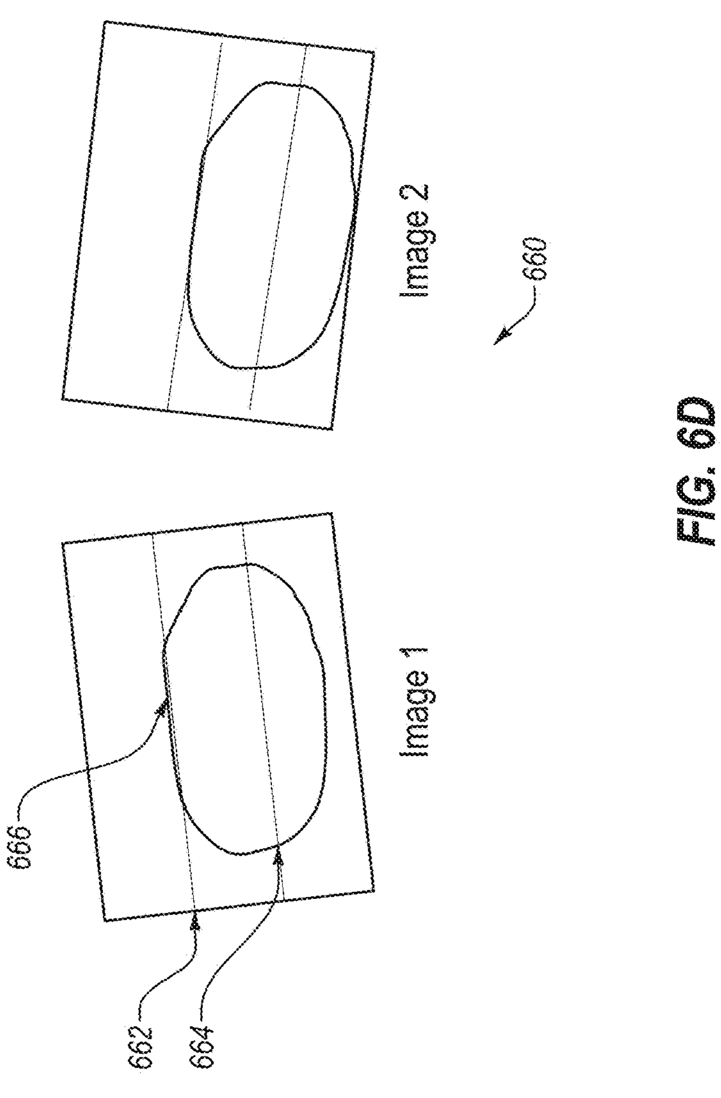
FIG. 6D illustrates images used to determine a portion of a margin line, in accordance with an embodiment.
Figure 6C:
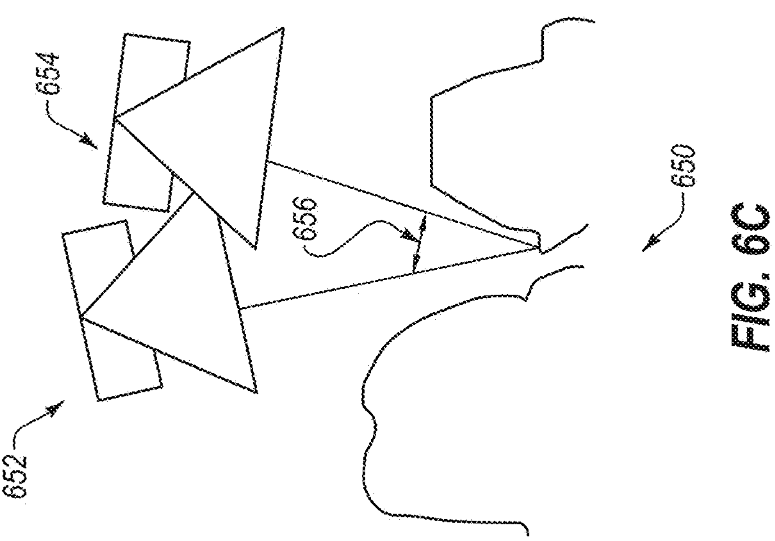
FIG. 6C illustrates camera angles to a captured point on a dental site, in accordance with an embodiment.

FIG. 6C illustrates camera angles to a captured point on a dental site, in accordance with an embodiment. A first position and orientation of a first camera 652 and a second position and orientation of a second camera 654 (which could be a different camera or the same camera but moved to the second position and orientation at a second time) are shown, as well as an angle 656 between rays from the two cameras that intersect at a point on a dental site 650. If the position and orientation of each of the cameras 652, 654 is known, then triangulation (e.g., stereo imaging techniques) may be performed to determine depth information for the point of intersection.

FIG. 6D illustrates images (e.g., image 1 and image 2) used to determine a portion of a margin line, in accordance with an embodiment. To obtain an accurate estimate of a feature or region of a dental site using 2D images, it is useful to have a perpendicular component to the epi-polar lines of the cameras that generated the 2D images being used. Different camera pairs will have different perpendicular components and different angles between the cameras. In stereo imaging, different angles would be correlated to different triangulation levels. To determine a margin line curve from multiple cameras, an error model of a 3D estimate of the margin line curve can be used to create a weighted average position to minimize a final error. As shown in FIG. 6D, a region of a curve of a margin line that can be solved for 666 and a region of the curve of the margin line that will be solved for 664 are the regions that lie on the epi-polar line(s) 662.

Figure 6E:
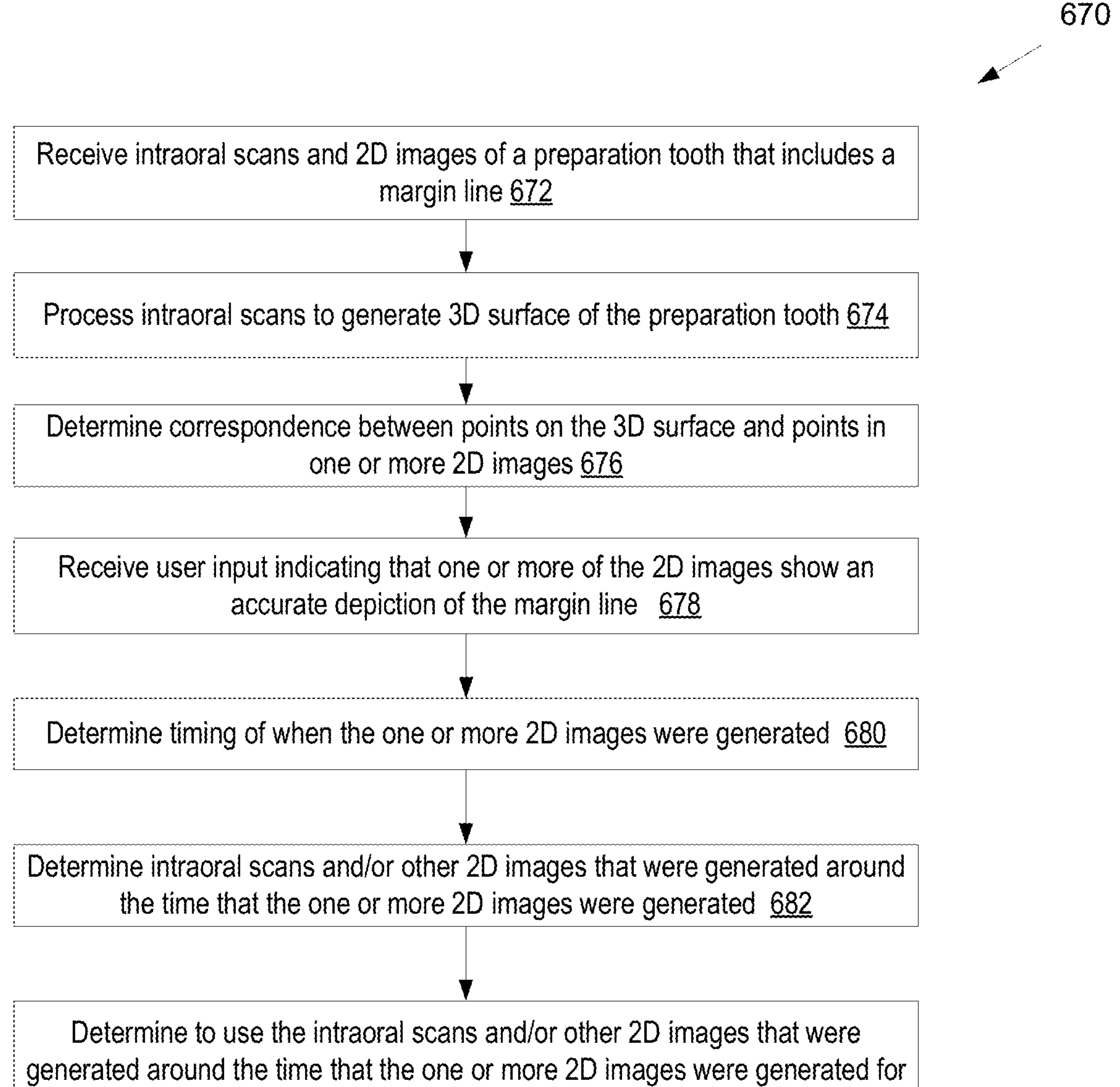
FIG. 6E illustrates a flow diagram for a method of determining 2D images and/or intraoral scans to use for constructing portions of a 3D surface, in accordance with an embodiment.

FIG. 6E illustrates a flow diagram for a method 670 of determining 2D images and/or intraoral scans to use for constructing portions of a 3D surface, in accordance with an embodiment. In some cases, the dental site being scanned changes over time during the scanning. For example, during the scan process retracted gingiva may collapse over a sub-gingival margin line, fluids may collect, and so on. For such cases, simply selecting which 2D images show a correct margin line can aid processing logic in constructing or marking an accurate margin line by giving it knowledge of what times of the scans and which parts of the scans have a value surface. In such instances, processing logic can adjust the 3D surfaces by selecting to use certain scans, certain valid parts of scans, etc. for each region.

In one embodiment, at block 672 of method 670, processing logic receives intraoral scans and 2D images of a preparation tooth that includes a margin line. The intraoral scans and 2D images are generated by an intraoral scanner and send to a computing device on which processing logic executes. The intraoral scanner may alternate between generation of intraoral scans (which contain 3D information) and one or more types of 2D intraoral images. The 2D images may include, for example, color 2D images, NIRI 2D images, fluorescent 2D images, ultraviolet 2D images, and so on.

At block 674, processing logic processes the intraoral scans to generate a 3D surface of a scanned dental site. This may include performing registration and stitching between the intraoral scans. If intraoral scanning is complete, then the 3D surface may be a virtual 3D model of the dental site.

At block 676, processing logic determines correspondence between points on the 3D surface and points in the 2D images. For each 2D image, a trajectory may be determined using one or more 3D scans generated before the 2D image was generated and one or more 3D scans generated after the 2D image was generated. The trajectory may then be used to interpolate a position and orientation of the 2D image and/or the camera that generated the 2D image relative to positions and orientations of points on the 3D surface (or relative to the position and orientation of the camera at the time that the intraoral scans were generated). In some embodiments, registration is performed between each of the 2D images and the 3D surface. The registration may be used to determine a position and orientation of points in the 2D image relative to points on the 3D surface. Such registration may be used to determine a camera position and orientation for each 2D image and/or for each point of the 2D image. In embodiments, a camera position and orientation is determined for each 2D image and stored as metadata for the 2D image and/or in a table of camera positions/orientations.

At block 678, processing logic receives using input indicating that one or more of the 2D images show an accurate depiction of the margin line. At block 680, processing logic determines a timing of when the one or more 2D images were generated (e.g., based on time stamps associated with those 2D images). At block 682, processing logic determines intraoral scans and/or other 2D images that were generated around the time that the one or more 2D images were generated (e.g., based on comparison of the time stamp for the one or more user selected 2D images to time stamps associated with the other 2D images and/or intraoral scans). At block 684, processing logic determines to use the intraoral scans and/or other 2D images that were generated around the time that the one or more selected 2D images were generated for a portion of the 3D surface depicting the margin line.

In one embodiment, a weighted averaging function is used to generate the portion of the 3D surface associated with the margin line. The weighed averaging function may apply weights to intraoral scans and/or 2D images based on the distance in time between the time stamp of the selected 2D images and the time stamp of the other 2D images and/or intraoral scans. The greater the distance in time, the lower the weight applied to a particular 2D image and/or intraoral scan.

Figure 7:
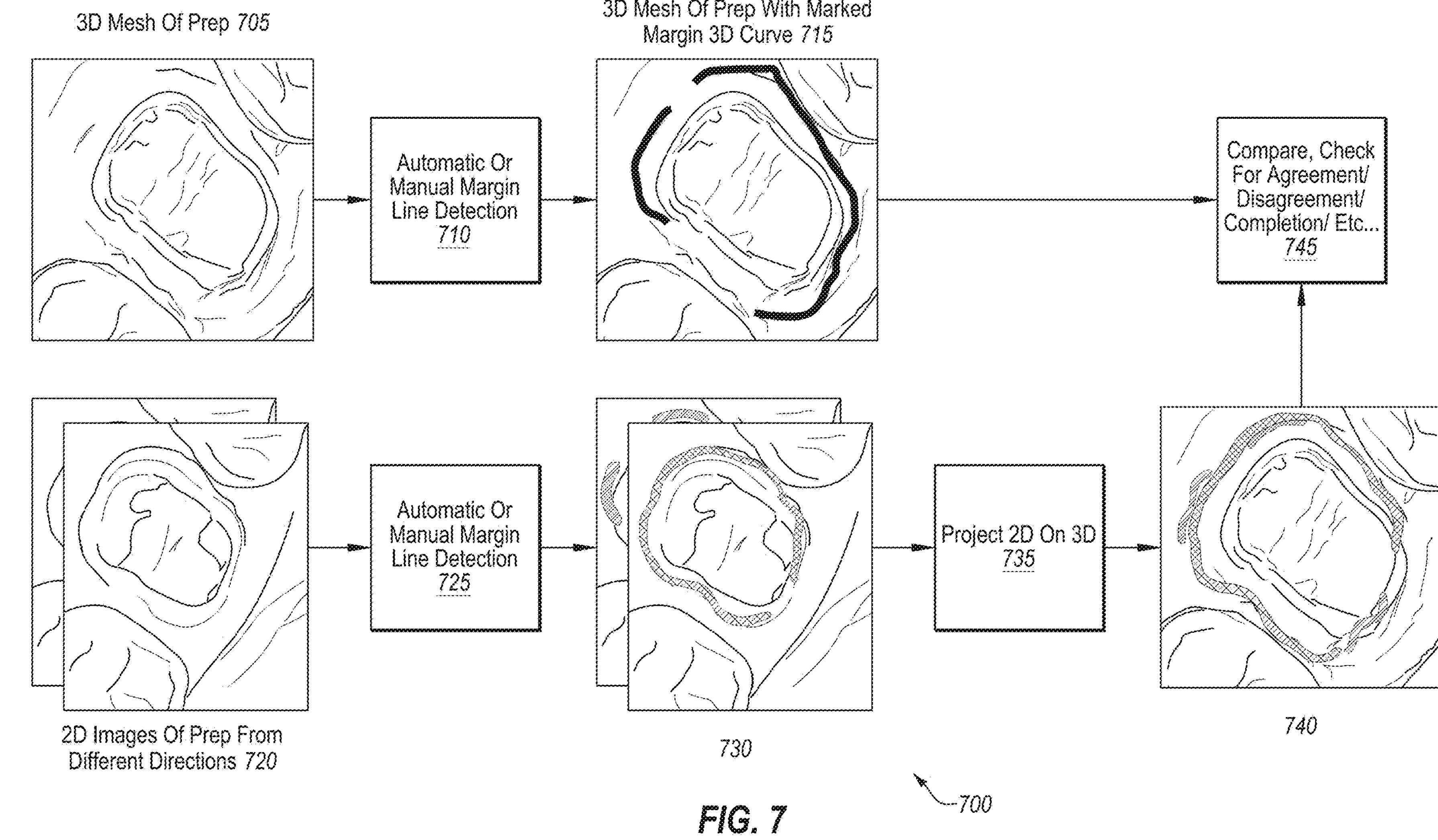
FIG. 7 illustrates a flow diagram for a method of comparing a margin line generated from a 3D surface to a margin line generated from 2D images, in accordance with an embodiment.

FIG. 7 illustrates a flow diagram for a method 700 of comparing a margin line generated from a 3D surface to a margin line generated from 2D images, in accordance with an embodiment. For the method, processing logic receives intraoral scans and 2D images of a preparation tooth ("prep"). At block 705, processing logic generates a 3D surface (e.g., a 3D mesh) of the preparation tooth. At block 710, processing logic then performs manual (e.g., based on use input) or automatic (e.g., based on application of machine learning) marking of the margin line around the preparation tooth. At block 715, the 3D surface is marked with a curve of the margin line. In embodiments, the margin line is divided into segments, and each segment is assigned a confidence value, indicating a confidence that the segment of the margin line is accurate. In some embodiments, the segments of the margin line are color coded based on their associated confidence values. For example, low confidence segments may be marked in red, medium confidence segments may be marked in yellow, and high confidence segments may be marked in green. As shown, in some instances the margin line is incomplete. For example, some segments of the margin line may not be detected or marked in the 3D surface. To manufacture a prosthodontic that will fit well onto the preparation tooth, it is important to accurately determine the contour of the full margin line around the preparation tooth.

At block 720, processing logic processes multiple received 2D images 720 to perform automatic or manual margin line detection at block 725. For each image of the preparation tooth, a margin line may be marked in the image. Accordingly, marked 2D images 730 may be produced. The marked 2D images show the margin line, or portions thereof, in two dimension. However, the margin lines should be projected into a three dimensional space to transfer them to the 3D surface. Accordingly, at block 735 processing logic performs triangulation between two or more 2D images to project the 2D margin line curves from the multiple 2D images into one or a few 3D margin line curves. The 3D margin line curves may be divided into segments, and each margin line segment may be associated with a confidence value. In some instances, there may be gaps or holes in the 3D margin line. At block 740, the 3D margin line from the 2D images may be marked on the 3D surface.

At block 745, processing logic may compare the margin line curve from the 3D surface (e.g., generated at block 710) to the margin line curve from the 2D images (e.g., generated at block 735). Based on the comparison, processing logic may determine a level of match between the margin line curves and perform one or more actions. In some embodiments, processing logic generates a new margin line curve based on an average (e.g., a weighted average) or some other combination of the two margin line curves. For a weighted average or other weighted combination, weights may be determined based on confidence values associated with segments of each of the margin lines, based on sharpness of images and/or of intraoral scans used to generate the respective margin line curves, and so on. In one embodiment, the confidence value for the margin line curve segments generated from the 2D images is based on a level of agreement between multiple 2D images for that margin line curve. The greater the number of 2D images that agree on a particular margin line segment, the greater the confidence in that margin line segment.

In some embodiments, processing logic uses the data from one of the margin line curves to fill in missing regions of the other margin line curve. For example, if the margin line curve generated from the 3D surface has missing regions, the margin line curve from the 2D images may be used to fill in those missing regions.

In some embodiments, processing logic generates a notification indicating a user of disagreement between the margin line curves and/or of an amount of disagreement between the margin line curves. Processing logic may prompt the user to select how to resolve the disagreement. For example, the user may be given the option to select one of the margin line curves (or segments of margin line curves) to resolve the disagreement, to average the margin line curves, and so on. In one embodiment, processing logic generates multiple updated margin line curve options based on different techniques for resolving the disagreement, and presents the multiple updated margin line curve options for user selection. A user may then view the multiple options and select the one that the user deems to best reflect the margin line around the preparation tooth.

Figure 8A:
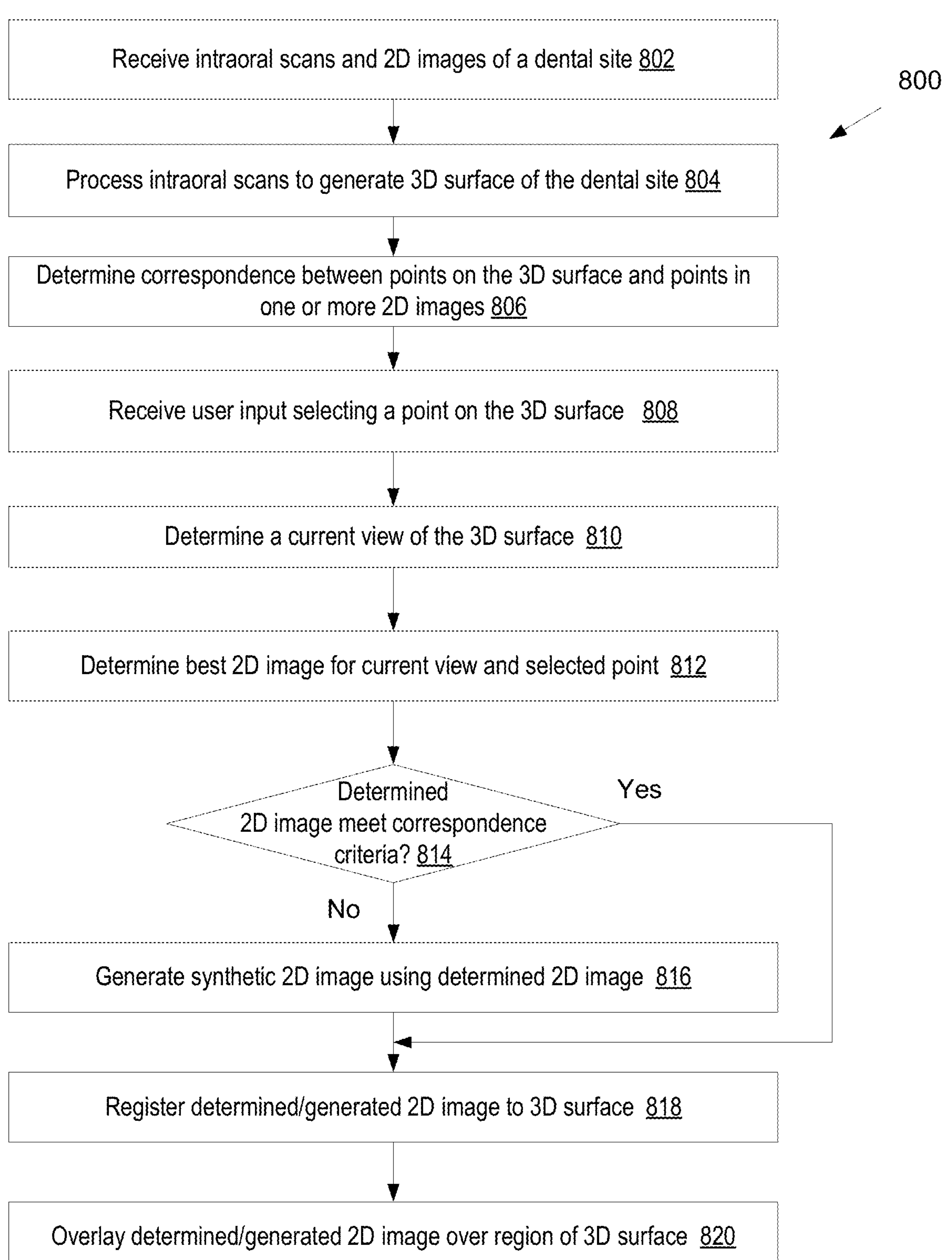
FIG. 8A illustrates a flow diagram for a method of overlaying 2D images over a 3D surface of a dental site, in accordance with an embodiment.

FIG. 8A illustrates a flow diagram for a method 800 of overlaying 2D images over a 3D surface of a dental site, in accordance with an embodiment. At block 802 of method 600, processing logic receives intraoral scans and 2D images of a preparation tooth that includes a margin line. The intraoral scans and 2D images are generated by an intraoral scanner and send to a computing device on which processing logic executes. The intraoral scanner may alternate between generation of intraoral scans (which contain 3D information) and one or more types of 2D intraoral images. The 2D images may include, for example, color 2D images, NIRI 2D images, fluorescent 2D images, ultraviolet 2D images, and so on.

At block 804, processing logic processes the intraoral scans to generate a 3D surface of a scanned dental site. This may include performing registration and stitching between the intraoral scans. If intraoral scanning is complete, then the 3D surface may be a virtual 3D model of the dental site.

At block 806, processing logic determines correspondence between points on the 3D surface and points in the 2D images. For each 2D image, a trajectory may be determined using one or more 3D scans generated before the 2D image was generated and one or more 3D scans generated after the 2D image was generated. The trajectory may then be used to interpolate a position and orientation of the 2D image and/or the camera that generated the 2D image relative to positions and orientations of points on the 3D surface (or relative to the position and orientation of the camera at the time that the intraoral scans were generated). In some embodiments, registration is performed between each of the 2D images and the 3D surface. The registration may be used to determine a position and orientation of points in the 2D image relative to points on the 3D surface. Such registration may be used to determine a camera position and orientation for each 2D image and/or for each point of the 2D image. In embodiments, a camera position and orientation is determined for each 2D image and stored as metadata for the 2D image and/or in a table of camera positions/orientations.

At block 808, processing logic receives user input selecting a point on the 3D surface. In one embodiment, a selected point on the 3D surface corresponds to a location of a cursor on a display of a GUI that includes a view of the 3D surface.

At block 810, processing logic determines a current view of the 3D surface. This may include determining a view angle associated with the current view.

At block 812, processing logic determines a best 2D image for the current view and the selected point. Each 2D image may be associated with a camera position and orientation (e.g., camera angle), and may further be associated with a camera model. The best 2D image may be an image having an associated camera position and orientation that most closely corresponds to a camera position and orientation associated with the current view and the selected point on the 3D surface.

At block 814, processing logic may determine whether the determined 2D images meets one or more correspondence criteria. The determined 2D image may have an associated camera angle that is different from the view angle associated with the current view. If the camera angle for the 2D image does not match the view angle for the current view, processing logic may determine that a correspondence criterion is not satisfied. If the correspondence criteria are not satisfied, the method continues to block 816. If the correspondence criteria are satisfied, the method proceeds to block 818.

At block 816, processing logic may generate a synthetic 2D image using the determined 2D image. This may include projecting the 2D image onto a plane that is orthogonal to the view angle of the current view. Such projection may cause the synthetic image to degrade slightly, but may also improve correspondence between the synthetic 2D image and the 3D surface around the selected point (e.g., there is better registration between the synthetic 2D image and the 3D surface than between the determined 2D image and the 3D surface).

At block 818, processing logic may register the determined 2D image or synthetic 2D image, as appropriate, to the 3D surface. At block 820, processing logic may then overlay the determined 2D image or synthetic 2D image, as appropriate, over the region of the 3D surface corresponding to the selected point.

Figure 8B:
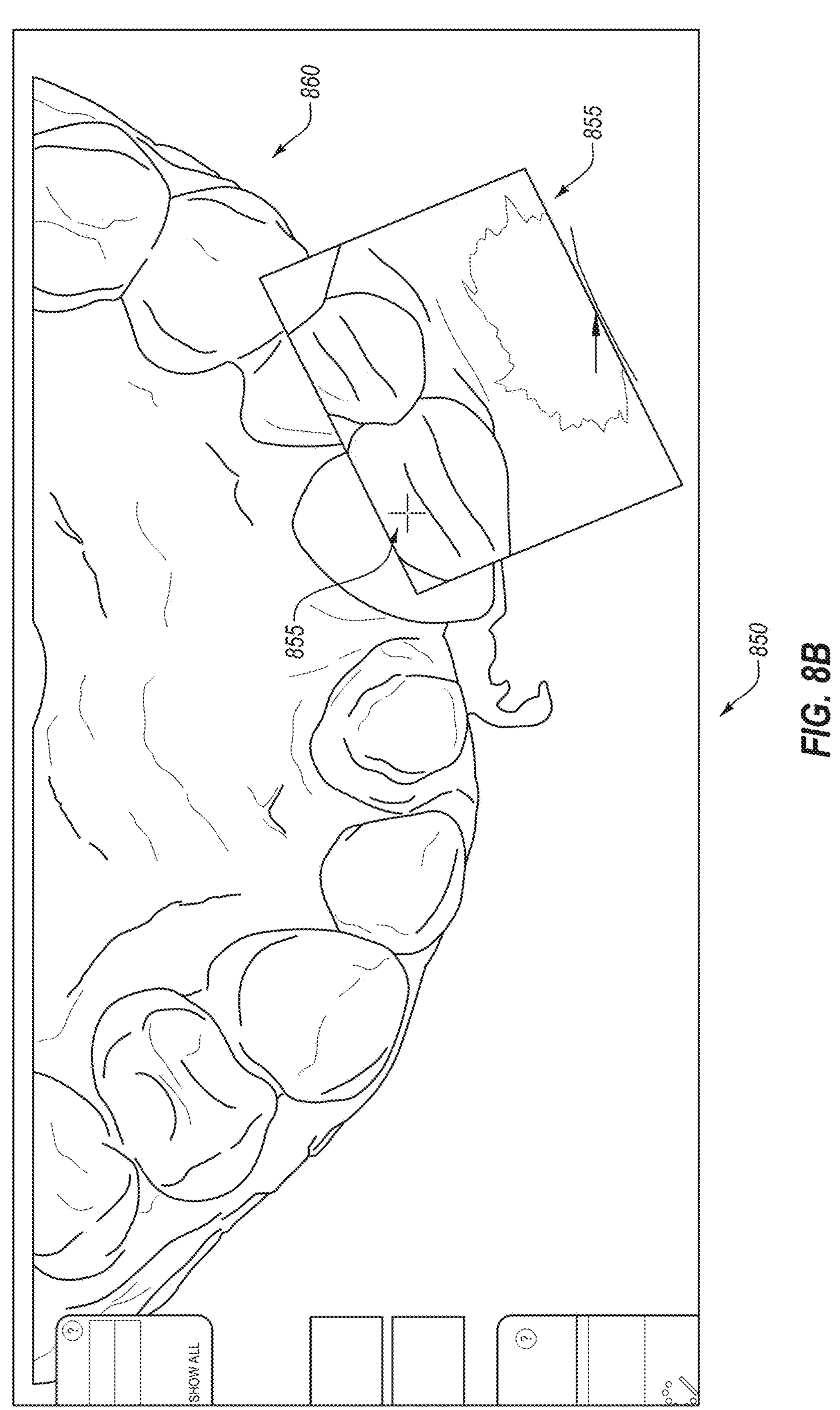
FIG. 8B illustrates a graphical user interface of a dental modeling tool in which a 2D image is overlaid on a 3D surface of a dental site, in accordance with an embodiment.

FIG. 8B illustrates a graphical user interface 850 of a dental modeling tool in which a 2D image 855 is overlaid on a 3D surface 860 of a dental site, in accordance with an embodiment. A cross hair 855 indicates a selected point on the 3D surface 860. The 2D image 855 is a color 2D image depicting certain teeth on the dental arch and is overlaid on top of those certain teeth in the 3D surface. The 2D image 855 was selected based on a current view angle of the 3D surface 860 and coordinates of the selected point 855. If the view angle or the selected point were to change, then the displayed 2D image 855 may be replaced with a new displayed 2D image. For example, if the coordinates of the selected point were changed, then a new image corresponding to coordinates of the new selected point may be selected and overlaid over the 3D surface at the new selected point.

Figure 9:
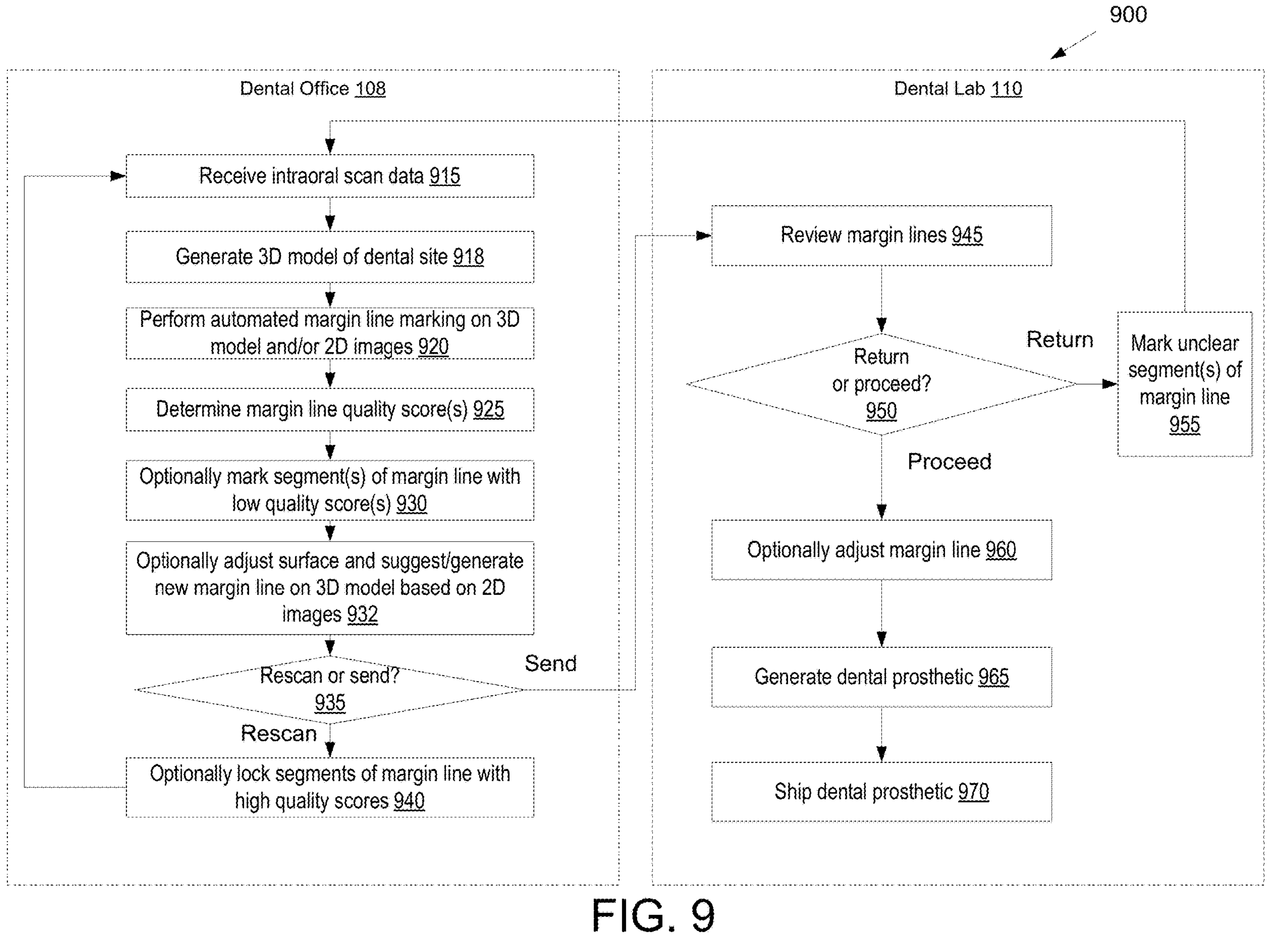
FIG. 9 illustrates an example workflow for generating an accurate virtual 3D model of a dental site and manufacturing a dental prosthetic from the virtual 3D model, in accordance with embodiments of the present disclosure.

FIG. 9 illustrates an example workflow of a method 900 for generating an accurate virtual 3D model of a dental site and manufacturing a dental prosthetic from the virtual 3D model, in accordance with embodiments of the present disclosure. Operations of the workflow may be performed at a dental office 105 or at a dental lab 110. Those operations performed at the dental office 105 may be performed during a single patient visit or over the course of multiple patient visits. The operations listed under dental office 105 may be performed, for example, by intraoral scan application 115 and/or by dental modeling application 116. The operations listed under dental lab 110 may be performed, for example, by dental modeling application 116.

Method 900 may begin at block 915, at which processing logic executing on a computing device associated with dental office 105 receives intraoral scan data (or other scan data such as CBCT scan data, OCT scan data and/or ultrasound scan data). The intraoral scan data may have been generated by intraoral scanner 150 during an intraoral scan process. At block 918, processing logic generates a virtual 3D model of one or more dental site based on the intraoral scan data, as discussed herein above. The virtual 3D model may be of an entire dental arch or of a portion of a dental arch (e.g., a portion including a preparation tooth and adjoining teeth).

At block 920, processing logic performs automated margin line marking on the 3D model and optionally on received 2D images. In one embodiment, automated margin line marking of the 3D model is performed by first generating appropriate data inputs from the 3D model (e.g., one or more images or height maps of the 3D model). These inputs include any information produced during scanning that is useful for margin line detection. Inputs may include image data, such as 2D height maps that provide depth values at each pixel location. 3D inputs may also be used and include Cartesian location and connectivity between vertices (i.e. mesh). In one embodiment, multiple synthetic images are generated by projecting a portion of the 3D model that represents a particular tooth onto a 2D surface. Different images may be generated by projecting the 3D model onto different 2D surfaces. In one embodiment, one or more generated images may include a height map that provides a depth value for each pixel of the image. The generated images other data from the 3D surface (e.g., a 3D point cloud) may be processed by a machine learning model that has been trained to identify margin lines on preparation teeth. The machine learning model may output a probability map that indicates, for each pixel/point of the image or 3D data input into the machine learning model, a probability that the pixel/point or surface represents a margin line. In the case of images, the probability map may then be projected back onto the 3D model to assign probability values to points on the 3D model. A cost function may then be applied to find the margin line using the probability values assigned to the points on the 3D model. Other techniques may also be used to compute the margin line based on the assigned probability values. In one embodiment, one or more of operations 1515-1525 of method 1500 depicted in FIG. 15 and/or operations 1630-1640 of method 1600 depicted in FIG. 16 are performed at block 920.

In one embodiment, automated margin line marking of the 2D images is performed by inputting data from the 2D images (e.g., the 2D images themselves, cropped versions of the 2D images, feature vectors from the 2D images, etc.) into a trained machine learning model. The inputs into the trained machine learning model may additionally include a camera angle, camera position and/or camera model associated with the 2D image. The data from the 2D images may be processed by a machine learning model that has been trained to identify margin lines on preparation teeth. The machine learning model may output, for each 2D image, a probability map that indicates, for each pixel of the image, a probability that the pixel represents a margin line. A cost function may then be applied to find the margin line using the probability values assigned to the points on the 2D image. Other techniques may also be used to compute the margin line based on the assigned probability values.

At block 925, processing logic computes one or more margin line quality scores for the margin line of the 3D surface and optionally for the margin lines in the 2D images. In one embodiment, margin lines from multiple 2D images are combined into a single 3D margin line using triangulation (e.g., stereo vision processing techniques). Each margin line quality score may be based on the cost value for the margin line (or a segment of the margin line) as computed using the cost function. In one embodiment, for each margin line a margin line quality score is determined for the entirety of the margin line. In one embodiment, multiple additional margin line quality scores are computed, where each margin line quality score is for a particular segment of the margin line.

At block 930, processing logic may mark segments of the margin line on the 3D model based on the margin line generated from the 3D model. Additionally, processing logic may mark segments of the margin line on the 3D model by registering the 2D image(s) to the 3D surface (and therefore also registering the 3D margin line generated from the 2D images onto the 3D surface).

At block 932, processing logic may optionally adjust the first margin line marking on the 3D surface that was generated from the 3D surface based on a) replacing the first margin line or portions thereof using the second margin line or portions thereof created from the 2D images, b) merging the first margin line with the second margin line (e.g., by applying a weighted average or other function), by filling in gaps in the first margin line from the second margin line, and so on. Additionally, in some embodiments processing logic adjusts the 3D surface based on the second margin line. This may include updating regions (e.g., vertexes) of the 3D surface so that they correspond to locations of the second margin line.

At block 935, a doctor may provide feedback indicating that the 3D model is acceptable or that the 3D model should be updated. If the doctor indicates that the 3D model is acceptable, then the 3D model is sent to the dental lab 110 for review, and the method continues to block 945. If the doctor indicates that the 3D model is not acceptable, then the method continues to block 940.

At block 940, the doctor may use a user interface to indicate one or more regions of the 3D model that are to be rescanned. For example, the user interface may include an eraser function that enables the doctor to draw or circle a portion of the 3D model. An area inside of the drawn region or circle may be erased, and a remainder of the 3D model may be locked. Locked regions of the 3D model may not be modified by new intraoral scan data. Alternatively, a one-way lock may be applied, and the locked regions may be modified under certain conditions. Alternatively, processing logic may automatically select regions depicting margin line segments with low quality scores for erasure, and may automatically lock a remainder of the 3D model. Processing logic may then graphically indicate to the doctor where to position the intraoral scanner 150 to generate replacement image data. The method may then return to block 915, and new intraoral image data depicting the region that was erased may be received. The new intraoral image data may be generated using a standard scanning procedure or a partial retraction scanning procedure.

At block 918, the 3D model may be updated based on the new image data. The operations of blocks 920-935 may then be repeated based on the updated 3D model.

At block 945, a lab technician may review the margin lines in the 3D model (e.g., using a dental modeling application 116). Alternatively, or additionally, processing logic (e.g., processing logic of a dental modeling application 116) may process the 3D model to automatically determine and/or grade the margin line. In one embodiment, reviewing the margin lines at block 945 includes performing operations 920-932. At block 950, processing logic determines whether to proceed with using the 3D model to manufacture a dental prosthetic or to return the 3D model to the dental office 105. If the margin line meets a minimum quality threshold, then the method proceeds to block 960. If the margin line does not meet the minimum quality threshold, then the method continues to block 955, and the 3D model is returned to the dental office 105 to enable the doctor to generate further intraoral scans of the dental site. At block 955, a lab technician may manually mark unclear segments of the margin line. Alternatively, unclear segments may be automatically marked by processing logic at block 955, or may have already been marked at block 945. A message is then sent to the doctor asking for additional intraoral images to be generated. The message may provide a copy of the 3D model showing regions that should be reimaged.

At block 960, the margin line may automatically be adjusted. In some instances, at block 950 processing logic may determine that the margin line has insufficient quality, but for some reason the doctor may be unable to collect new images of the dental site. In such instances, processing logic may proceed to block 960 even if the margin line has an unacceptable level of quality. In such instances, the margin line may be automatically adjusted at block 960. Alternatively, the margin line may be manually adjusted using, for example, CAD tools. In one embodiment, the margin line is adjusted by generating images of the 3D model (e.g., by projecting the 3D model onto 2D surfaces) and processing the images using a trained machine learning model that has been trained to correct margin lines in images of preparation teeth.

At block 965, processing logic generates a dental prosthetic using the virtual 3D model of the dental site. In one embodiment, the virtual 3D model is input into a rapid prototyping machine (e.g., a 3D printer), and a physical model of the dental site(s) (e.g., of a preparation tooth and adjacent teeth) is produced. The physical 3D model may then be used to generate the dental prosthetic. Alternatively, a virtual 3D model of the dental prosthetic may be generated from the virtual 3D model of the dental site(s), and the virtual 3D model of the dental prosthetic may be used to directly manufacture the dental prosthetic using 3D printing. At block 970, the dental prosthetic may then be shipped to the dental office 105.

Figure 10:
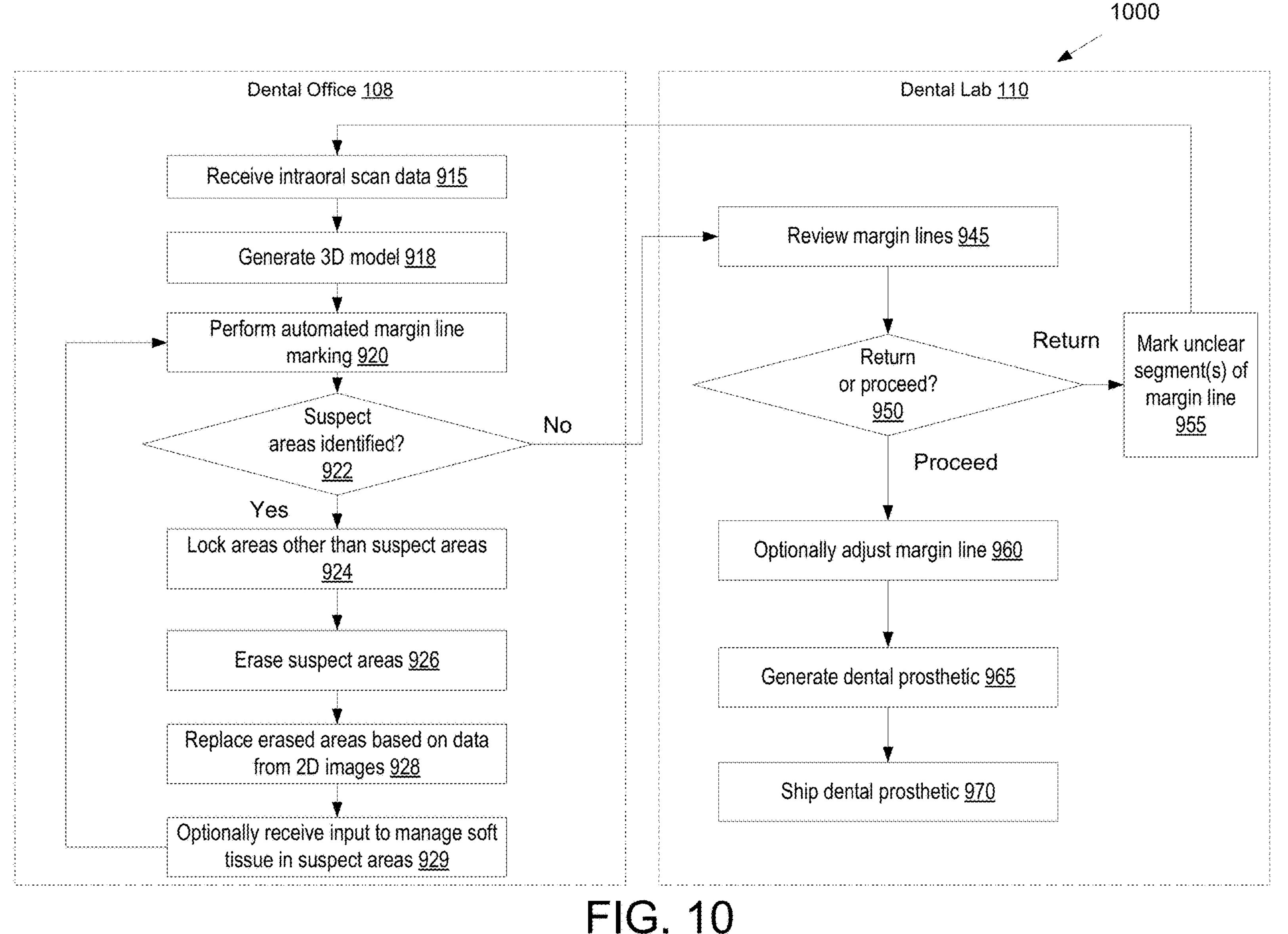
FIG. 10 illustrates another example workflow for generating an accurate virtual 3D model of a dental site and manufacturing a dental prosthetic from the virtual 3D model, in accordance with embodiments of the present disclosure.

FIG. 10 illustrates another example workflow of a method 1000 for generating an accurate virtual 3D model of a dental site and manufacturing a dental prosthetic from the virtual 3D model, in accordance with embodiments of the present disclosure. Operations of the workflow may be performed at a dental office 105 or at a dental lab 110. Those operations performed at the dental office 105 may be performed during a single patient visit or over the course of multiple patient visits. The operations listed under dental office 105 may be performed, for example, by intraoral scan application 115 or dental modeling application 116. The operations listed under dental lab 110 may be performed, for example, by dental modeling application 116.

Method 1000 may begin at block 915, at which processing logic executing on a computing device associated with dental office 105 receives intraoral scan data. The intraoral scan data may have been generated in accordance with a standard (e.g., full retraction) scanning procedure or in accordance with a partial retraction scanning procedure, as described above. At block 918 a 3D model of at least a portion of a dental arch (e.g., of one or more dental sites) is generated using the intraoral scan data. At block 920, processing logic performs automated margin line marking on the 3D model and/or 2D images, as discussed elsewhere herein. At block 922, processing logic determines whether any suspect areas of the 3D model are identified. A suspect area may be identified, for example, by identifying margin line segments with cost values that exceed a cost threshold or by identifying margin line segments with quality values that fall below a quality threshold, where the quality values may be based on the cost values. For example, processing logic may compute one or more margin line quality scores. Each margin line quality score may be based on the cost value for the margin line (or a segment of the margin line) as computed using a cost function, and the margin line quality scores may be compared to a quality threshold to determine if suspect areas are identified. If suspect areas are identified, the method proceeds to block 924. If no suspect areas are identified, the method proceeds to block 945.

At block 924, processing logic automatically locks areas of the 3D model other than the suspect areas. This may ensure that the locked areas, which represent accurate depictions of regions of a dental site, will not be modified. In some embodiments, a one-way lock is used to lock the areas of the 3D model other than the suspect areas, as described above. At block 926, the suspect areas may then be erased using an eraser tool.

At block 928, processing logic may then replace the erased areas based on data from the 2D images. This may include performing triangulation between multiple 2D images to determine an alternate 3D surface from the 2D images, and then using the alternate 3D surface to replace the erased areas of the 3D surface.

Additionally, or alternatively to the operations of block 928 or the alternative operations described above, at block 929 processing logic may receive input from a doctor manually manipulating the 3D surface of the 3D model at the suspect area. For example, the doctor may manually draw a surface, draw a margin line, etc. The doctor may also manage soft tissue, such as by manually removing a representation of a portion of soft tissue from the 3D model.

At block 945, a lab technician may review the margin lines in the 3D model (e.g., using a dental modeling application 120. Alternatively, or additionally, processing logic (e.g., processing logic of a dental modeling application 120) may process the 3D model to automatically determine and/or grade the margin line. At block 950, processing logic determines whether to proceed with using the 3D model to manufacture a dental prosthetic or to return the 3D model to the dental office 105. If the margin line meets a minimum quality threshold, then the method proceeds to block 960. If the margin line does not meet the minimum quality threshold, then the method continues to block 955, and the 3D model is returned to the dental office 105 to enable the doctor to generate further intraoral scans of the dental site. At block 955, a lab technician may manually mark unclear segments of the margin line. Alternatively, unclear segments may be automatically marked by processing logic at block 955, or may have already been marked at block 945. A message is then sent to the doctor asking for additional intraoral images to be generated. The message may provide a copy of the 3D model showing regions that should be reimaged.

At block 960, the margin line may automatically be adjusted. In some instances, at block 950 processing logic may determine that the margin line has insufficient quality, but for some reason the doctor may be unable to collect new images of the dental site. In such instances, processing logic may proceed to block 960 even if the margin line has an unacceptable level of quality. In such instances, the margin line may be automatically adjusted at block 960. Alternatively, the margin line may be manually adjusted using, for example, CAD tools.

At block 965, processing logic generates a dental prosthetic using the virtual 3D model of the dental site. In one embodiment, the virtual 3D model is input into a rapid prototyping machine (e.g., a 3D printer), and a physical model of the dental site(s) (e.g., of a preparation tooth and adjacent teeth). The physical 3D model may then be used to generate the dental prosthetic. Alternatively, a virtual 3D model of the dental prosthetic may be generated from the virtual 3D model of the dental site(s), and the virtual 3D model of the dental prosthetic may be used to directly manufacture the dental prosthetic using 3D printing. At block 970, the dental prosthetic may then be shipped to the dental office 105.

Figure 11:
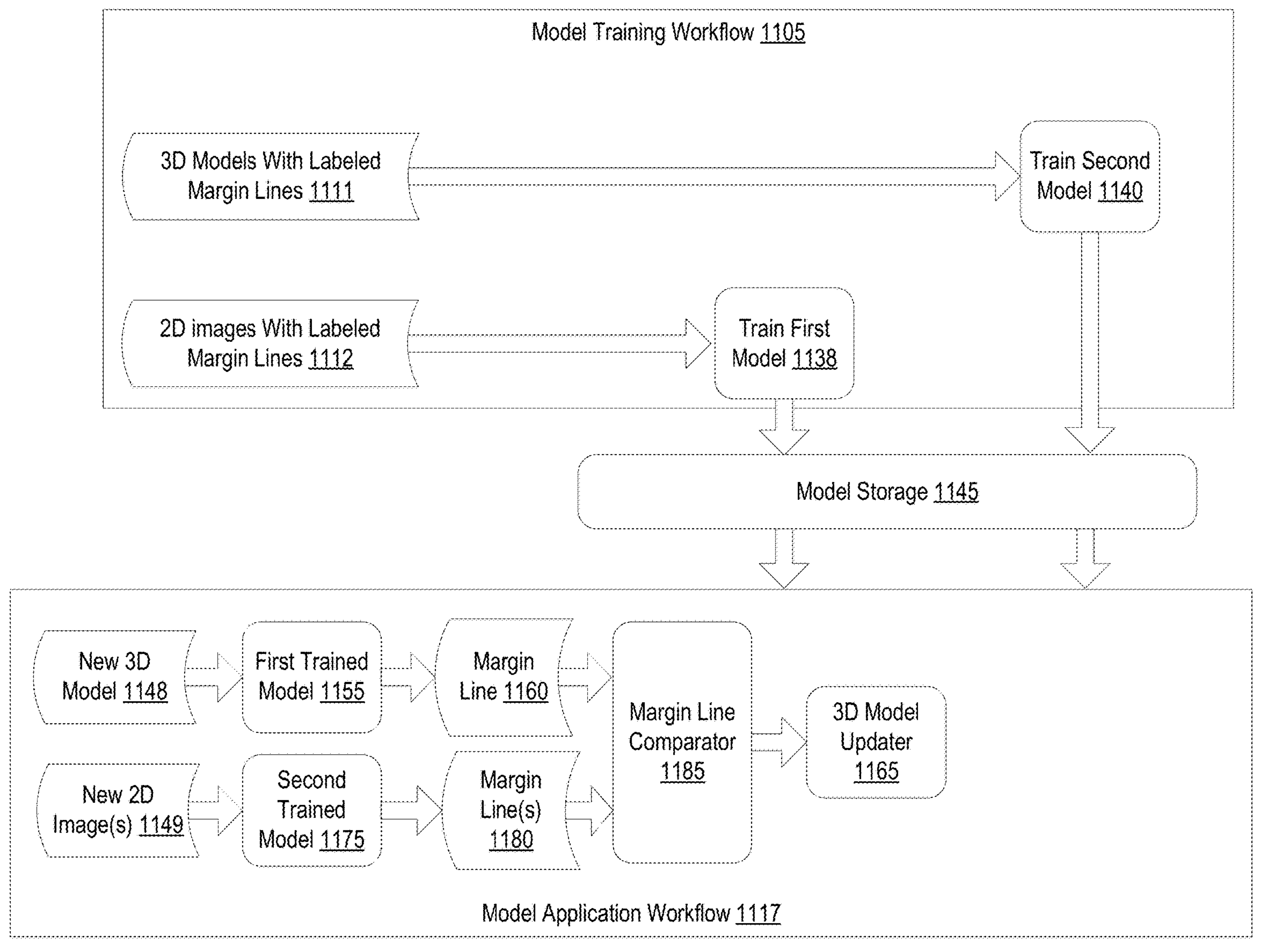
FIG. 11 illustrates workflows for training machine learning models and applying the trained machine learning models to images and/or 3D models, in accordance with embodiments of the present disclosure.

FIG. 11 illustrates a model training workflow 1105 and a model application workflow 1117 for a dental modeling application, in accordance with an embodiment of the present disclosure. In embodiments, the model training workflow 1105 may be performed at a server which may or may not include an intraoral scan application. The model training workflow 1105 and the model application workflow 1117 may be performed by processing logic executed by a processor of a computing device. One or more of these workflows 1105, 1117 may be implemented, for example, by one or more machine learning modules implemented in an intraoral scan application 115, dental modeling application 116 or other software and/or firmware executing on a processing device of computing device 2000 shown in FIG. 20.

The model training workflow 1105 is to train one or more machine learning models (e.g., deep learning models) to perform one or more classifying, segmenting, detection, recognition, prediction, etc. tasks for intraoral scan data (e.g., 3D intraoral scans, height maps, 2D color images, 2D NIRI images, 2D fluorescent images, etc.) and/or 3D surfaces generated based on intraoral scan data. The model application workflow 1117 is to apply the one or more trained machine learning models to perform the classifying, segmenting, detection, recognition, prediction, etc. tasks for intraoral scan data (e.g., 3D scans, height maps, 2D color images, NIRI images, etc.) and/or 3D surfaces generated based on intraoral scan data. One or more of the machine learning models may receive and process 3D data (e.g., 3D point clouds, 3D surfaces, portions of 3D models, etc.). One or more of the machine learning models may receive and process 2D data (e.g., 2D images, height maps, projections of 3D surfaces onto planes, etc.).

Many different machine learning outputs are described herein. Particular numbers and arrangements of machine learning models are described and shown. However, it should be understood that the number and type of machine learning models that are used and the arrangement of such machine learning models can be modified to achieve the same or similar end results. Accordingly, the arrangements of machine learning models that are described and shown are merely examples and should not be construed as limiting.

In embodiments, one or more machine learning models are trained to perform one or more of the below tasks. Each task may be performed by a separate machine learning model. Alternatively, a single machine learning model may perform each of the tasks or a subset of the tasks. Additionally, or alternatively, different machine learning models may be trained to perform different combinations of the tasks. In an example, one or a few machine learning models may be trained, where the trained ML model is a single shared neural network that has multiple shared layers and multiple higher level distinct output layers, where each of the output layers outputs a different prediction, classification, identification, etc. The tasks that the one or more trained machine learning models may be trained to perform are as follows:

I) Canonical position determination—this can include determining canonical position and/or orientation of a 3D surface or of objects in an intraoral scan.

II) Scan/2D image assessment—this can include determining quality metric values associated with intraoral scans, 2D images and/or regions of 3D surfaces. This can include assigning a quality value to individual scans, 3D surfaces, portions of 3D surface, 3D models, portions of 3D models, 2D images, portions of 2D images, etc.

III) Blood/saliva determination—this can include performing point-level classification (e.g., pixel-level classification or voxel-level classification) to identify those points/patches classified as blood/saliva and those points/patches not classified as blood/saliva.

IV) Moving tissue (excess tissue) identification/removal—this can include performing pixel-level identification/classification of moving tissue (e.g., tongue, finger, lips, etc.) from intraoral scans and/or 2D images and optionally removing such moving tissue from intraoral scans, 2D images and/or 3D surfaces. Moving tissue identification and removal is described in US Publication No. 2020/0349698, entitled "Excessive material removal using machine learning," which is incorporated by reference herein.

V) Margin line detection—this can include performing point-level or pixel-level classification of 3D models and/or 2D images to classify points/pixels as being part of a margin line or not being part of a margin line. This can include performing segmentation of 3D surfaces and/or 2D images. Points/pixels may be classified into two or more classes. A minimum classification taxonomy may include a margin line class and a not margin line class. In other examples, further dental classes may be identified, such as a hard tissue or tooth class, a soft tissue or gingiva class, and a margin line class.

One type of machine learning model that may be used to perform some or all of the above asks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, a graph neural network (GNN) architecture is used that operates on three-dimensional data. Unlike a traditional neural network that operates on two-dimensional data, the GNN may receive three-dimensional data (e.g., 3D surfaces) as inputs, and may output predictions, estimates, classifications, etc. based on the three-dimensional data.

In one embodiment, a U-net architecture is used for one or more machine learning model. A U-net is a type of deep neural network that combines an encoder and decoder together, with appropriate concatenations between them, to capture both local and global features. The encoder is a series of convolutional layers that increase the number of channels while reducing the height and width when processing from inputs to outputs, while the decoder increases the height and width and reduces the number of channels. Layers from the encoder with the same image height and width may be concatenated with outputs from the decoder. Any or all of the convolutional layers from encoder and decoder may use traditional or depth-wise separable convolutions.

In one embodiment, one or more machine learning model is a recurrent neural network (RNN). An RNN is a type of neural network that includes a memory to enable the neural network to capture temporal dependencies. An RNN is able to learn input-output mappings that depend on both a current input and past inputs. The RNN will address past and future scans and make predictions based on this continuous scanning information. RNNs may be trained using a training dataset to generate a fixed number of outputs (e.g., to classify time varying data such as video data as belonging to a fixed number of classes). One type of RNN that may be used is a long short term memory (LSTM) neural network.

A common architecture for such tasks is LSTM (Long Short Term Memory). Unfortunately, LSTM is not well suited for images since it does not capture spatial information as well as convolutional networks do. For this purpose, one can utilize ConvLSTM—a variant of LSTM containing a convolution operation inside the LSTM cell. ConvLSTM is a variant of LSTM (Long Short-Term Memory) containing a convolution operation inside the LSTM cell. ConvLSTM replaces matrix multiplication with a convolution operation at each gate in the LSTM cell. By doing so, it captures underlying spatial features by convolution operations in multiple-dimensional data. The main difference between ConvLSTM and LSTM is the number of input dimensions. As LSTM input data is one-dimensional, it is not suitable for spatial sequence data such as video, satellite, radar image data set. ConvLSTM is designed for 3-D data as its input. In one embodiment, a CNN-LSTM machine learning model is used. A CNN-LSTM is an integration of a CNN (Convolutional layers) with an LSTM. First, the CNN part of the model processes the data and a one-dimensional result feeds an LSTM model.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

For the model training workflow 1105, a training dataset containing hundreds, thousands, tens of thousands, hundreds of thousands or more intraoral scans, images and/or 3D models should be used. In embodiments, up to millions of cases of patient dentition that may have underwent a prosthodontic procedure and/or an orthodontic procedure may be available for forming a training dataset, where each case may include various labels of one or more types of useful information. Each case may include, for example, data showing a 3D model, intraoral scans, height maps, color images, NIRI images, etc. of one or more dental sites, data showing pixel-level segmentation of the data (e.g., 3D model, intraoral scans, height maps, color images, NIRI images, etc.) into various dental classes (e.g., tooth, gingiva, moving tissue, saliva, blood, etc.), data showing one or more assigned scan quality metric values for the data, movement data associated with the 3D scans, and so on. This data may be processed to generate one or multiple training datasets for training of one or more machine learning models. The training datasets may include, for example, a first training dataset of 3D models with labeled margin lines 1111 and a second data set of 2D images with labeled margin lines 1112. The machine learning models (e.g., first model 1138 and second model 1140) may be trained, for example, to detect blood/saliva, to detect moving tissue, perform segmentation of 2D images and/or 3D models of dental sites (e.g., to segment such images/3D surfaces into one or more dental classes), and so on.

To effectuate training, processing logic inputs the training dataset(s) into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above.

Training may be performed by inputting one or more of the images, scans or 3D surfaces (or data from the images, scans or 3D surfaces) into the machine learning model one at a time. Each input may include data from an image, intraoral scan or 3D surface in a training data item from the training dataset. The training data item may include, for example, a height map, 3D point cloud or 2D image and an associated probability map, which may be input into the machine learning model.

The machine learning model processes the input to generate an output. An artificial neural network includes an input layer that consists of values in a data point (e.g., intensity values and/or height values of pixels in a height map). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction and/or output that the machine learning model can produce. For example, for an artificial neural network being trained to determine a margin line in a 2D image or 3D point cloud.

Processing logic may then compare the determined margin line to a labeled margin line of the 2D image or 3D point cloud. Processing logic determines an error (i.e., a positioning error) based on the differences between the output margin line and the known correct margin line. Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

Once one or more trained ML models 1138, 1140 are generated, they may be stored in model storage 1145, and may be added to an intraoral scan application and/or dental modeling application. Intraoral scan application 115 and/or dental modeling application 116 may then use the one or more trained ML models 1138, 1140 as well as additional processing logic to identify and/or correct margin lines on 3D surfaces.

In one embodiment, model application workflow 1117 includes a first trained model 1155 and a second trained model 1175. First and second trained models 1155, 1175 may each be trained to perform segmentation of an input and identify a margin line therefrom, but may be trained to operate on different types of data. For example, first trained model 1155 may be trained to operate on 3D data, and second trained model 1175 may be trained to operate on 2D color images, on 2D NIRI images, on other 2D images, or combinations thereof. In some embodiments, a single trained machine learning model is used for analyzing multiple types of data.

According to one embodiment, an intraoral scanner generates a sequence of intraoral scans and 2D images. A 3D surface generator may perform registration between intraoral scans to stitch the intraoral scans together and generate a 3D surface/model 1148 from the intraoral scans. Additionally, 2D intraoral images (e.g., color 2D images and/or NIRI 2D images) 1149 may be generated. Additionally, as intraoral scans and 2D images are generated, motion data may be generated by an IMU of the intraoral scanner and/or based on analysis of the intraoral scans and/or 2D intraoral images.

Data from the 3D model/surface 1148 may be input into first trained model 1155, which outputs a first margin line 1160. The first margin line may be output as a probability map or mask in some embodiments, where each point has an assigned probability of being part of a margin line and/or an assigned probability of not being part of a margin line. Similarly, for each 2D image, data from the 2D image is input into second trained model 1175 which outputs margin line 1180. The margin line(s) 1180 may each be output as a probability map or mask in some embodiments, where each pixel of the input 2D image has an assigned probability of being part of a margin line and/or an assigned probability of not being part of a margin line.

A margin line comparator 1185 may compare the margin line 1160 to the margin line(s) 1180. This may include performing triangulation between 2D margin lines 1180 from multiple 2D images to generate a 3D margin line, and then comparing the 3D margin line to margin line 1160. Based on a result of the comparison, 3D margin line updater 1165 may update the 3D model. In one embodiment, this includes marking the 3D surface with margin line 1160, margin line(s) 1180, or combinations thereof. In one embodiment, updating the 3D model includes adjusting a shape of the 3D surface (e.g., one or more vertexes of the 3D surface) based on the margin lines 1180 (or the 3D margin line generated from margin lines 1180).

Figure 12:
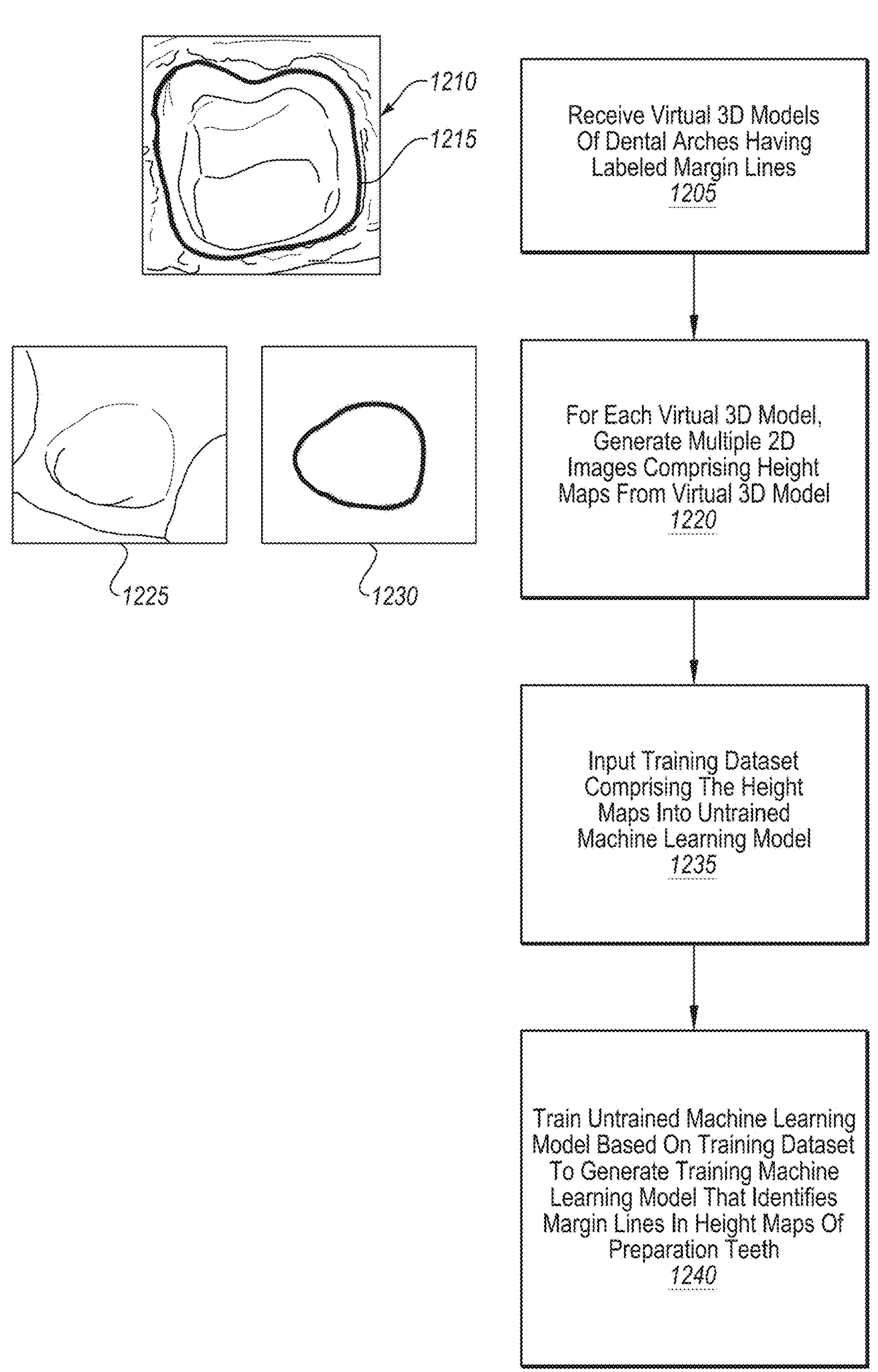
FIG. 12 illustrates a flow diagram for a method of training a machine learning model to determine margin lines in images of preparation teeth and/or in 3D surfaces, in accordance with an embodiment.

FIG. 12 illustrates a flow diagram for a method 1200 of training a machine learning model to determine margin lines in images of preparation teeth, in accordance with an embodiment. At block 1205 of method 1200, processing logic receives virtual 3D models of dental arches having labeled margin lines. An example 3D model 1210 is shown with a labeled margin line 1215.

At block 1220, for each virtual 3D model processing logic generates one or multiple images comprising height maps from the virtual 3D model. Each image may be generated by projecting the 3D model onto a 2D surface, as described above. In one embodiment, about 10-150 greyscale height maps are generated for each case or patient. Each image may include an associated mask or probability map that indicates which pixels in the image represent the margin line. An example image 1225 and associated mask or probability map 1230 are shown. In one embodiment, each virtual 3D model includes a label of a specific tooth number and/or a specific indication.

At block 1235, processing logic inputs the training dataset comprising the height maps into the untrained machine learning model. At block 1240, processing logic trains the untrained machine learning model based on the training dataset to generate a trained machine learning model that identifies margin lines in height maps of preparation teeth. Training may be performed by inputting the images into the machine learning model one at a time. For each input image, the machine learning model generates a probability map indicating, for each pixel of the image, a probability that the pixel represents the margin line. Processing logic may then compare the generated probability map to the known probability map or mask, and back propagation may be performed to update weights of nodes in the machine learning model. This process may be performed repeatedly using a large portion of the training dataset, with each iteration slightly refining the accuracy of the machine learning model. Once the machine learning model is trained, a reserved portion of the training dataset may be used to test the model.

In one embodiment, the machine learning model is additionally trained to identify teeth, gums and/or excess material. In one embodiment, the machine learning model is further trained to determine one or more specific tooth numbers and/or to identify a specific indication (or indications) for an input image. Accordingly, a single machine learning model may be trained to identify and/or correct margin lines and also to identify teeth generally, identify different specific tooth numbers, identify gums and/or identify specific indications (e.g., caries, cracks, etc.). In an alternative embodiment, a separate machine learning model is trained for each specific tooth number and for each specific indication. Accordingly, the tooth number and/or indication (e.g., a particular dental prosthetic to be used) may be indicated (e.g., may be input by a user), and an appropriate machine learning model may be selected based on the specific tooth number and/or the specific indication.

In one embodiment, the machine learning model (or a different machine learning model) is additionally or alternatively trained to determine model orientation, path of insertion for a restoration or bridge, and/or positioning of a 3D model within a CAM template.

In an embodiment, the machine learning model may be trained to output an identification of a margin line as well as separate information indicating one or more of the above (e.g., path of insertion, model orientation, teeth identification, gum identification, excess material identification, etc.). In one embodiment, the machine learning model (or a different machine learning model) is trained to perform one or more of: identify teeth represented in height maps, identify gums represented in height maps, identify excess material (e.g., material that is not gums or teeth) in height maps, and/or identify margin line in height maps. In some instances, the margin line identified by such a machine learning model that is trained to identify teeth, gums, excess material and margin line may have increased accuracy sine the machine learning model may learn what the tooth/gum boundaries and what artifacts to ignore.

For embodiments in which the machine learning model is trained to output path of insertion, training data may include height maps that include a target path of insertion. For embodiments in which the machine learning model is trained to output a model orientation, training data may include height maps that include a labeled model orientation. For embodiments in which the machine learning model is trained to output a tooth identification, training data may include height maps that include a labeled teeth. For embodiments in which the machine learning model is trained to output a gum identification, training data may include height maps that include a labeled gums. For embodiments in which the machine learning model is trained to output an identification of excess material, training data may include height maps that include a labeled excess material. For embodiments in which the machine learning model is trained to output multiple pieces of information (e.g., identification of margin line, path of insertion, tooth number identification, gum identification, excess material identification and/or model orientation), the training data may include height maps with targets/labels identifying the types of information that the model is to output.

In one embodiment, the machine learning model is trained to determine a confidence score for each pixel indicating a confidence that the pixel represents a margin line. The confidence scores may be used to determine quality values for segments of the margin line in some embodiments.

Figure 13:
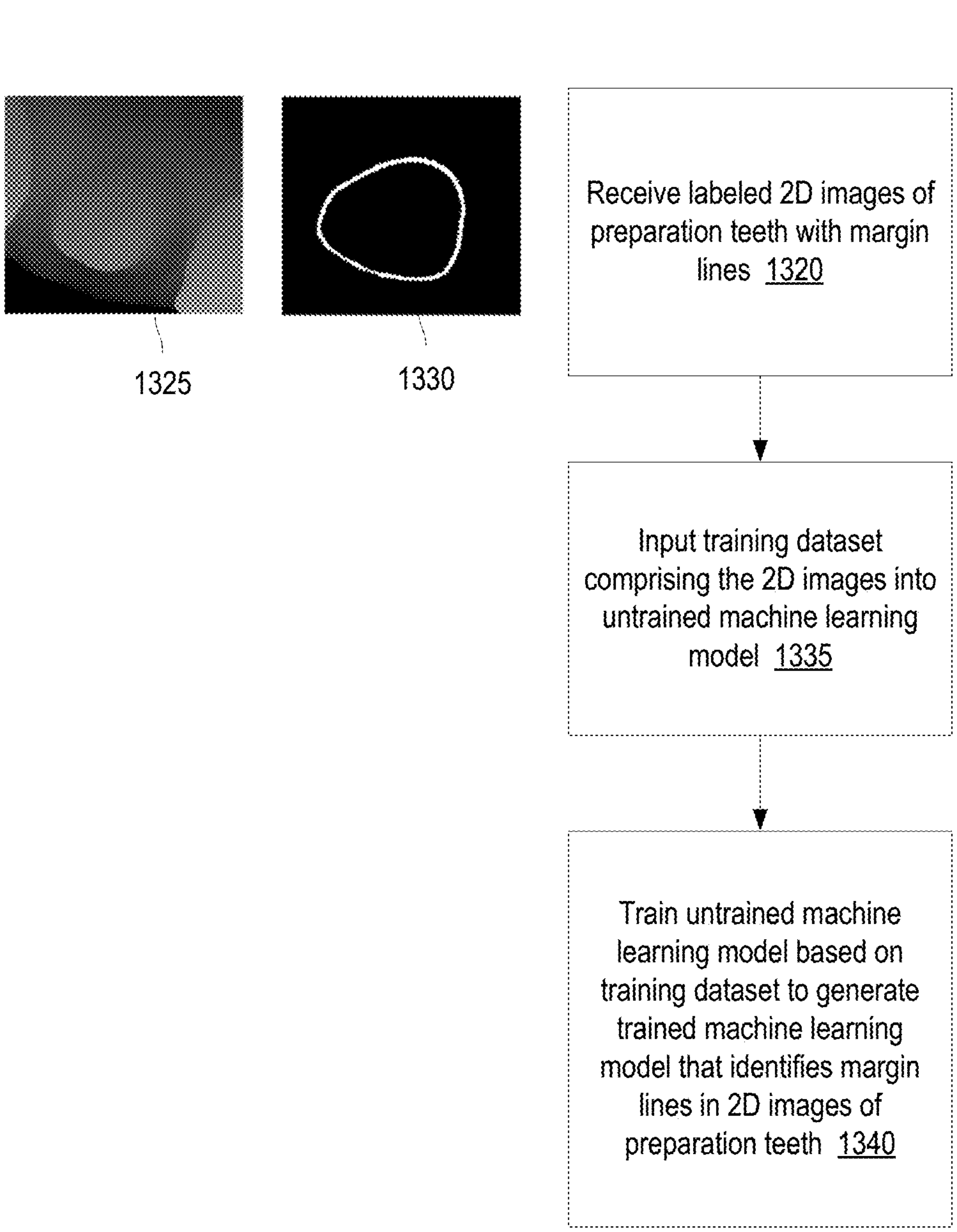
FIG. 13 illustrates a flow diagram for a method of training a machine learning model to determine margin lines in 2D images of preparation teeth, in accordance with an embodiment.

FIG. 13 illustrates a flow diagram for a method 1300 of training a machine learning model to determine margin lines in 2D images of preparation teeth, in accordance with an embodiment. The 2D images may be color 2D images, NIRI 2D images, or fluorescent 2D images in some embodiments. At block 1320 of method 1300, processing logic receives 2D images of preparation teeth having labeled margin lines. An example 2D image 1325 is shown with a labeled margin line 1330.

At block 1335, processing logic inputs the training dataset comprising the 2D images into the untrained machine learning model. At block 1340, processing logic trains the untrained machine learning model based on the training dataset to generate a trained machine learning model that identifies margin lines in 2D images of preparation teeth. Training may be performed by inputting the images into the machine learning model one at a time. For each input image, the machine learning model generates a probability map indicating, for each pixel of the image, a probability that the pixel represents the margin line. Processing logic may then compare the generated probability map to the known probability map or mask, and back propagation may be performed to update weights of nodes in the machine learning model. This process may be performed repeatedly using a large portion of the training dataset, with each iteration slightly refining the accuracy of the machine learning model. Once the machine learning model is trained, a reserved portion of the training dataset may be used to test the model.

In one embodiment, the machine learning model is additionally trained to identify teeth, gums and/or excess material in 2D images. In one embodiment, the machine learning model is further trained to determine one or more specific tooth numbers and/or to identify a specific indication (or indications) for an input image. Accordingly, a single machine learning model may be trained to identify and/or correct margin lines and also to identify teeth generally, identify different specific tooth numbers, identify gums and/or identify specific indications (e.g., caries, cracks, etc.). In an alternative embodiment, a separate machine learning model is trained for each specific tooth number and for each specific indication. Accordingly, the tooth number and/or indication (e.g., a particular dental prosthetic to be used) may be indicated (e.g., may be input by a user), and an appropriate machine learning model may be selected based on the specific tooth number and/or the specific indication.

In an embodiment, the machine learning model may be trained to output an identification of a margin line as well as separate information indicating one or more of the above (e.g., path of insertion, model orientation, teeth identification, gum identification, excess material identification, etc.). In one embodiment, the machine learning model (or a different machine learning model) is trained to perform one or more of: identify teeth represented in height maps, identify gums represented in height maps, identify excess material (e.g., material that is not gums or teeth) in height maps, and/or identify margin line in 2D images. In some instances, the margin line identified by such a machine learning model that is trained to identify teeth, gums, excess material and margin line may have increased accuracy since the machine learning model may learn what the tooth/gum boundaries and what artifacts to ignore.

For embodiments in which the machine learning model is trained to output path of insertion, training data may include height maps that include a target path of insertion. For embodiments in which the machine learning model is trained to output a model orientation, training data may include 2D images that include a labeled model orientation. For embodiments in which the machine learning model is trained to output a tooth identification, training data may include 2D images that include a labeled teeth. For embodiments in which the machine learning model is trained to output a gum identification, training data may include 2D images that include a labeled gums. For embodiments in which the machine learning model is trained to output an identification of excess material, training data may include 2D images that include a labeled excess material. For embodiments in which the machine learning model is trained to output multiple pieces of information (e.g., identification of margin line, path of insertion, tooth number identification, gum identification, excess material identification and/or model orientation), the training data may include 2D images with targets/labels identifying the types of information that the model is to output.

In one embodiment, the machine learning model is trained to determine a confidence score for each pixel indicating a confidence that the pixel represents a margin line. The confidence scores may be used to determine quality values for segments of the margin line in some embodiments.

Figure 14:
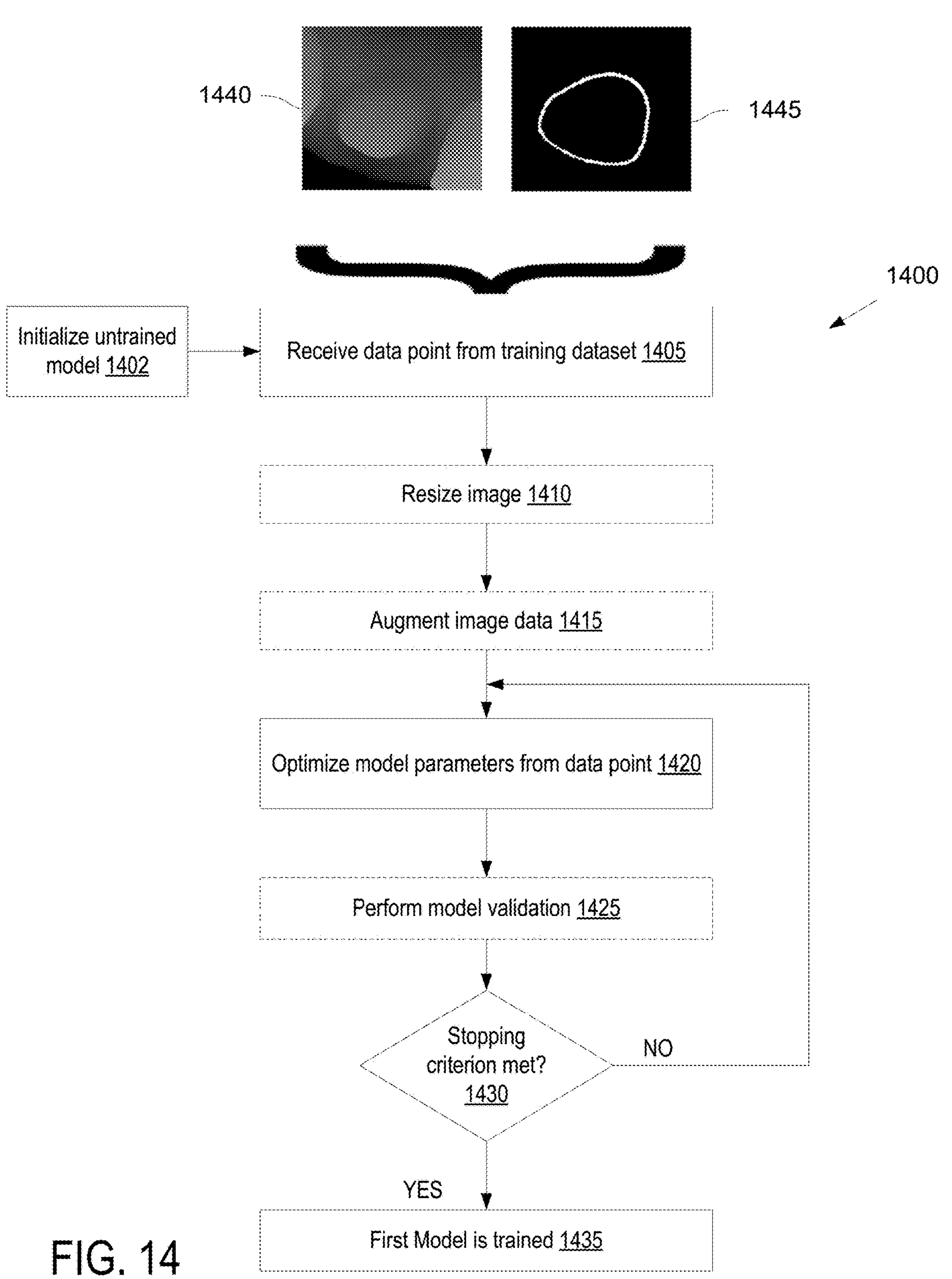
FIG. 14 illustrates a flow diagram for a method of training a machine learning model using image data, in accordance with an embodiment.

FIG. 14 illustrates a flow diagram for a method 1400 of training a machine learning model using image data, in accordance with an embodiment. Method 1400 may be performed to train the first machine learning model 1155 and/or second machine learning model 1175, and may be performed in conjunction with method 1200 and/or method 1300 in embodiments.

At block 1402 of method 1400, an untrained machine learning model is initialized. The machine learning model that is initialized may be a deep learning model such as an artificial neural network. Initialization of the artificial neural network may include selecting starting parameters for the neural network. The solution to a non-convex optimization algorithm depends at least in part on the initial parameters, and so the initialization parameters should be chosen appropriately. In one embodiment, parameters are initialized using Gaussian or uniform distributions with arbitrary set variances.

At block 1405, the untrained machine learning model receives a first data point from a training dataset. The first data point may be, for example, image/height map 1225 along with mask 1230 that shows a margin line. Method 1400 is shown with an example image 1440 and mask 1445 used to train a machine learning model to identify margin lines.

At block 1410, the mask and/or the image may be resized. For example, the machine learning model may be usable for images having certain pixel size ranges, and the image may be resized if it falls outside of those pixel size ranges. Training images may come in different sizes. However, many deep learning algorithms only accept image having a fixed size. Therefore, images in the training dataset (and their accompanying masks) may be resized so that they have the fixed size. The images may be resized, for example, using methods such as nearest-neighbor interpolation or box sampling. At block 1415, the image data may then be augmented. Training of large-scale neural networks generally uses tens of thousands of images, which are not easy to acquire in many real-world applications. Data augmentation can be used to artificially increase the effective sample size. Common techniques include random rotation, shifts, shear, flips and so on to existing images to increase the sample size.

At block 1420, processing logic optimizes parameters of the machine learning model from the data point. The machine learning model applies a classification or label to the image based on its current parameter values. An artificial neural network includes an input layer that consists of values in a data point (e.g., intensity values, color values and/or height values of pixels in the image 1440). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class. For the artificial neural network being trained, there may be a first class (no margin line) and a second class (margin line). Moreover, that class is determined for each pixel in the image. For each pixel in the image, the final layer applies a probability that the pixel of the image belongs to the first class (no margin line) and a probability that the pixel of the image belongs to the second class (margin line).

Processing logic compares the classification, label or other output of the machine learning model (e.g., a modified image) to the provided classification(s), label(s) or other target (in this case mask 1445) to determine one or more classification error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed at block 1425 to determine whether the model has improved and to determine a current accuracy of the deep learning model. At block 1430, processing logic determines whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criteria is not met, the method may return to block 1420 to further optimize the model based on another data point from the training dataset. Alternatively, the method may return to block 1405 in an embodiment. If the stopping criteria has been met, the method continues to block 1435 and a machine learning model is trained. As noted herein, the machine learning model may be an artificial neural network (or other deep learning model) such as a U-net. However, other types of machine learning models may also be used.

A first machine learning model that may be trained may output, for an input image (e.g., an input image comprising a height map or an input height map), a probability map that has a same resolution as the input image (e.g., the same number of horizontal and vertical pixels). The probability map may be a binary mask that includes a first value for a pixel if the pixel represents a margin line and a second value for the pixel if the pixel does not represent a margin line. Alternatively, the probability map may include numerical values ranging from 0 to 1, where each pixel is assigned a numerical value that represents a probability from 0% to 100% that the pixel represents a margin line. Accordingly, the trained machine learning model makes a pixel level decision for each pixel in an input image as to whether that pixel represents a margin line and/or as to a probability that the pixel represents a margin line.

Figure 15:
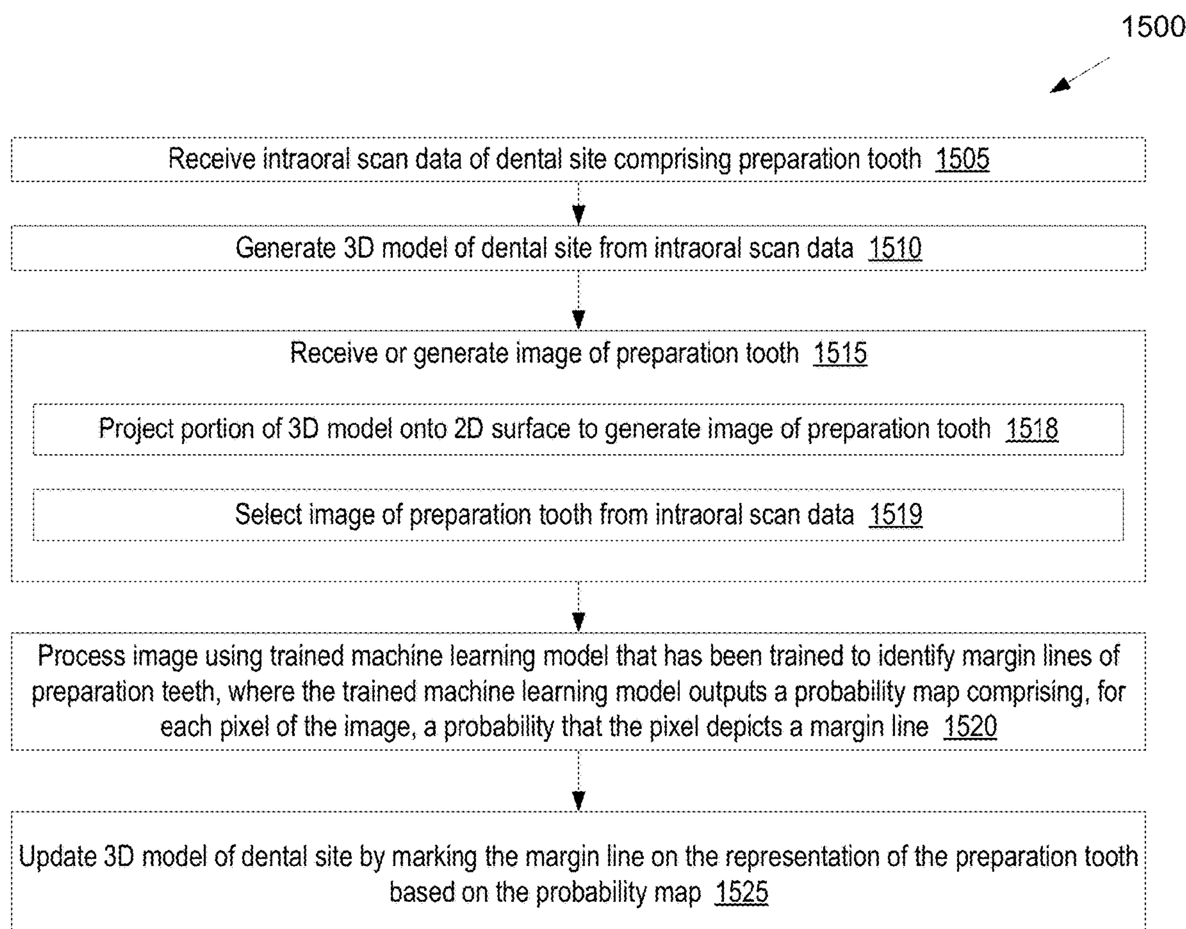
FIG. 15 illustrates a flow diagram for a method of identifying a margin line in a 3D model of a dental site, in accordance with an embodiment.
Figure 16:
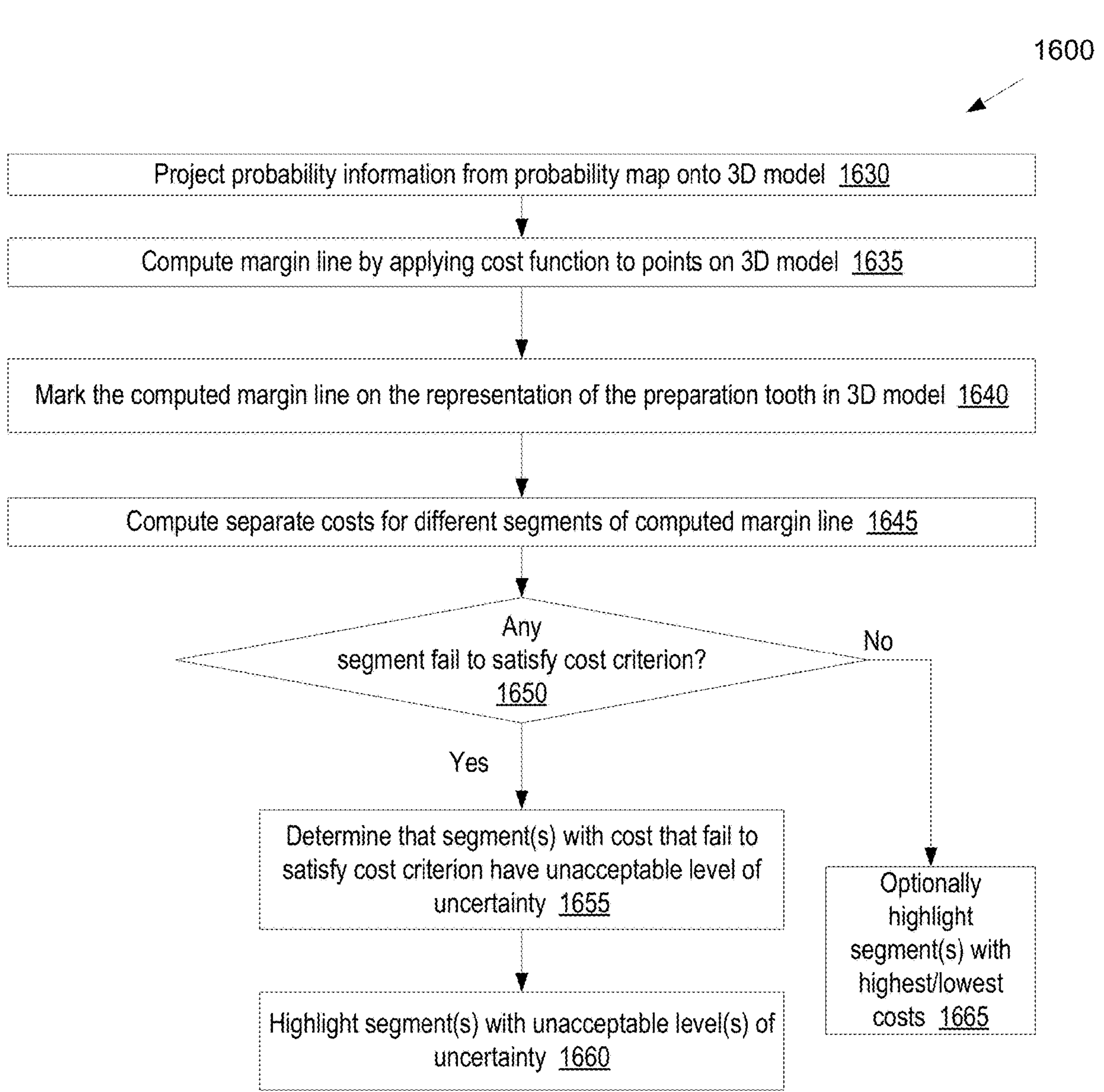
FIG. 16 illustrates a further flow diagram for a method of identifying a margin line in a 3D model of a dental site, in accordance with an embodiment.

FIG. 15 illustrates a flow diagram for a method 1500 of identifying a margin line in a 3D model of a dental site, in accordance with an embodiment. At block 1505 of method 1500, processing logic receives intraoral scan data of a dental site comprising a preparation tooth. At block 1510, processing logic generates a 3D model of the dental site from the intraoral scan data.

At block 1515, processing logic receives or generates an image of the preparation tooth, where the image may comprise a height map of the preparation tooth, a 2D color image of the preparation tooth, a 2D NIRI image of the preparation tooth, and so on. For example, a greyscale height map may be received or generated. In one embodiment, at block 1518 processing logic projects the 3D model onto a 2D surface to generate the image of the preparation tooth. In one embodiment, at block 1519 processing logic selects an intraoral image from the intraoral scan data. In one embodiment, the intraoral image is a blended image contrasted from combining together multiple different distinct intraoral images.

At block 1520, processing logic processes the image using a trained machine learning model that has been trained to identify margin lines of preparation teeth. The trained machine learning model may output a probability map comprising, for each pixel of the image, a probability that the pixel represents a margin line. In one embodiment, the trained machine learning model corresponds to the first trained model 1155 or second model 1175 of FIG. 11.

At block 1525, processing logic updates a 3D model of a dental site by marking the margin line on the representation of the preparation tooth based on the probability map. In one embodiment, method 1600 is performed to mark the margin line on the 3D model.

The operations of blocks 1515-1525 may be performed for many (e.g., up to about a hundred or more) images generated from a single 3D model of a dental site. The data from the multiple images in the aggregate may provide an accurate representation of the margin line in embodiments.

FIG. 16 illustrates a further flow diagram for a method 1600 of identifying a margin line in a 3D model of a dental site, in accordance with an embodiment. At block 1630 of method 1600, processing logic projects probability information from a probability map (e.g., that was output by a machine learning model) onto the 3D model. The probability map may be associated with a height map that was generated from the 3D model, or may be associated with one or a set of 2D images (e.g., color 2D images, NIRI 2D images, fluorescent 2D images, etc.) that were generated during intraoral scanning. The height map/image may be used to determine, for each pixel in the height map/image, a corresponding point on the 3D model. The probability of the associated pixel may then be assigned to the determined corresponding point on the 3D model as a texture. In some embodiments, margin line probability information is determined based on the 3D model (e.g., by projecting the 3D model onto multiple planes to generate height maps and then inputting those height maps into a trained machine learning model) and/or based on multiple 2D images (e.g., by inputting those 2D images into a trained machine learning model).

At block 1635, processing logic computes a margin line by applying a cost function to the points on the 3D model. In one embodiment, processing logic generates a matrix that identifies, for each point (e.g., edge, vertex, voxel, etc. on a surface of the 3D model), a probability that the point represents a margin line. For example, entries in the matrix that have no chance of representing the margin line have an assigned 0% probability.

Processing logic uses the cost function to create a closest contour going through points with high probabilities of representing the margin line. In one embodiment, a total cost of the contour that is drawn for the margin line is the sum of all edges (e.g., vertexes) included in the margin line, adjusted by weights associated with each of the vertexes. Each weight for a vertex may be a function of the probability assigned to that vertex. The cost for that vertex being included in the margin line may be approximately 1/(A+P), where A is a small constant and P is the probability of the vertex representing the margin line. The smaller the probability for a vertex, the larger the cost of that vertex being included in the margin line. Costs may also be computed for segments of the margin line based on a sum of the costs of the vertexes included those segments. When probability is close to 100%, then cost is approximately 1 adjusted by length.

In one embodiment, a path finding operation or algorithm is applied to the 3D model using values from the matrix as a cost basis. Any pathfinding algorithm may be used. Some examples of possible path finding algorithms to use include dynamic programming, Dijkstra's algorithm, A* search algorithm, an incremental heuristic search algorithm, and so on. A pathfinding algorithm may apply a cost function to determine a path of the margin line.

A pathfinding algorithm that uses probability of representing the margin line in the matrix as a cost basis may search for a path with a maximal cost or a path with a minimal cost. The cost function described above searches for minimum cost using a function that is based on an inverse of probability. Alternatively, a cost function may be used that is based directly on probability, where the maximum cost is searched for. If a pathfinding algorithm is run to maximize cost, then a path between vertexes will be determined that results in a maximum aggregate of probability values. The probability scores of the vertexes may be input into the pathfinding algorithm to find the path that has the maximal cost for the probability score. The path finding algorithm may be used to define a contour that represents the margin line.

At block 1640, processing logic marks the computed margin line on the representation of the preparation tooth in the 3D model. At block 1645, processing logic computes separate costs for different segments of the margin line as described above. For example, processing logic may determine multiple segments of the margin line, each segment including a collection of connected or adjacent vertexes. For each segment, processing logic may use the cost function to compute a cost for the segment. Cost values may be computed for overlapping and/or non-overlapping segments. Alternatively, such separate costs may have been computed at block 1635.

At block 1650, processing logic determines whether any of the segments has a cost value/score that fails to satisfy a cost criterion. For example, processing logic may determine whether any of the segments has a cost that exceeds a cost threshold (if the cost function optimizes for minimal cost). Alternatively, processing logic may determine whether any segment has a cost value/score that is below a cost threshold (if the cost function optimizes for maximal cost). If all segments meet the cost criterion, the method continues to block 1665. If any segment fails to satisfy the cost criterion, the method continues to block 1655.

At block 1665, processing logic optionally highlights segments of the margin line that satisfied the cost criterion, but that came close to failing the cost criterion. For example, processing logic may highlight the segments with the highest costs.

At block 1655, processing logic determines that one or more segments of the margin line that failed the cost criterion has an unacceptable level of uncertainty or clarity. At block 1660, processing logic highlights those segments of the margin line with unacceptable levels of uncertainty or clarity.

In some embodiments, method 1600 is performed separately for margin line information generated from the 3D surface and for margin line information generated from 2D images. This may result in multiple different margin lines on the 3D surface. These multiple margin lines may then be compared, and a similar cost function to the one described above may be applied to merge the multiple margin lines into a single margin line in some embodiments.

Figure 17:
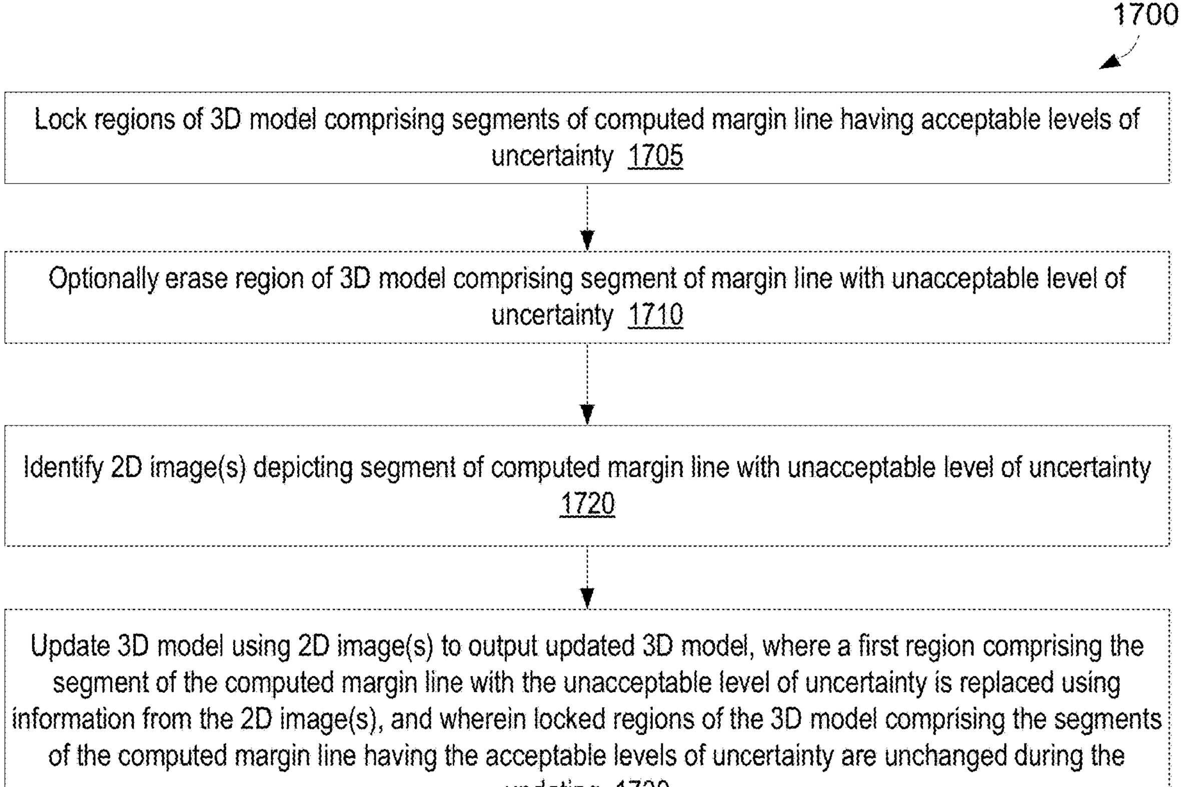
FIG. 17 illustrates a flow diagram for a method of updating a 3D model of a dental site, in accordance with an embodiment.

FIG. 17 illustrates a flow diagram for a method 1700 of updating a 3D model of a dental site, in accordance with an embodiment.

At block 1705 of method 1700, processing logic automatically locks one or more regions of the 3D model of the dental site(s) comprising segments of a computed margin line having acceptable levels of uncertainty (e.g., areas depicting segments of the margin line that satisfied a margin line cost criterion). At block 1710, processing logic optionally automatically erases a region of the 3D model comprising a segment of the margin line with an unacceptable level of uncertainty (e.g., that had a cost that failed to satisfy a cost criterion).

At block 1715, processing logic may highlight a region of the 3D model that needs new scan data (e.g., the area that was erased). Processing logic may additionally notify a doctor to generate one or more intraoral scans of the portion of a preparation tooth associated with the region of the 3D model that was erased.

At block 1720, processing logic updates the 3D model using the 2D images to output an updated 3D model. A first region comprising the segment of the computed margin line with the unacceptable level of uncertainty may be replaced using information from the 2D images. Locked regions of the 3D model comprising the segments of the computed margin line having the acceptable levels of uncertainty may be unchanged during the updating.

Figure 18:
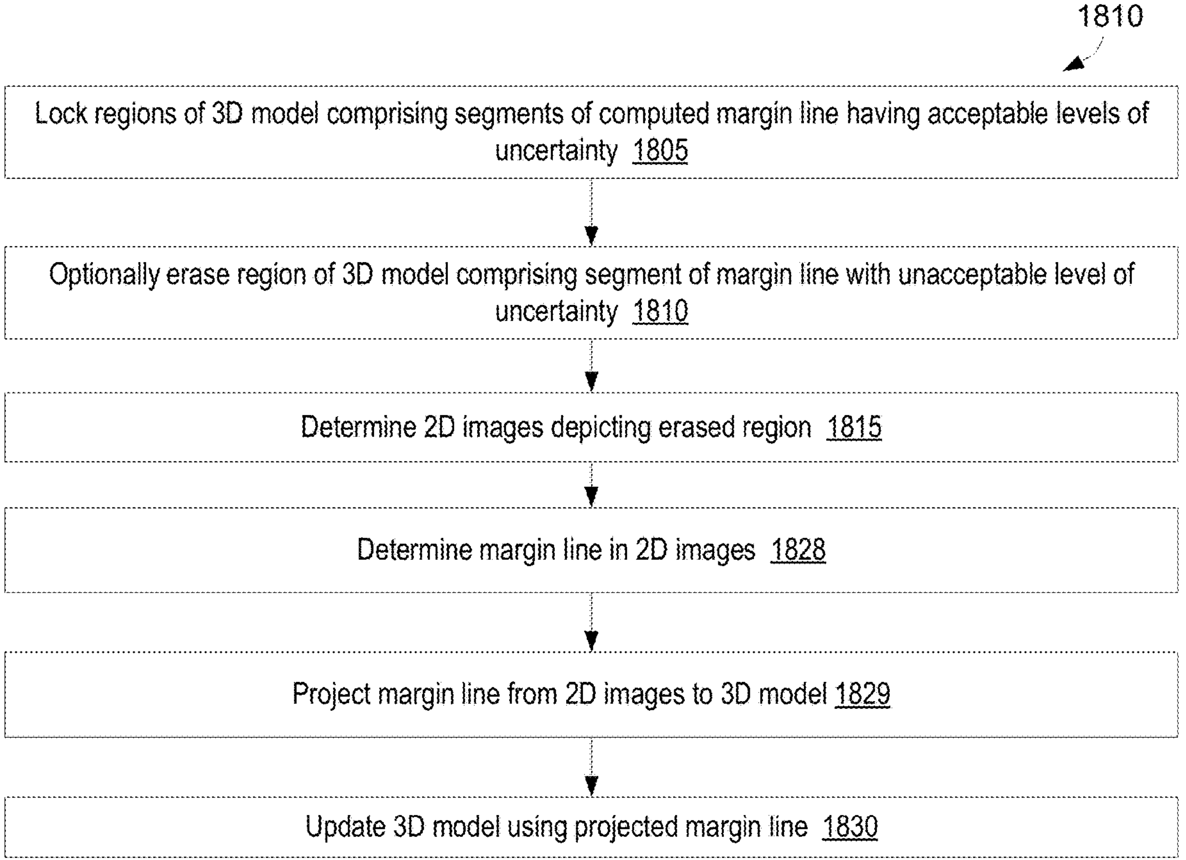
FIG. 18 illustrates a flow diagram for a method of updating a 3D model of a dental site, in accordance with an embodiment.

FIG. 18 illustrates another flow diagram for a method 1800 of updating a 3D model of a dental site, in accordance with an embodiment.

At block 1805 of method 1800, processing logic automatically locks one or more regions of the 3D model of the dental site(s) comprising segments of a computed margin line having acceptable levels of uncertainty (e.g., areas depicting segments of the margin line that satisfied a margin line cost criterion). At block 1805, processing logic optionally automatically erases a region of the 3D model comprising a segment of the margin line with an unacceptable level of uncertainty (e.g., that had a cost that failed to satisfy a cost criterion).

At block 1815, processing logic determines 2D images depicting the erased region (or region comprising segment of margin line with unacceptable level of uncertainty (which may not have been erased). At block 1828, processing logic determines a margin line in each of the 2D images. At block 1829, processing logic projects the margin lines from the 2D images onto the 3D model. At block 1830, processing logic then updates the 3D model using the projected margin line.

Figure 19:
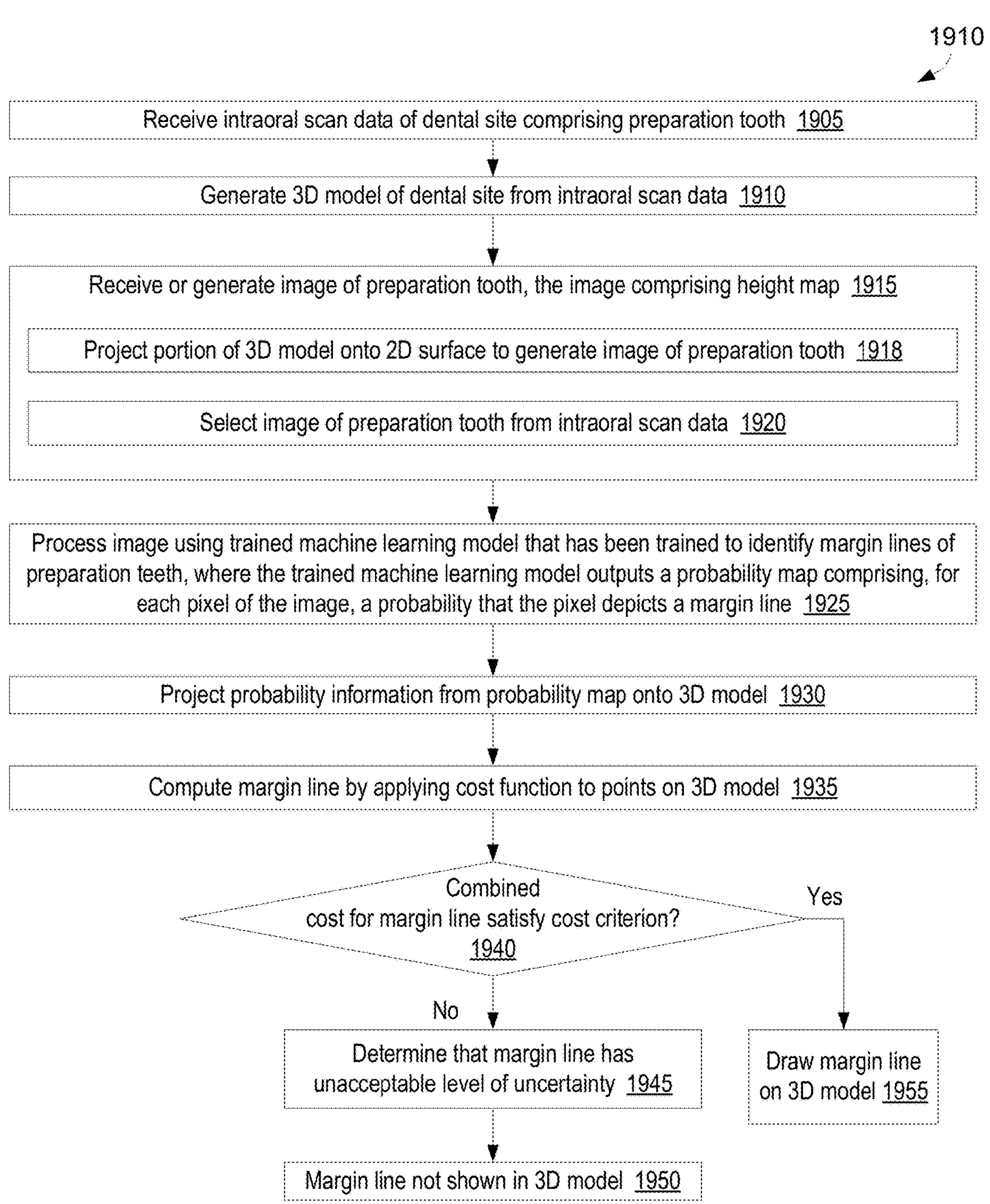
FIG. 19 illustrates another flow diagram for a method of identifying a margin line in a 3D model of a dental site, in accordance with an embodiment.

FIG. 19 illustrates another flow diagram for a method 1900 of identifying a margin line in a 3D model of a dental site, in accordance with an embodiment. At block 1905 of method 1900, processing logic receives intraoral scan data of a dental site comprising a preparation tooth. At block 1910, processing logic generates a 3D model of the dental site from the intraoral scan data.

At block 1915, processing logic receives or generates an image of the preparation tooth, where the image comprises a height map of the preparation tooth. For example, a greyscale height map may be received or generated. In one embodiment, at block 1918 processing logic projects the 3D model onto a 2D surface to generate the image of the preparation tooth. In one embodiment, at block 1920 processing logic selects an intraoral image from the intraoral scan data. In one embodiment, the intraoral image is a blended image contrasted from combining together multiple different distinct intraoral images.

At block 1925, processing logic processes the image using a trained machine learning model that has been trained to identify margin lines of preparation teeth. The trained machine learning model may output a probability map comprising, for each pixel of the image, a probability that the pixel represents a margin line. In one embodiment, the trained machine learning model corresponds to the first trained model 1155 of FIG. 11.

At block 1930, processing logic projects the probability information from the probability map onto the 3D model. At block 1935, processing logic computes a margin line by applying a cost function to the points of the 3D model. At block 1940, processing logic determines whether the combined cost of the margin line satisfies a cost criterion (e.g., exceeds a cost threshold if a minimum cost is targeted or falls below a cost threshold if a maximal cost is targeted). If the combined cost satisfies the cost criterion, the method proceeds to block 1955 and the margin line is drawn on the 3D model. If the combined cost fails to satisfy the cost criterion, the method continues to block 1945.

At block 1945, processing logic determines that the margin line has an acceptable level of uncertainty. At block 1950, the margin line is not shown in the 3D model.

Figure 20:
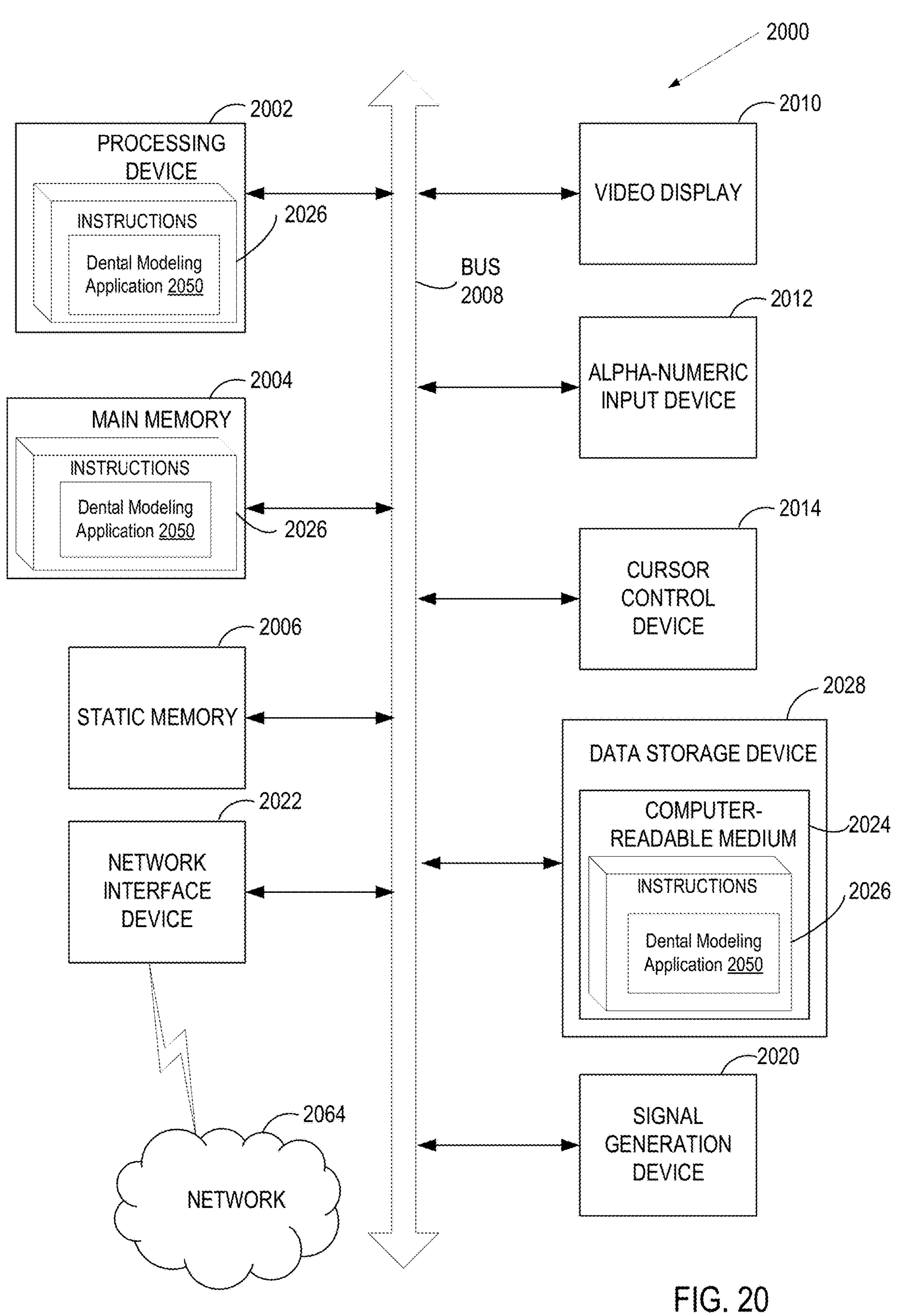
FIG. 20 illustrates a block diagram of an example computing device, in accordance with embodiments of the present disclosure.

FIG. 20 illustrates a diagrammatic representation of a machine in the example form of a computing device 2000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The computing device 2000 may correspond, for example, to computing device 105 and/or computing device 106 of FIG. 1. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 2000 includes a processing device 2002, a main memory 2004 (e.g., read-only memory (ROM), flash memory, dynamic random access memory (DRAM) such as synchronous DRAM (SDRAM), etc.), a static memory 2006 (e.g., flash memory, static random access memory (SRAM), etc.), and a secondary memory (e.g., a data storage device 2028), which communicate with each other via a bus 2008.

Processing device 2002 represents one or more general-purpose processors such as a microprocessor, central processing unit, or the like. More particularly, the processing device 2002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 2002 may also be one or more special-purpose processing devices such as an application specific integrated circuit (ASIC), a field programmable gate array (FPGA), a digital signal processor (DSP), network processor, or the like. Processing device 2002 is configured to execute the processing logic (instructions 2026) for performing operations and steps discussed herein.

The computing device 2000 may further include a network interface device 2022 for communicating with a network 2064. The computing device 2000 also may include a video display unit 2010 (e.g., a liquid crystal display (LCD) or a cathode ray tube (CRT)), an alphanumeric input device 2012 (e.g., a keyboard), a cursor control device 2014 (e.g., a mouse), and a signal generation device 2020 (e.g., a speaker).

The data storage device 2028 may include a machine-readable storage medium (or more specifically a non-transitory computer-readable storage medium) 2024 on which is stored one or more sets of instructions 2026 embodying any one or more of the methodologies or functions described herein, such as instructions for dental modeling logic 2050. A non-transitory storage medium refers to a storage medium other than a carrier wave. The instructions 2026 may also reside, completely or at least partially, within the main memory 2004 and/or within the processing device 2002 during execution thereof by the computer device 2000, the main memory 2004 and the processing device 2002 also constituting computer-readable storage media.

The computer-readable storage medium 2024 may also be used to store dental modeling logic 2050, which may include one or more machine learning modules, and which may perform the operations described herein above. The computer readable storage medium 2024 may also store a software library containing methods for the dental modeling logic 2050. While the computer-readable storage medium 2024 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A non-transitory computer readable medium comprising instructions that, when executed by a processing device, cause the processing device to perform operations comprising:

receiving a plurality of intraoral scans of a dental site generated by an intraoral scanner and a plurality of two-dimensional (2D) images of the dental site generated by the intraoral scanner;

generating a three-dimensional (3D) surface of the dental site based at least in part on the plurality of intraoral scans;

determining a correspondence between points on the 3D surface and points in one or more 2D images of the plurality of 2D images; and performing one or more operations using the correspondence between the points on the 3D surface and the points in the one or more 2D images, wherein the one or more operations comprise at least one of:

a) receiving a selection, via a graphical user interface (GUI), of a point on the 3D surface, and indicating a corresponding point on the one or more 2D images based on the determined correspondence; or b) receiving a selection, via the GUI, of a point on a 2D image of the one or more 2D images, and indicating a corresponding point on the 3D surface based on the determined correspondence.

2. The non-transitory computer readable medium of claim 1, wherein performing the one or more operations comprises augmenting the 3D surface of the dental site using data from the one or more 2D images based on the determined correspondence.

3. The non-transitory computer readable medium of claim 1, the operations further comprising:

determining a view of the 3D surface; and selecting the one or more 2D images based on the determined view.

4. The non-transitory computer readable medium of claim 1, the operations comprising:

receiving the selection of the point on the 3D surface; and indicating the corresponding point on the one or more 2D images based on the determined correspondence.

5. The non-transitory computer readable medium of claim 1, the operations comprising:

receiving the selection of the point on the 2D image of the one or more 2D images; and indicating the corresponding point on the 3D surface based on the determined correspondence.

6. The non-transitory computer readable medium of claim 1, wherein the dental site comprises a preparation tooth having a margin line, wherein the 3D surface comprises a representation of the preparation tooth, and wherein each of the one or more 2D images depicts the preparation tooth and at least a portion of the margin line.

7. The non-transitory computer readable medium of claim 1, the operations further comprising:

for each 2D image of the plurality of 2D images, determining a position of a camera of the intraoral scanner that generated the 2D image relative to the 3D surface based on at least one of a) interpolation of positions of the intraoral scanner associated with intraoral scans of the plurality of intraoral scans captured before and after the 2D image was captured, b) inertial measurement data generated by the intraoral scanner while generating at least one of the 2D image, the intraoral scans captured before the 2D image or the intraoral scans captured after the 2D image, or c) registration of the 2D image to the 3D surface.

8. The non-transitory computer readable medium of claim 1, the operations further comprising:

receiving user selection of the one or more 2D images from the plurality of 2D images.

9. The non-transitory computer readable medium of claim 1, wherein the 3D surface has missing data for a region of the dental site, the operations further comprising:

determining that the region of the dental site is shown in the one or more 2D images; and supplementing the 3D surface by using data from the one or more 2D images to fill in the missing data for the region of the dental site in the 3D surface.

10. The non-transitory computer readable medium of claim 1, the operations further comprising:

determining a shape of a portion of the dental site in at least three 2D images of the one or more 2D images;

determining that there is disagreement between the at least three 2D images regarding the shape of the portion of the dental site;

applying a voting algorithm to resolve the disagreement and determine a final shape of the portion of the dental site; and updating the 3D surface of the dental site in accordance with the determined final shape of the portion of the dental site based on the determined correspondence between the points on the 3D surface and the points in the at least three 2D images.

11. The non-transitory computer readable medium of claim 1, the operations further comprising:

determining a shape of a portion of the dental site in at least two 2D images of the one or more 2D images;

determining that there is disagreement between the at least two 2D images regarding the shape of the portion of the dental site;

determining a final shape of the portion of the dental site based on a weighted combination of the shape of the portion of the dental site from each of the at least two 2D images; and updating the 3D surface of the dental site in accordance with the determined final shape of the portion of the dental site based on the determined correspondence between the points on the 3D surface and the points in the at least two 2D images.

12. A non-transitory computer readable medium comprising instructions that, when executed by a processing device, cause the processing device to perform operations comprising:

receiving a plurality of intraoral scans of a dental site generated by an intraoral scanner and a plurality of two-dimensional (2D) images of the dental site generated by the intraoral scanner;

generating a three-dimensional (3D) surface of the dental site based at least in part on the plurality of intraoral scans;

determining a correspondence between points on the 3D surface and points in one or more 2D images of the plurality of 2D images;

determining a first estimate for a portion of the dental site based on the 3D surface of the dental site;

determining a second estimate for the portion of the dental site based on the one or more 2D images of the dental site;

comparing the first estimate for the portion of the dental site to the second estimate for the portion of the dental site; and performing one or more operations using the correspondence between the points on the 3D surface and the points in the one or more 2D images and a result of the comparing.

13. The non-transitory computer readable medium of claim 1, wherein the plurality of 2D images comprise at least one of color images, near infrared (NIRI) images, or fluorescent images.

14. The non-transitory computer readable medium of claim 1, wherein the operations are performed by the processing device after intraoral scanning of the dental site is complete, and wherein the 3D surface is a 3D model of the dental site.

15. The non-transitory computer readable medium of claim 1, wherein the operations are performed by the processing device during intraoral scanning, the operations further comprising:

determining, based on the one or more 2D images and the determined correspondence, whether enough intraoral scans have been generated to accurately show the dental site in the 3D surface.

16. The non-transitory computer readable medium of claim 1, wherein the operations are performed by the processing device during intraoral scanning, the operations further comprising:

comparing the one or more 2D images to at least one of a) one or more other 2D images of the plurality of 2D images or b) the 3D surface; and determining whether any contradictions are identified based on a result of the comparing.

17. The non-transitory computer readable medium of claim 1, the operations further comprising:

determining a first 2D image of the plurality of 2D images that most closely matches a current view of the 3D surface and a selection of a point on the 3D surface; and displaying the first 2D image proximate to the 3D surface.

18. A non-transitory computer readable medium comprising instructions that, when executed by a processing device, cause the processing device to perform operations comprising:

receiving a plurality of intraoral scans of a dental site generated by an intraoral scanner and a plurality of two-dimensional (2D) images of the dental site generated by the intraoral scanner, wherein the dental site comprises a preparation tooth;

generating a three-dimensional (3D) surface of the dental site based at least in part on the plurality of intraoral scans;

determining a correspondence between points on the 3D surface and points in one or more 2D images of the plurality of 2D images;

identifying a margin line around the preparation tooth from the 3D surface;

determining that a confidence for a segment of the margin line is low; and performing one or more operations using the correspondence between the points on the 3D surface and the points in the one or more 2D images, the one or more operations comprising:

determining one or more 3D curves for the segment of the margin line based on the one or more 2D images of the plurality of 2D images; and modifying the 3D surface to cause it to have the one or more 3D curves.

19. A non-transitory computer readable medium comprising instructions that, when executed by a processing device, cause the processing device to perform operations comprising:

receiving a plurality of intraoral scans of a dental site generated by an intraoral scanner and a plurality of two-dimensional (2D) images of the dental site generated by the intraoral scanner;

generating a three-dimensional (3D) surface of the dental site based at least in part on the plurality of intraoral scans;

determining a correspondence between points on the 3D surface and points in one or more 2D images of the plurality of 2D images; and performing one or more operations using the correspondence between the points on the 3D surface and the points in the one or more 2D images, the one or more operations comprising:

determining a first 2D image of the plurality of 2D images that most closely matches a current view of the 3D surface and a selection of a point on the 3D surface;

registering the first 2D image to the 3D surface; and overlaying the first 2D image over the 3D surface in accordance with the registration.

20. A non-transitory computer readable medium comprising instructions that, when executed by a processing device, cause the processing device to perform operations comprising:

receiving a plurality of intraoral scans of a dental site generated by an intraoral scanner and a plurality of two-dimensional (2D) images of the dental site generated by the intraoral scanner;

generating a three-dimensional (3D) surface of the dental site based at least in part on the plurality of intraoral scans;

determining a correspondence between points on the 3D surface and points in one or more 2D images of the plurality of 2D images;

performing one or more operations using the correspondence between the points on the 3D surface and the points in the one or more 2D images, the one or more operations comprising:

determining a first 2D image of the plurality of 2D images that most closely matches a current view of the 3D surface and a selection of a point on the 3D surface;

projecting the first 2D image onto a plane corresponding to the current view of the 3D surface to generate a synthetic 2D image;

registering the synthetic 2D image to the 3D surface; and overlaying the synthetic 2D image over the 3D surface in accordance with the registration.

21. The non-transitory computer readable medium of claim 1, the operations further comprising:

generating a panoramic image of the dental site using the plurality of 2D images;

determining a point on the panoramic image that corresponds to a selection of a point on the 3D surface; and indicating the determined point on the panoramic image.

22. The non-transitory computer readable medium of claim 1, wherein performing the one or more operations comprises verifying whether a correct margin line has been traced on the 3D surface.

* * * * *